(12) United States Patent
Bito et al.

(10) Patent No.: US 9,182,575 B2
(45) Date of Patent: Nov. 10, 2015

(54) ZOOM LENS SYSTEM, IMAGING DEVICE AND CAMERA

(75) Inventors: Takakazu Bito, Osaka (JP); Takanori Yogo, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 902 days.

(21) Appl. No.: 13/380,907

(22) PCT Filed: Jun. 29, 2010

(86) PCT No.: PCT/JP2010/004284
§ 371 (c)(1),
(2), (4) Date: Dec. 27, 2011

(87) PCT Pub. No.: WO2011/001663
PCT Pub. Date: Jan. 6, 2011

(65) Prior Publication Data
US 2012/0140095 A1      Jun. 7, 2012

(30) Foreign Application Priority Data

Jul. 2, 2009  (JP) ................................ 2009-157593
Jul. 2, 2009  (JP) ................................ 2009-157594
Jul. 2, 2009  (JP) ................................ 2009-157595
Jul. 2, 2009  (JP) ................................ 2009-157596
Jul. 2, 2009  (JP) ................................ 2009-157597

(51) Int. Cl.
*G02B 13/18*    (2006.01)
*G02B 15/177*   (2006.01)

(52) U.S. Cl.
CPC .............. *G02B 13/18* (2013.01); *G02B 15/177* (2013.01)

(58) Field of Classification Search
CPC ................ G02B 27/64–27/646; G02B 15/177; G02B 15/14–15/167; G02B 13/009
USPC ................ 359/554–557, 689, 744, 781–784, 359/785–790, 649–651, 691, 745–756, 761, 359/770–771, 793
See application file for complete search history.

(56) References Cited

U.S. PATENT DOCUMENTS 5,764,421 A * 6/1998 Shimizu et al. ................ 359/689
2007/0263295 A1 * 11/2007 Enomoto ....................... 359/684

(Continued)

FOREIGN PATENT DOCUMENTS

| JP | H03-059626 A | 3/1991 |
| JP | H07-287167 A | 10/1995 |

(Continued)

*Primary Examiner* — Stephone B Allen
*Assistant Examiner* — Jeffrey Madonna
(74) *Attorney, Agent, or Firm* — James W. Judge

(57) ABSTRACT

A zoom lens system having a plurality of lens units, each lens unit being composed of at least one lens element, the zoom lens system, in order from an object side to an image side, comprising: a first lens unit having negative optical power and being composed of at least two lens elements; and a second lens unit having positive optical power, wherein in zooming from a wide-angle limit to a telephoto limit at the time of image taking, the lens units are individually moved along an optical axis to vary magnification such that an interval between the first lens unit and the second lens unit decreases, and the conditions: $f_W/D_1 > 7.5$ and $Z = f_T/f_W > 4.0$ ($f_W$: a focal length of the entire system at a wide-angle limit, $f_T$: a focal length of the entire system at a telephoto limit, $D_1$: a center thickness of a lens element located on the most object side in the first lens unit) are satisfied; an imaging device; and a camera.

19 Claims, 31 Drawing Sheets

(56) References Cited

U.S. PATENT DOCUMENTS

| | | | |
|---|---|---|---|
| 2008/0204902 A1* | 8/2008 | Obu et al. | 359/770 |
| 2008/0297915 A1* | 12/2008 | Yamada et al. | 359/689 |
| 2008/0297916 A1* | 12/2008 | Yoshitsugu et al. | 359/689 |
| 2009/0009884 A1* | 1/2009 | Ohtake et al. | 359/689 |
| 2009/0034067 A1* | 2/2009 | Katakura | 359/432 |
| 2009/0034090 A1* | 2/2009 | Eguchi | 359/684 |
| 2009/0195887 A1* | 8/2009 | Lee | 359/689 |
| 2009/0257132 A1* | 10/2009 | Hayakawa et al. | 359/689 |
| 2010/0085648 A1* | 4/2010 | Masugi | 359/689 |
| 2010/0091381 A1* | 4/2010 | Katakura | 359/676 |
| 2010/0309563 A1* | 12/2010 | Yoshitsugu et al. | 359/682 |

FOREIGN PATENT DOCUMENTS

| | | |
|---|---|---|
| JP | H07-287168 A | 10/1995 |
| JP | H11-072704 A | 3/1999 |
| JP | H11-149044 A | 6/1999 |
| JP | H11-194274 A | 7/1999 |
| JP | 2003-287679 A | 10/2003 |
| JP | 2004-109153 A | 4/2004 |
| JP | 2004-318097 A | 11/2004 |
| JP | 2004-318103 A | 11/2004 |
| JP | 2005-321744 A | 11/2005 |
| JP | 2005-352182 A | 12/2005 |
| JP | 2006-030824 A | 2/2006 |
| JP | 2006-139187 A | 6/2006 |
| JP | 2006-208890 A | 8/2006 |
| JP | 2006-227197 A | 8/2006 |
| JP | 2007-102182 A | 4/2007 |
| JP | 2007-133133 A | 5/2007 |
| JP | 2007-140359 A | 6/2007 |
| JP | 2007-147851 A | 6/2007 |
| JP | 2007-225643 A | 9/2007 |
| JP | 2007-316280 A | 12/2007 |
| JP | 2008-170576 A | 7/2008 |
| JP | 2008-170577 A | 7/2008 |
| JP | 2008-176231 A | 7/2008 |
| JP | 2008-233499 A | 10/2008 |
| JP | 2008-241794 A | 10/2008 |
| JP | 2008-292911 A | 12/2008 |
| JP | 2008-298899 A | 12/2008 |
| JP | 2009-037091 A | 2/2009 |
| JP | 2009-037125 A | 2/2009 |
| JP | 2009-092740 A | 4/2009 |
| JP | 2009-098184 A | 5/2009 |
| JP | 2010-091948 A | 4/2010 |

* cited by examiner

ZOOM LENS SYSTEM, IMAGING DEVICE AND CAMERA

TECHNICAL FIELD

The present invention relates to zoom lens systems, imaging devices and cameras. In particular, the present invention relates to: zoom lens systems having a high resolution with a short optical overall length (overall length of lens system) and still having a view angle at a wide-angle limit of approximately 82°, that is satisfactorily applicable in wide-angle image taking, as well as a high zooming ratio of approximately 5; imaging devices each employing the zoom lens system; and thin and extremely compact cameras each employing the imaging device.

BACKGROUND ART

With recent progress in the development of solid-state image sensors such as a CCD (Charge Coupled Device) and a CMOS (Complementary Metal-Oxide Semiconductor) having a high pixel, digital still cameras and digital video cameras (simply referred to as "digital cameras", hereinafter) are rapidly spreading that employ an imaging device including an imaging optical system of high optical performance corresponding to the above-mentioned solid-state image sensors of a high pixel. Among these digital cameras having a high optical performance, the demand for the compact digital camera has increased especially.

The compact digital cameras are requested to reduce the further thickness in terms of ease of portability and storability. As means for achieving such thin and compact digital cameras, in conventional art, various kinds of zoom lens systems having a three-unit construction of negative lead type and a short optical overall length (overall length of lens system: the distance from the tip of the most object side lens surface to an image surface in the entire lens system) have been proposed that, in order from an object side to an image side, comprise: a first lens unit having negative optical power; a second lens unit having positive optical power; and a third lens unit having positive optical power.

For example, Japanese Laid-Open Patent Publication No. 2008-241794 discloses a zoom lens, in order from the object side to the image side, having three lens units of a negative lens unit, a positive lens unit, and a positive lens unit. In the zoom lens, intervals between the individual lens units vary at the time of magnification change. Also in the zoom lens, the relationship among focal lengths of the entire system at a wide-angle limit and a telephoto limit, imaging magnification of a second lens unit at a telephoto limit, and a focal length, an Abbe number, a partial dispersion ratio, a refractive index and a radius of curvature of a lens constituting the second lens unit is specified. The zoom lens disclosed in Japanese Laid-Open Patent Publication No. 2008-241794 has a wide view angle at a wide-angle limit and a relatively high zooming ratio.

Japanese Laid-Open Patent Publication No. 2007-140359 discloses a zoom lens, in order from the object side to the image side, having at least two lens units of a negative lens unit, and a positive lens unit. In the zoom lens, intervals between the individual lens units vary at the time of magnification change. Also in the zoom lens, the relationship among a refractive index, a focal length and a radius of curvature of a lens constituting a first lens unit is specified. The zoom lens disclosed in Japanese Laid-Open Patent Publication No. 2007-140359 has a reduced optical overall length and a high optical performance all over the range of magnification change.

Japanese Laid-Open Patent Publication No. 2006-227197 discloses a zoom lens, in order from the object side to the image side, having three lens units of a negative lens unit, a positive lens unit, and a positive lens unit. In the zoom lens, the individual lens units move for magnification change so that an interval between a first lens unit and a second lens unit decrease and an interval between the second lens unit and a third lens unit increase, at a telephoto limit relative to at a wide-angle limit. Also in the zoom lens, the first lens unit is composed of two lenses of a negative lens and a positive lens, the second lens unit is composed of three lenses of a positive lens and a cemented lens composed of a positive lens and a negative lens, the third lens unit is composed of one positive lens, and imaging magnification of the second lens unit at a telephoto limit is specified. The zoom lens disclosed in Japanese Laid-Open Patent Publication No. 2006-227197 has a relatively high zooming ratio with remaining the desired optical performance.

Japanese Patent No. 3589555 discloses a zoom lens, in order from the object side to the image side, having three lens units of a negative lens unit, a positive lens unit, and a positive lens unit. In the zoom lens, a first lens unit moves with locus of a convex to the image side, a second lens unit monotonically moves to the object side from a wide-angle limit to a telephoto limit, and a third lens unit moves with locus of a convex to the object side, at the time of magnification change. Also in the zoom lens, the relationship between a focal length of the entire system at a wide-angle limit and a focal length of each lens unit is specified. The zoom lens disclosed in Japanese Patent No. 3589555 has a reduced optical overall length and suppressed distortion with a small number of lenses.

Japanese Patent No. 3868092 discloses a zoom lens, in order from the object side to the image side, having three lens units of a negative lens unit, a positive lens unit, and a positive lens unit. In the zoom lens, a first lens unit moves with locus of a convex to the image side, a second lens unit monotonically moves to the object side from a wide-angle limit to a telephoto limit, and a third lens unit moves with locus of a convex to the object side, at the time of magnification change. Also in the zoom lens, the relationship between a focal length of the entire system at a wide-angle limit and a focal length of each lens unit is specified. The zoom lens disclosed in Japanese Patent No. 3868092 has a reduced optical overall length and suppressed distortion with a small number of lenses.

CITATION LIST

Patent Literature

[PTL 1] Japanese Laid-Open Patent Publication No. 2008-241794
[PTL 2] Japanese Laid-Open Patent Publication No. 2007-140359
[PTL 3] Japanese Laid-Open Patent Publication No. 2006-227197
[PTL 4] Japanese Patent No. 3589555
[PTL 5] Japanese Patent No. 3868092

SUMMARY OF THE INVENTION

Problems to be Solved by the Invention

The zoom lens disclosed in Japanese Laid-Open Patent Publication No. 2008-241794 has a high optical performance, a wide view angle at a wide-angle limit of 75°, and a high zooming ratio of 6 to 8. However, because the zoom lens has a lens construction which increases the amount of movement of the second lens unit on an optical axis at the time of magnification change, the optical overall length of the zoom lens is long. Accordingly, the compact digital cameras cannot be achieved to reduce the further thickness.

The zoom lens disclosed in Japanese Laid-Open Patent Publication No. 2007-140359 can achieve to reduce the further thickness of the compact digital cameras because the optical overall length of the zoom lens. However, the zoom lens has a low zooming ratio of approximately 3, and a narrow view angle at a wide-angle limit of 56°. Accordingly, the demand for the compact digital cameras in which a zooming ratio becomes higher in recent years cannot be satisfied.

The zoom lens disclosed in Japanese Laid-Open Patent Publication No. 2006-227197 has a high optical performance, and a high zooming ratio of approximately 5. However, as same as the zoom lens disclosed in Japanese Laid-Open Patent Publication No. 2007-140359, the zoom lens has a narrow view angle at a wide-angle limit of 60°. Accordingly, the demand for the digital cameras in which a view angle becomes wide in recent years cannot be satisfied.

As same as the zoom lens disclosed in Japanese Laid-Open Patent Publication No. 2007-140359, the zoom lens disclosed in Japanese Patent No. 3589555 can achieve to reduce the further thickness of the compact digital cameras because the optical overall length of the zoom lens. However, the zoom lens has a low zooming ratio of approximately 3. Accordingly, the demand for the compact digital cameras in which a zooming ratio becomes higher in recent years cannot be satisfied.

As same as each of the zoom lenses disclosed in Japanese Laid-Open Patent Publication No. 2007-140359 and Japanese Patent No. 3589555, the zoom lens disclosed in Japanese Patent No. 3868092 can achieve to reduce the further thickness of the compact digital cameras because the optical overall length of the zoom lens. However, the zoom lens has a low zooming ratio of approximately 3. Accordingly, the demand for the compact digital cameras in which a zooming ratio becomes higher in recent years cannot be satisfied.

The object of the present invention is to provide: a zoom lens system having a high resolution with a short optical overall length and still having a view angle at a wide-angle limit of approximately 82°, that is satisfactorily applicable in wide-angle image taking, as well as a high zooming ratio of approximately 5; an imaging device employing the zoom lens system; and a thin and extremely compact camera employing the imaging device.

Solution to the Problems

One of the above-described objects is achieved by the following zoom lens system. That is, the present invention relates to:

a zoom lens system having a plurality of lens units, each lens unit being composed of at least one lens element, the zoom lens system, in order from an object side to an image side, comprising:

a first lens unit having negative optical power and being composed of at least two lens elements; and a second lens unit having positive optical power, wherein in zooming from a wide-angle limit to a telephoto limit at the time of image taking, the lens units are individually moved along an optical axis to vary magnification such that an interval between the first lens unit and the second lens unit decreases, and the following conditions (1) and (a) are satisfied:

$$f_W/D_1 > 7.5 \tag{1}$$

$$Z = f_T/f_W > 4.0 \tag{a}$$

where, $f_W$ is a focal length of the entire system at a wide-angle limit, $f_T$ is a focal length of the entire system at a telephoto limit, and $D_1$ is a center thickness of a lens element located on the most object side in the first lens unit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system having a plurality of lens units, each lens unit being composed of at least one lens element, the zoom lens system, in order from an object side to an image side, comprises:

a first lens unit having negative optical power and being composed of at least two lens elements; and a second lens unit having positive optical power, in which in zooming from a wide-angle limit to a telephoto limit at the time of image taking, the lens units are individually moved along an optical axis to vary magnification such that an interval between the first lens unit and the second lens unit decreases, and the following conditions (1) and (a) are satisfied:

$$f_W/D_1 > 7.5 \tag{1}$$

$$Z = f_T/f_W > 4.0 \tag{a}$$

where, $f_W$ is a focal length of the entire system at a wide-angle limit, $f_T$ is a focal length of the entire system at a telephoto limit, and $D_1$ is a center thickness of a lens element located on the most object side in the first lens unit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system having a plurality of lens units, each lens unit being composed of at least one lens element, the zoom lens system, in order from an object side to an image side, comprises:

a first lens unit having negative optical power and being composed of at least two lens elements; and a second lens unit having positive optical power, in which in zooming from a wide-angle limit to a telephoto limit at the time of image taking, the lens units are individually moved along an optical axis to vary magnification such that an interval between the first lens unit and the second lens unit decreases, and the following conditions (1) and (a) are satisfied:

$$f_W/D_1 > 7.5 \tag{1}$$

$$Z = f_T/f_W > 4.0 \tag{a}$$

where, $f_W$ is a focal length of the entire system at a wide-angle limit, $f_T$ is a focal length of the entire system at a telephoto limit, and $D_1$ is a center thickness of a lens element located on the most object side in the first lens unit.

Effects of the Invention

According to the present invention, it is possible to provide a zoom lens system having a high resolution with a short optical overall length and still having a view angle at a wide-angle limit of approximately 82°, that is satisfactorily applicable in wide-angle image taking, as well as a high zooming ratio of approximately 5. According to the present invention, it is possible to further provide an imaging device employing the zoom lens system, and a thin and extremely compact camera employing the imaging device.

EMBODIMENTS OF THE INVENTION

Embodiments 1 to 10

FIGS. 1, 4, 7, 10, 13, 16, 19, 22, 25, and 28 are lens arrangement diagrams of zoom lens systems according to Embodiments 1 to 10, respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 4, 7, 10, 13, 16, 19, 22, 25, and 28, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the third lens unit G3, or between the image surface S and the most image side lens surface of the fourth lens unit G4), a plane parallel plate equivalent to an optical low-pass filter or a face plate of an image sensor is provided.

Further, in FIGS. 1, 4, 7, 10, 13, 16, 19, 22, 25, and 28, an aperture diaphragm A is provided between the second lens unit G2 and the third lens unit G3. In zooming from a wide-angle limit to a telephoto limit at the time of image taking, the aperture diaphragm A moves along the optical axis integrally with the second lens unit G2.

Figure 1:
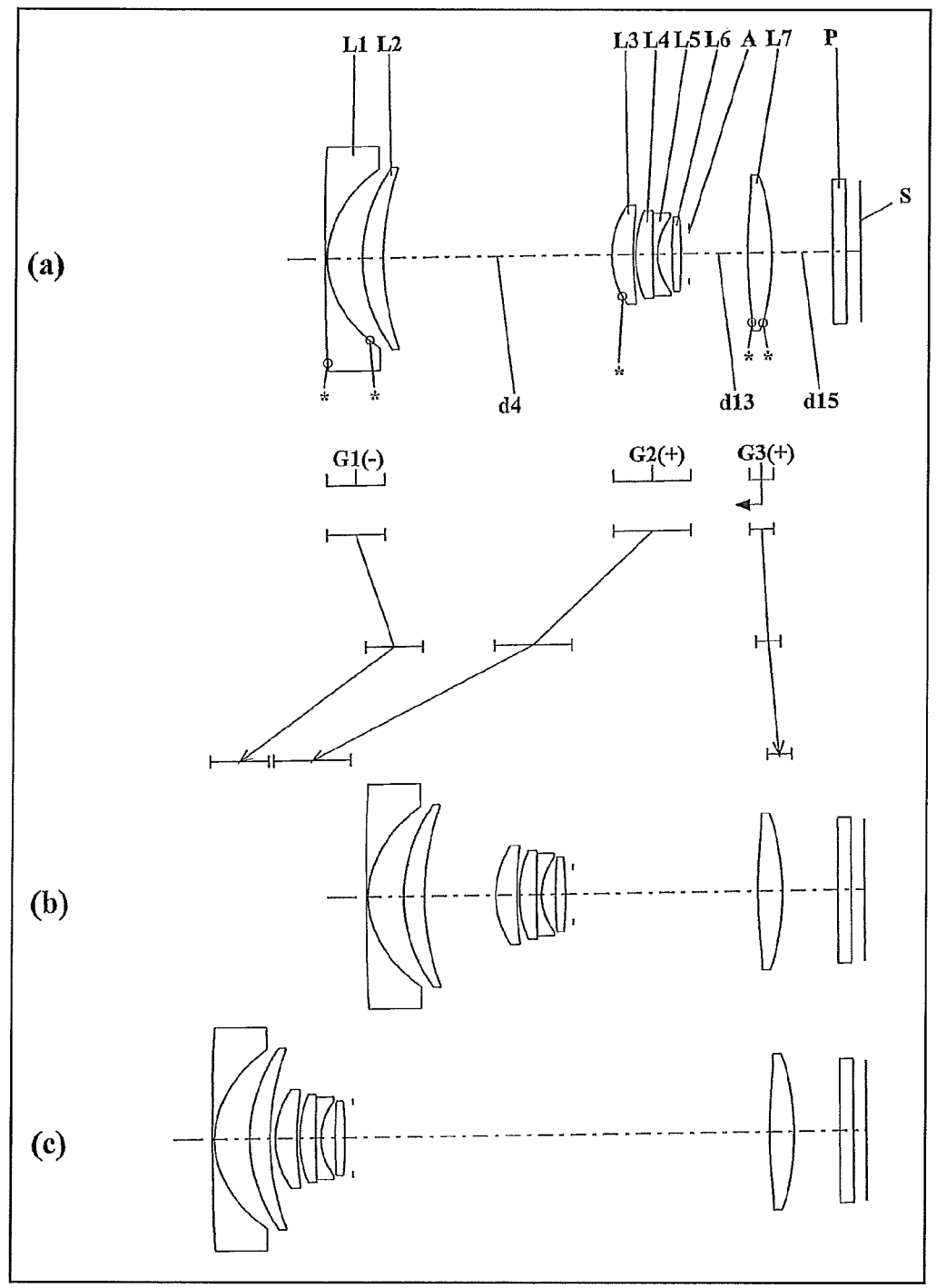
FIG. 1 is a lens arrangement diagram showing an infinity in-focus condition of a zoom lens system according to Embodiment 1 (Example 1).
Figure 2:
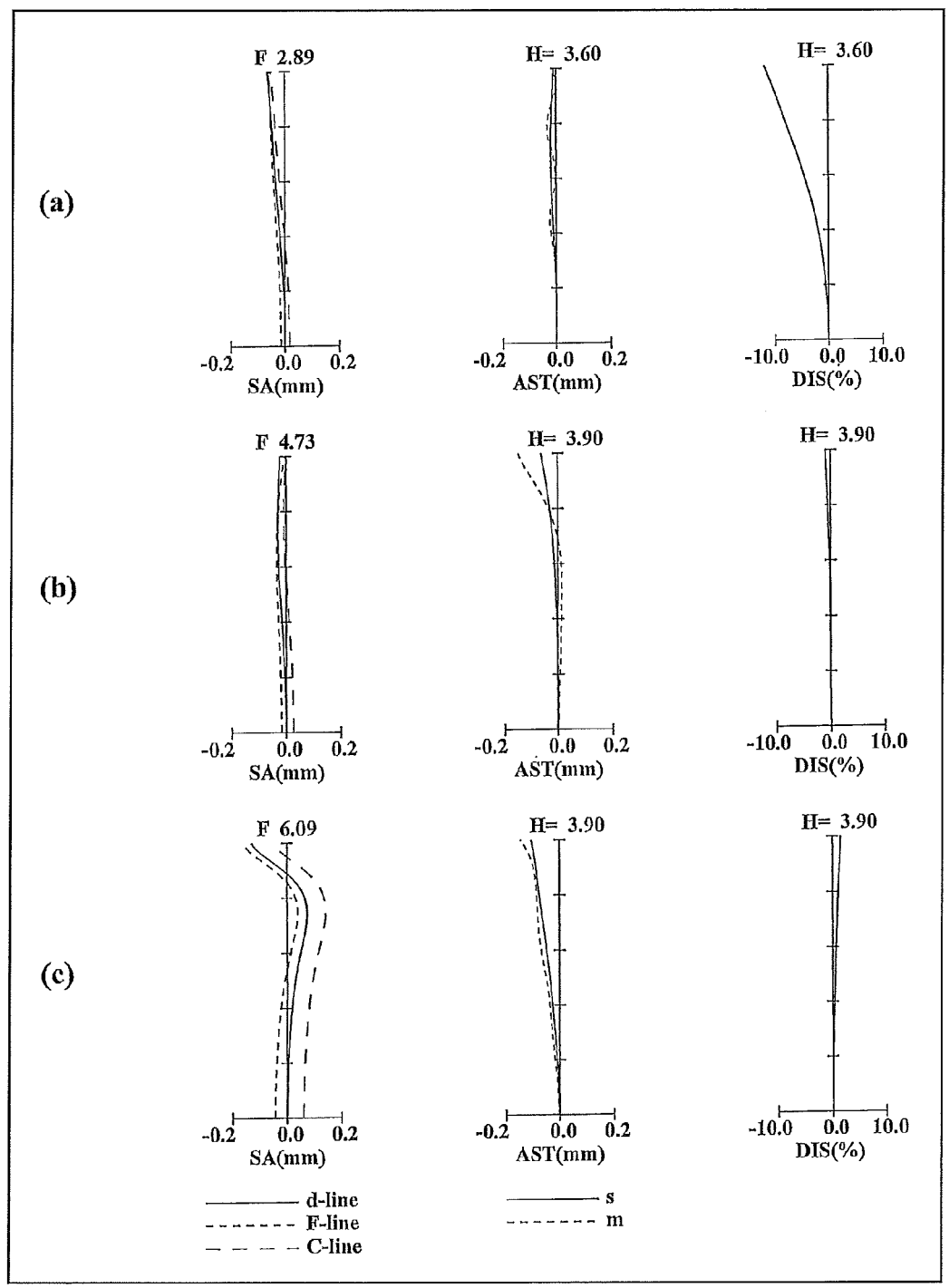
FIG. 2 is a longitudinal aberration diagram of an infinity in-focus condition of a zoom lens system according to Example 1.
Figure 3:
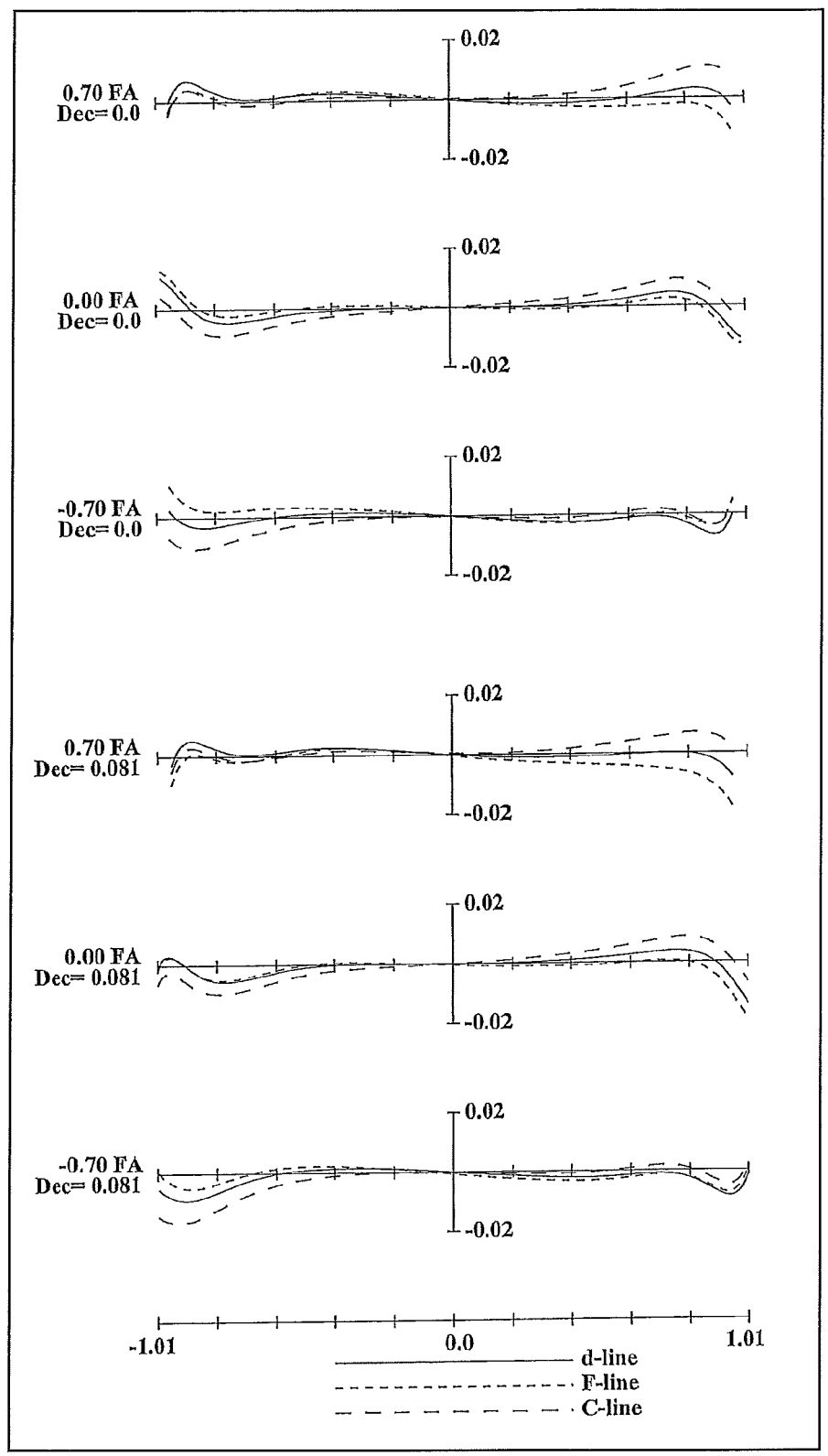
FIG. 3 is a lateral aberration diagram of a zoom lens system according to Example 1 at a telephoto limit in a basic state where image blur compensation is not performed and in a blur compensation state.

As shown in FIG. 1, in the zoom lens system according to Embodiment 1, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 1, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 1, the third lens unit G3 comprises solely a bi-convex seventh lens element L7. The seventh lens element L7 has two aspheric surfaces.

In the zoom lens system according to Embodiment 1, a plane parallel plate P is provided on the object side relative to the image surface S (between the image surface S and the seventh lens element L7).

In the zoom lens system according to Embodiment 1, in zooming from a wide-angle limit to a telephoto limit at the time of image taking, the first lens unit G1 moves to the object side with locus of a convex to the image side, the second lens unit G2 monotonically moves to the object side, and the third lens unit G3 monotonically moves to the image side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 4:
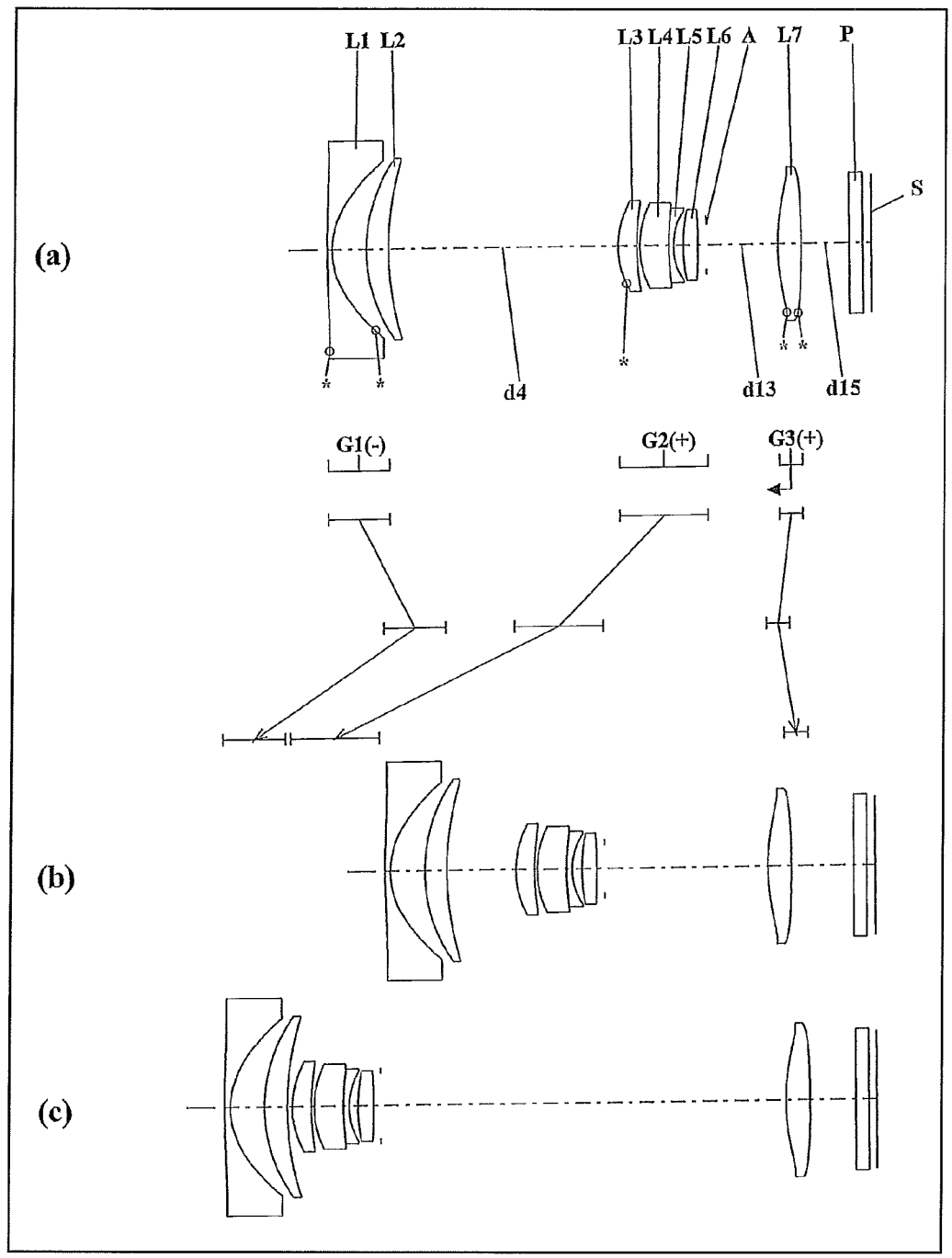
FIG. 4 is a lens arrangement diagram showing an infinity in-focus condition of a zoom lens system according to Embodiment 2 (Example 2).
Figure 5:
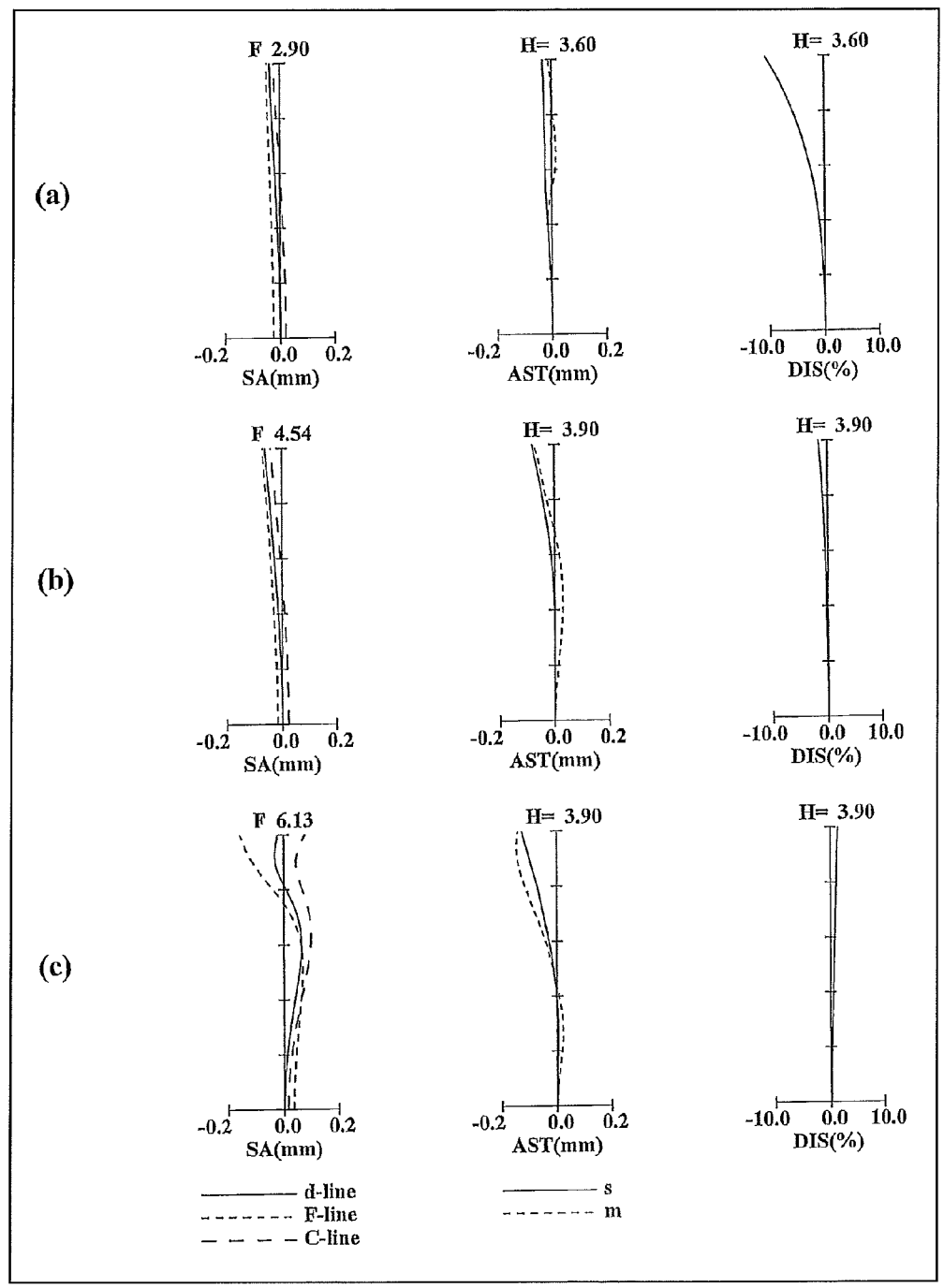
FIG. 5 is a longitudinal aberration diagram of an infinity in-focus condition of a zoom lens system according to Example 2.
Figure 6:
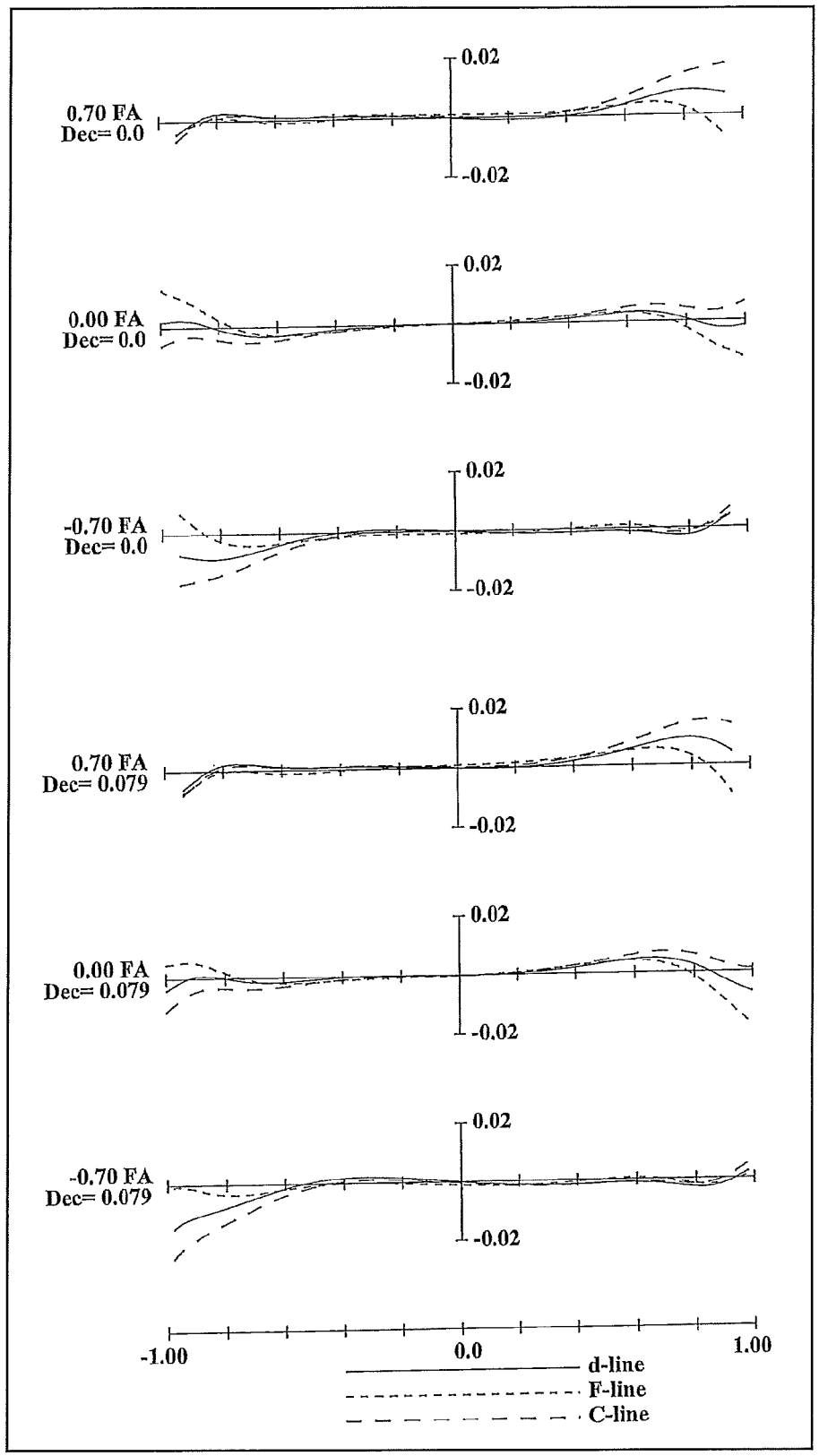
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 2, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 2, the third lens unit G3 comprises solely a bi-convex seventh lens element L7. The seventh lens element L7 has two aspheric surfaces.

In the zoom lens system according to Embodiment 2, a plane parallel plate P is provided on the object side relative to the image surface S (between the image surface S and the seventh lens element L7).

In the zoom lens system according to Embodiment 2, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 7:
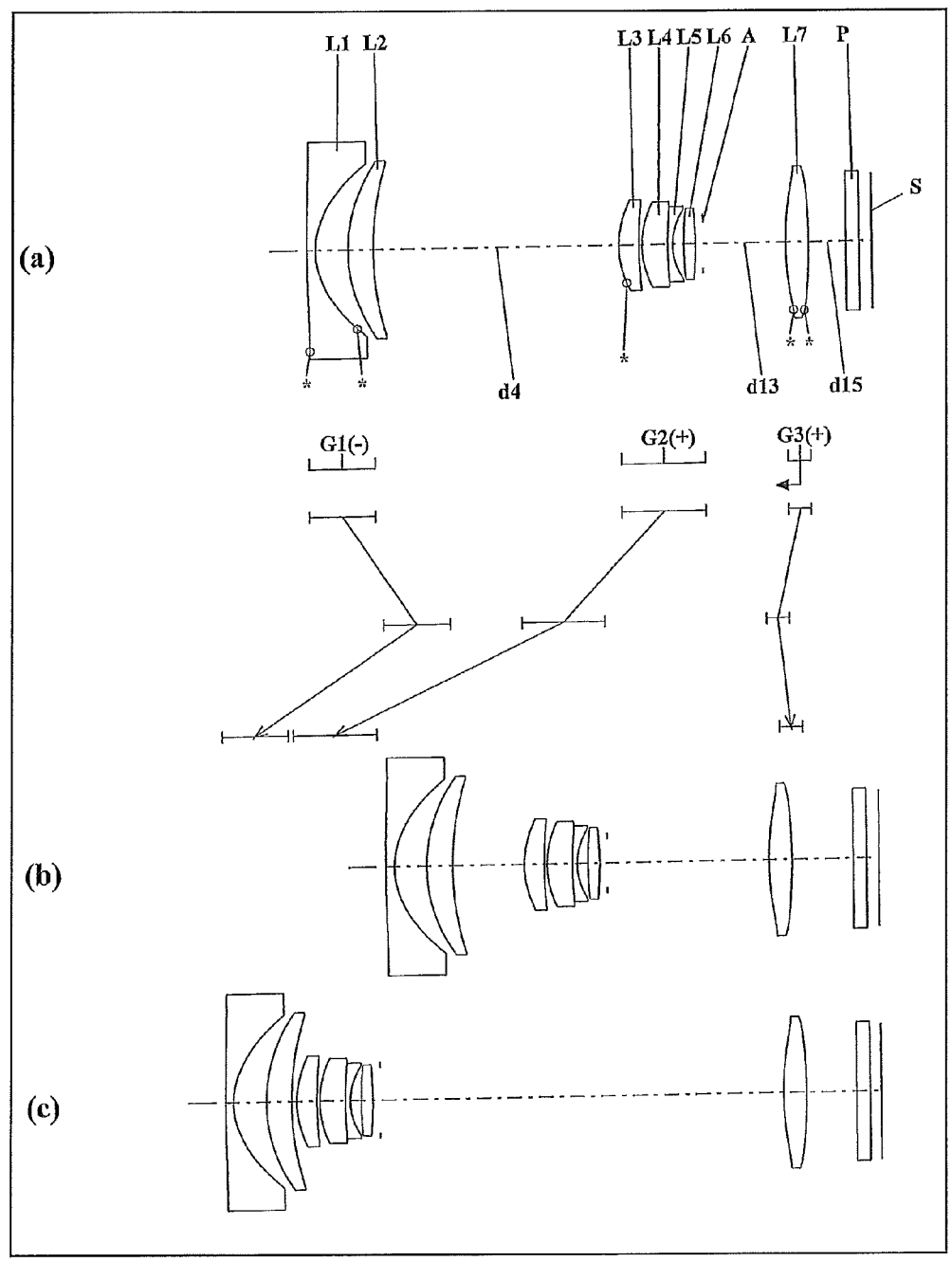
FIG. 7 is a lens arrangement diagram showing an infinity in-focus condition of a zoom lens system according to Embodiment 3 (Example 3).
Figure 8:
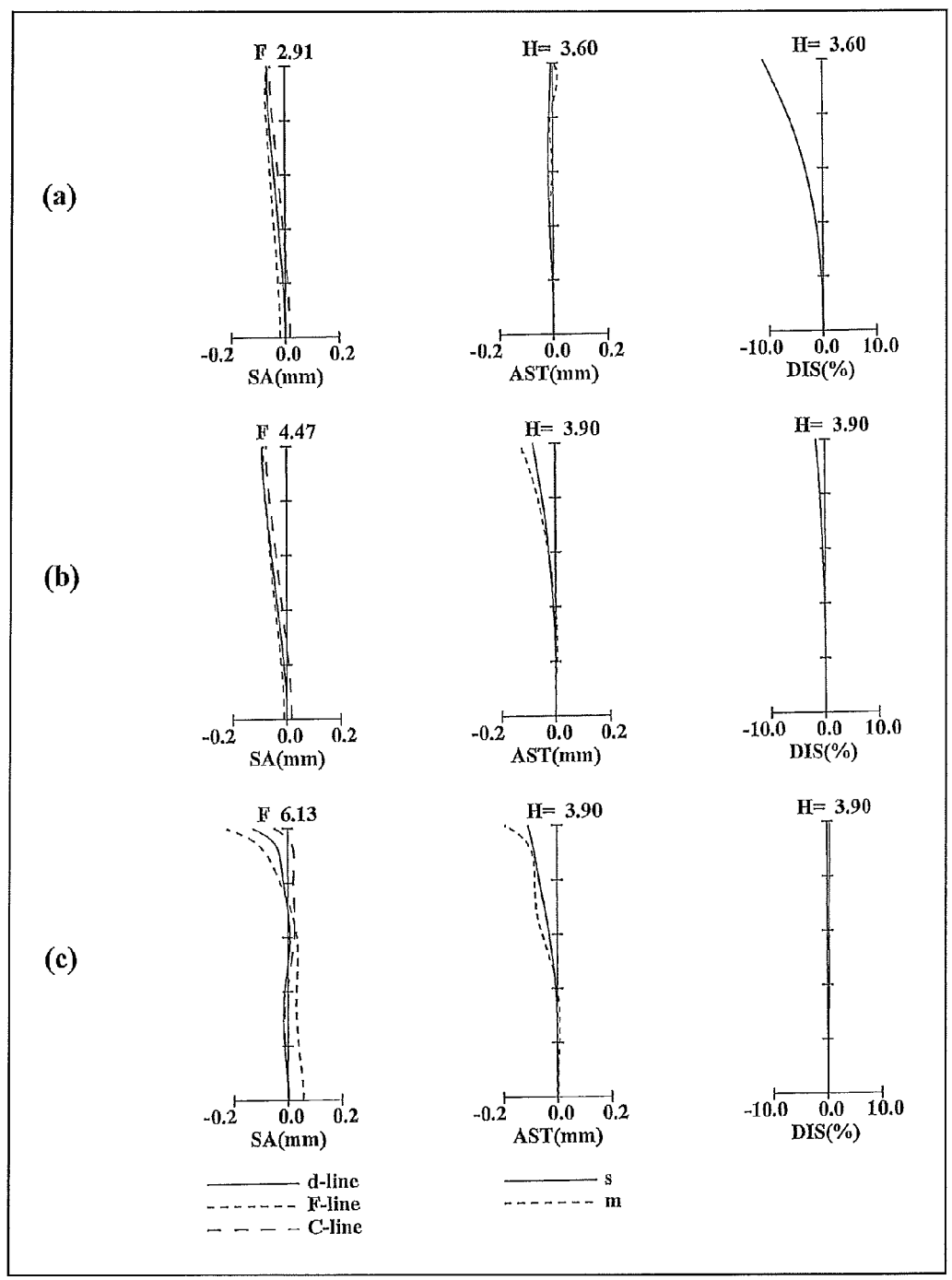
FIG. 8 is a longitudinal aberration diagram of an infinity in-focus condition of a zoom lens system according to Example 3.
Figure 9:
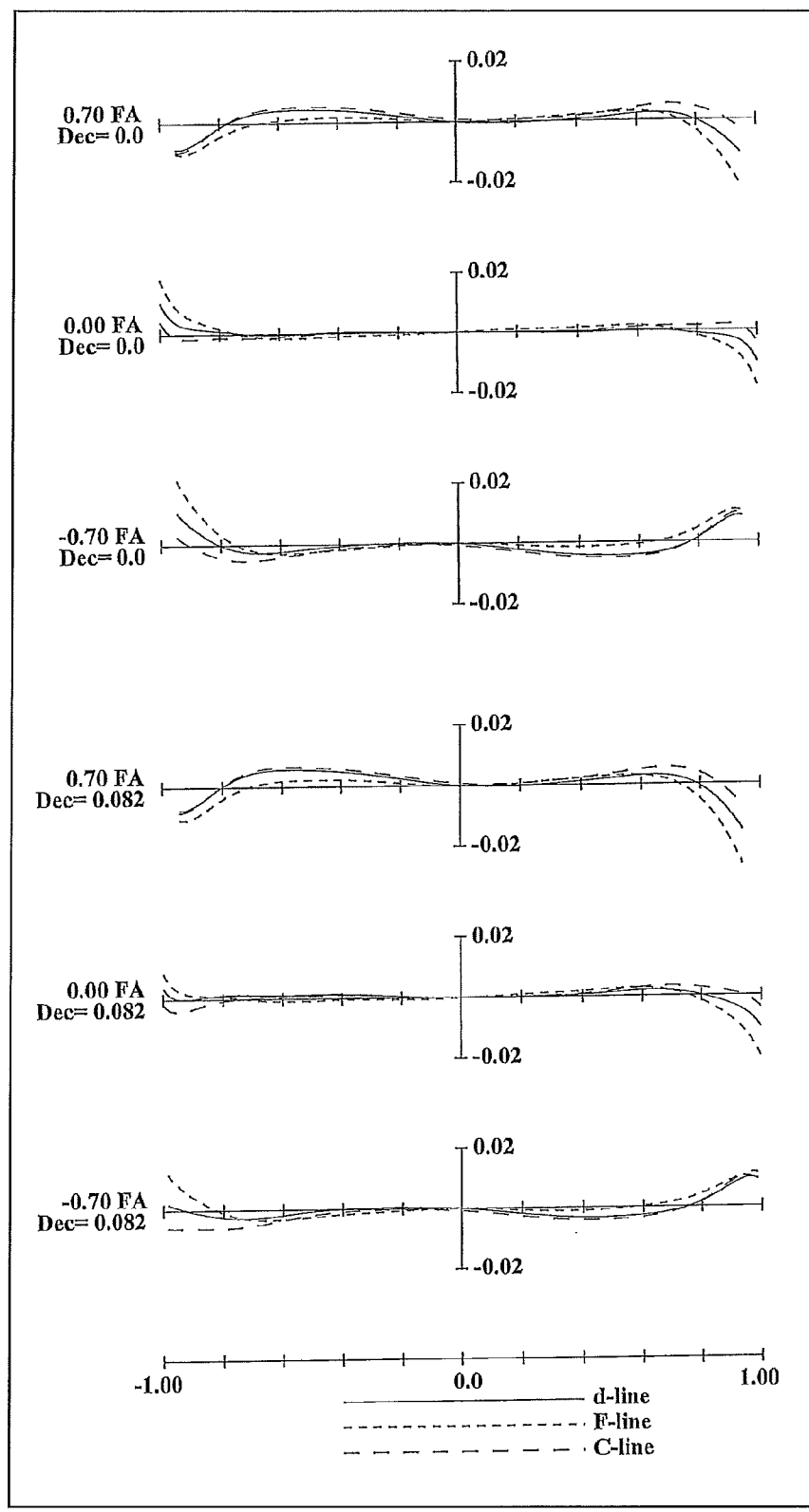
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 3, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 3, the third lens unit G3 comprises solely a bi-convex seventh lens element L7. The seventh lens element L7 has two aspheric surfaces.

In the zoom lens system according to Embodiment 3, a plane parallel plate P is provided on the object side relative to the image surface S (between the image surface S and the seventh lens element L7).

In the zoom lens system according to Embodiment 3, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 10:
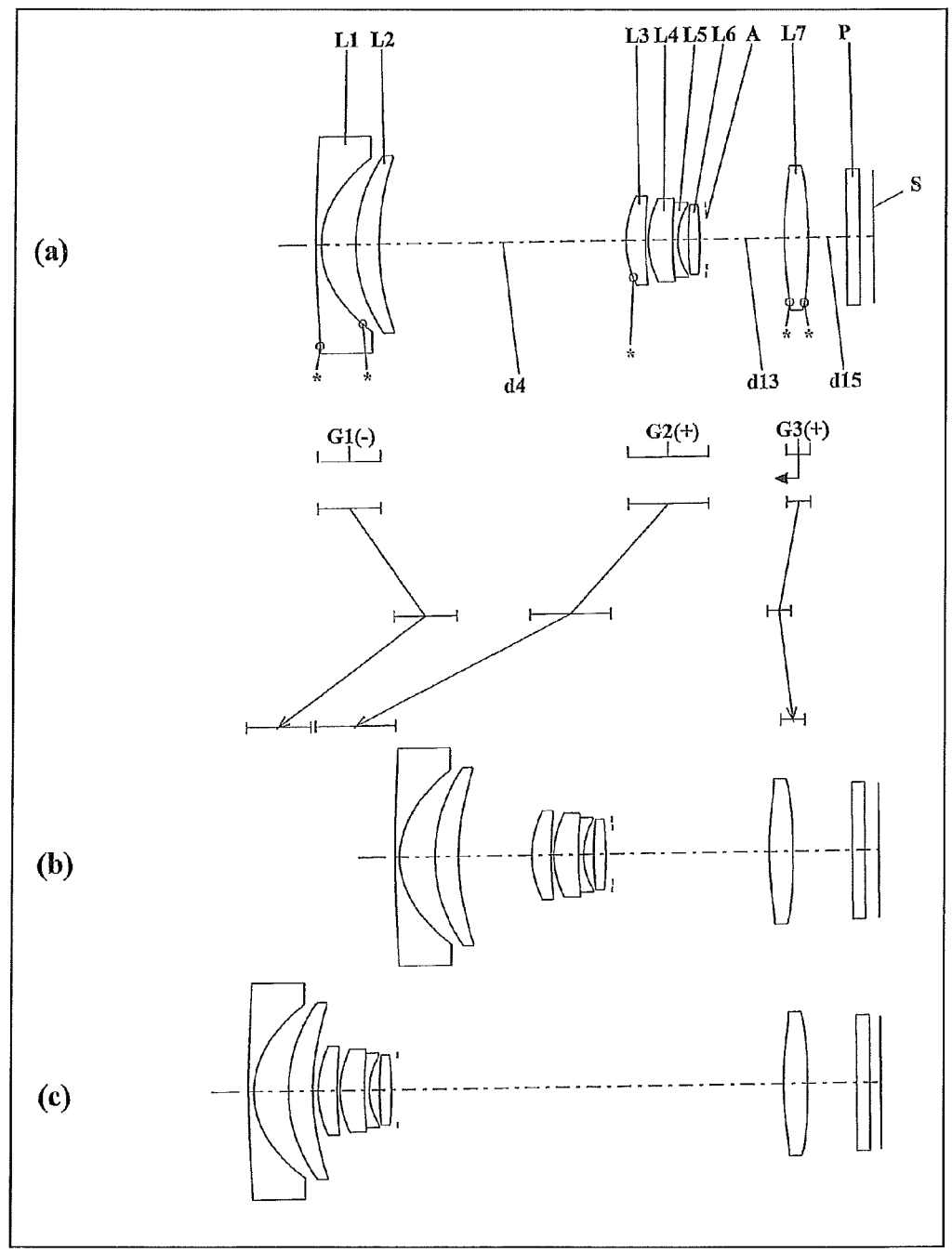
FIG. 10 is a lens arrangement diagram showing an infinity in-focus condition of a zoom lens system according to Embodiment 4 (Example 4).
Figure 11:
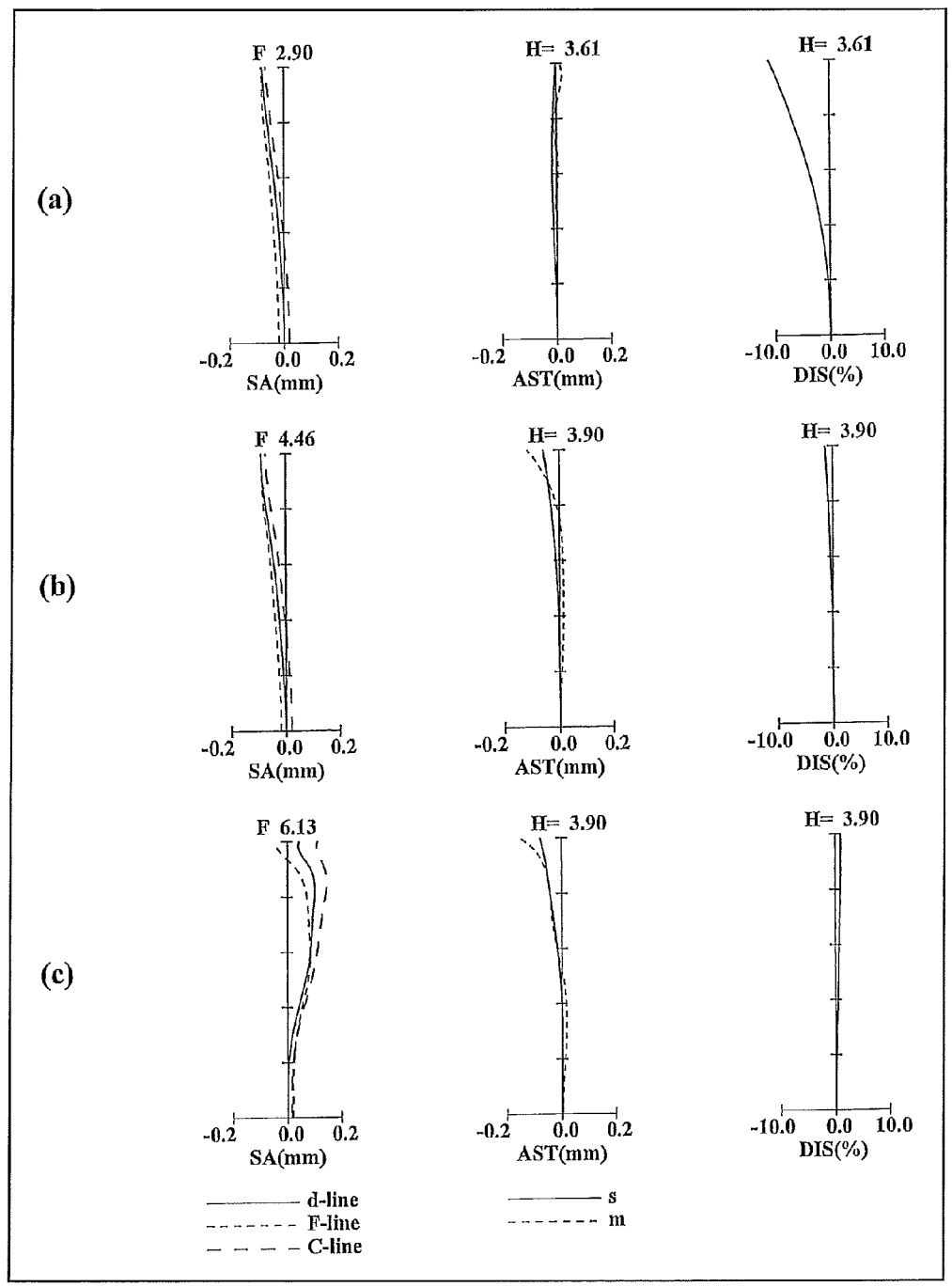
FIG. 11 is a longitudinal aberration diagram of an infinity in-focus condition of a zoom lens system according to Example 4.
Figure 12:
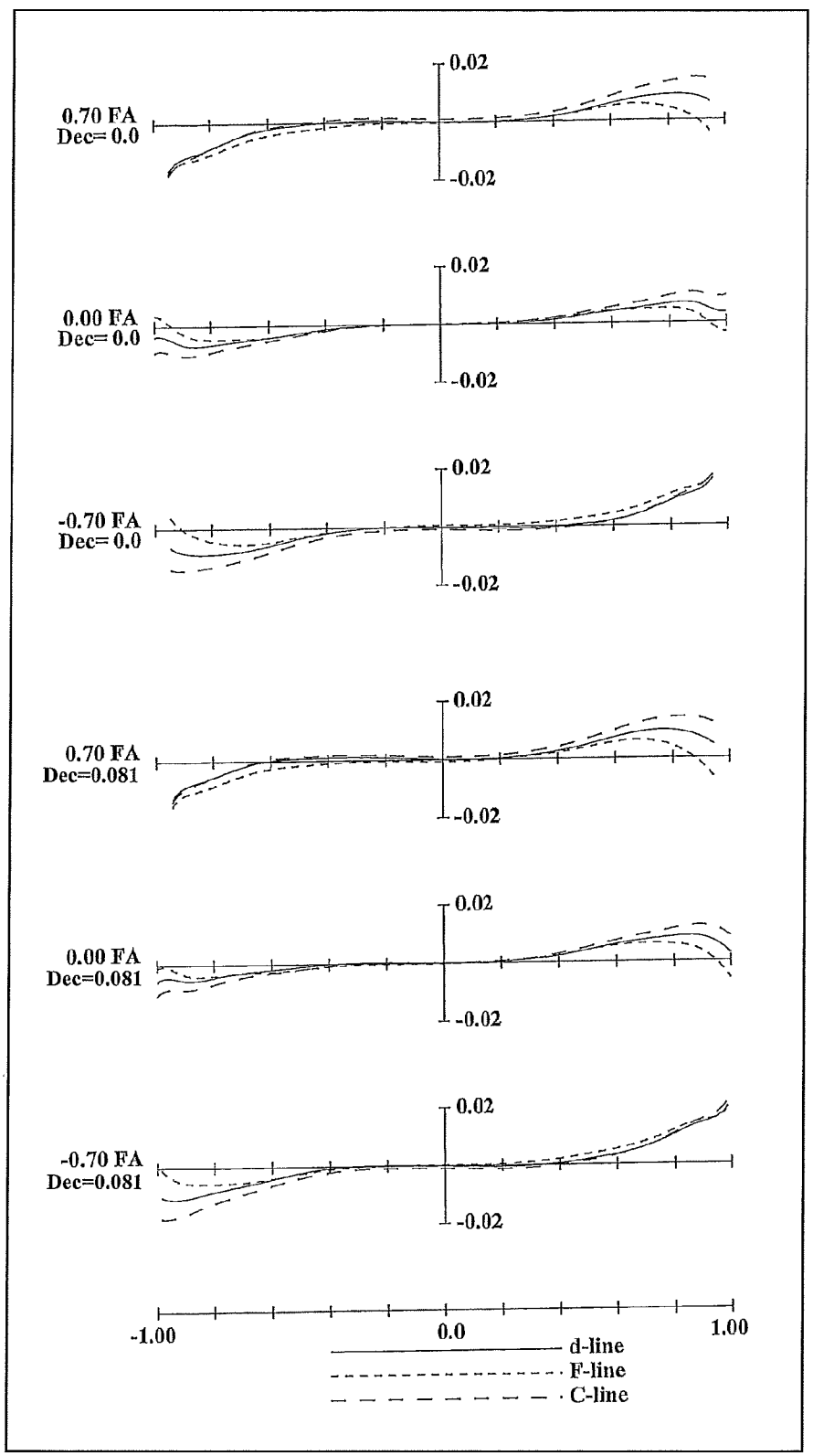
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 4, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 4, the third lens unit G3 comprises solely a bi-convex seventh lens element L7. The seventh lens element L7 has two aspheric surfaces. Further, the seventh lens element L7 is made of a resin material.

In the zoom lens system according to Embodiment 4, a plane parallel plate P is provided on the object side relative to the image surface S (between the image surface S and the seventh lens element L7).

In the zoom lens system according to Embodiment 4, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 13:
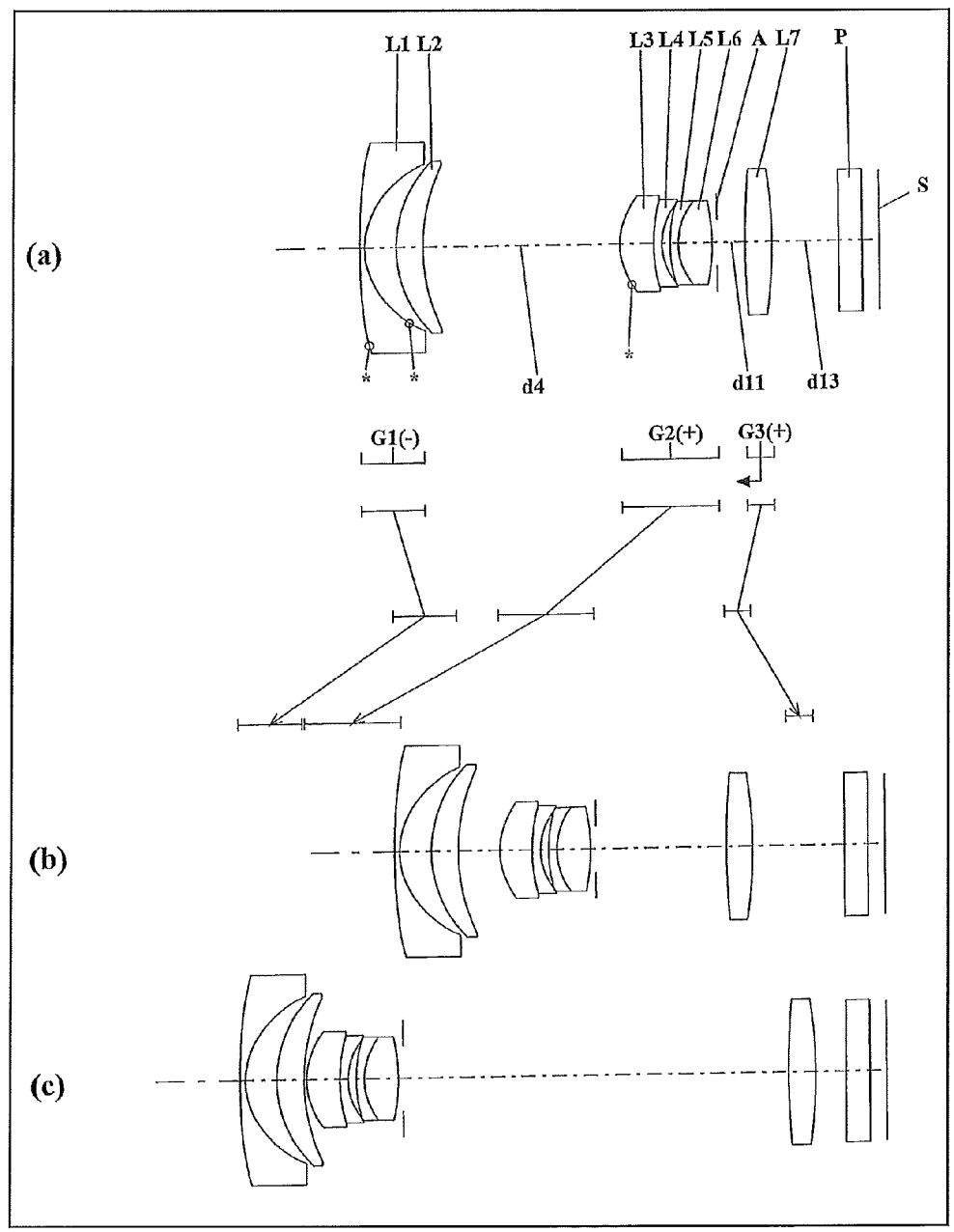
FIG. 13 is a lens arrangement diagram showing an infinity in-focus condition of a zoom lens system according to Embodiment 5 (Example 5).
Figure 14:
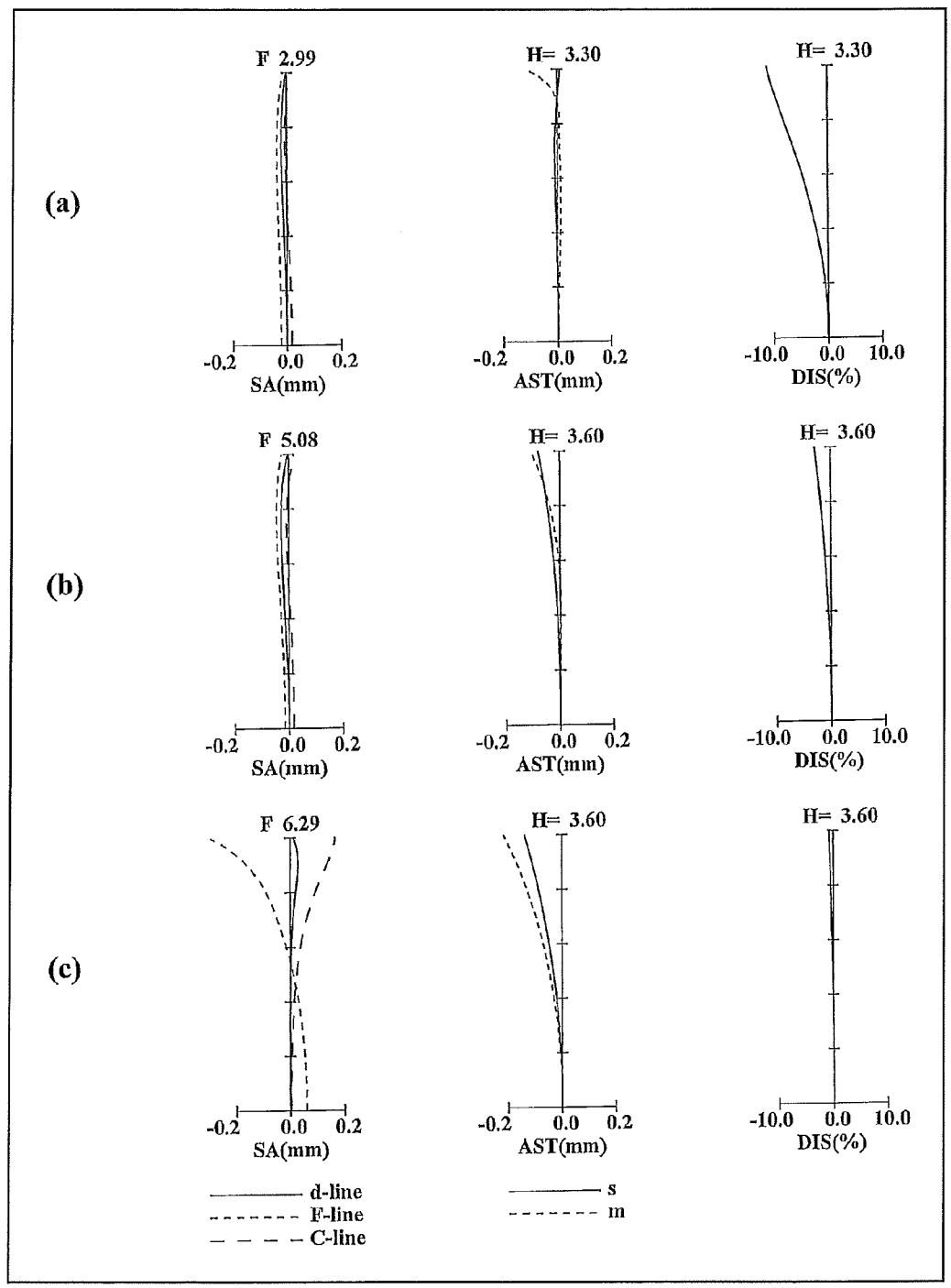
FIG. 14 is a longitudinal aberration diagram of an infinity in-focus condition of a zoom lens system according to Example 5.
Figure 15:
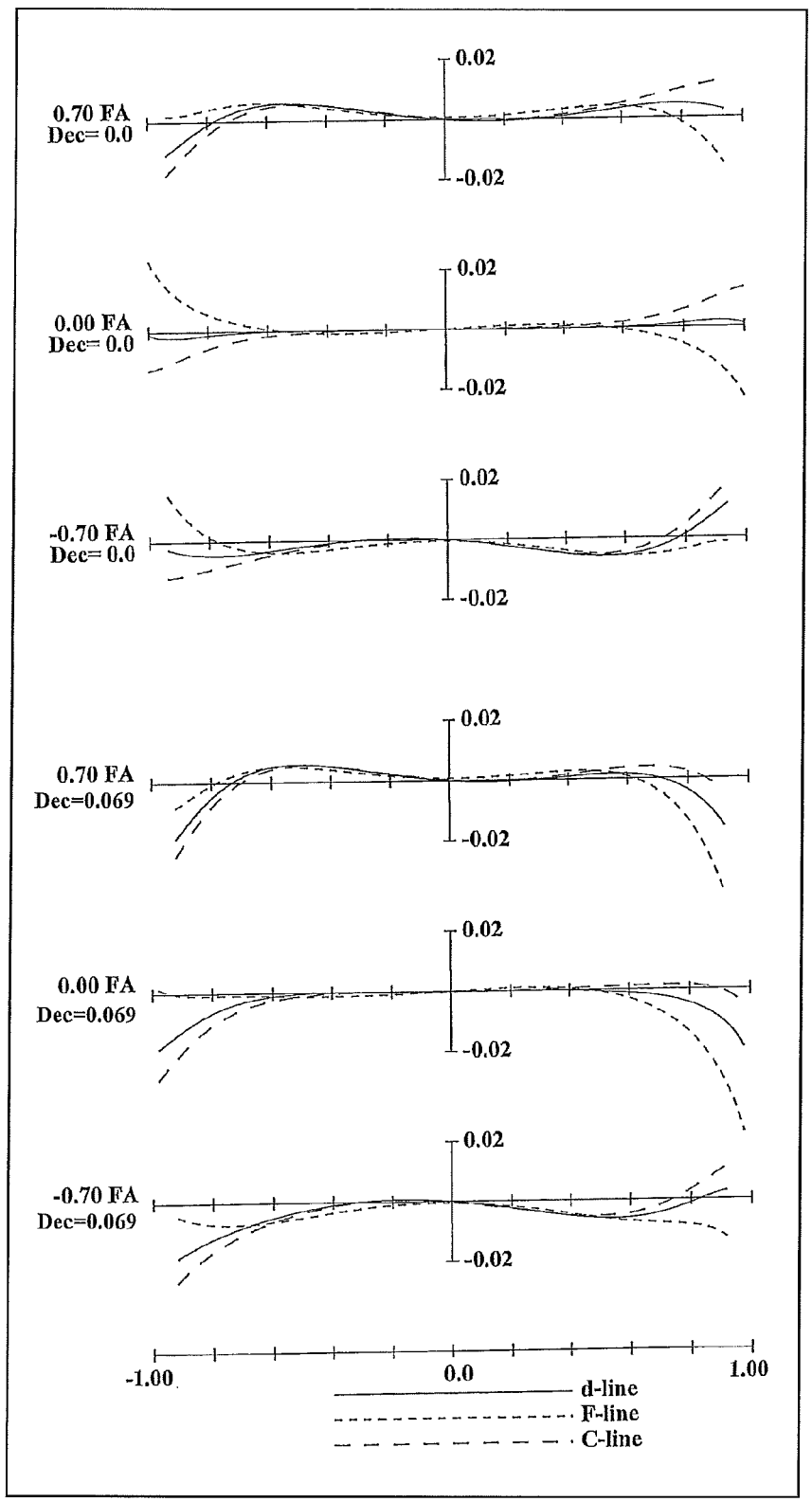
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 5, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

In the zoom lens system according to Embodiment 5, the third lens unit G3 comprises solely a bi-convex seventh lens element L7.

In the zoom lens system according to Embodiment 5, a plane parallel plate P is provided on the object side relative to the image surface S (between the image surface S and the seventh lens element L7).

In the zoom lens system according to Embodiment 5, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 16:
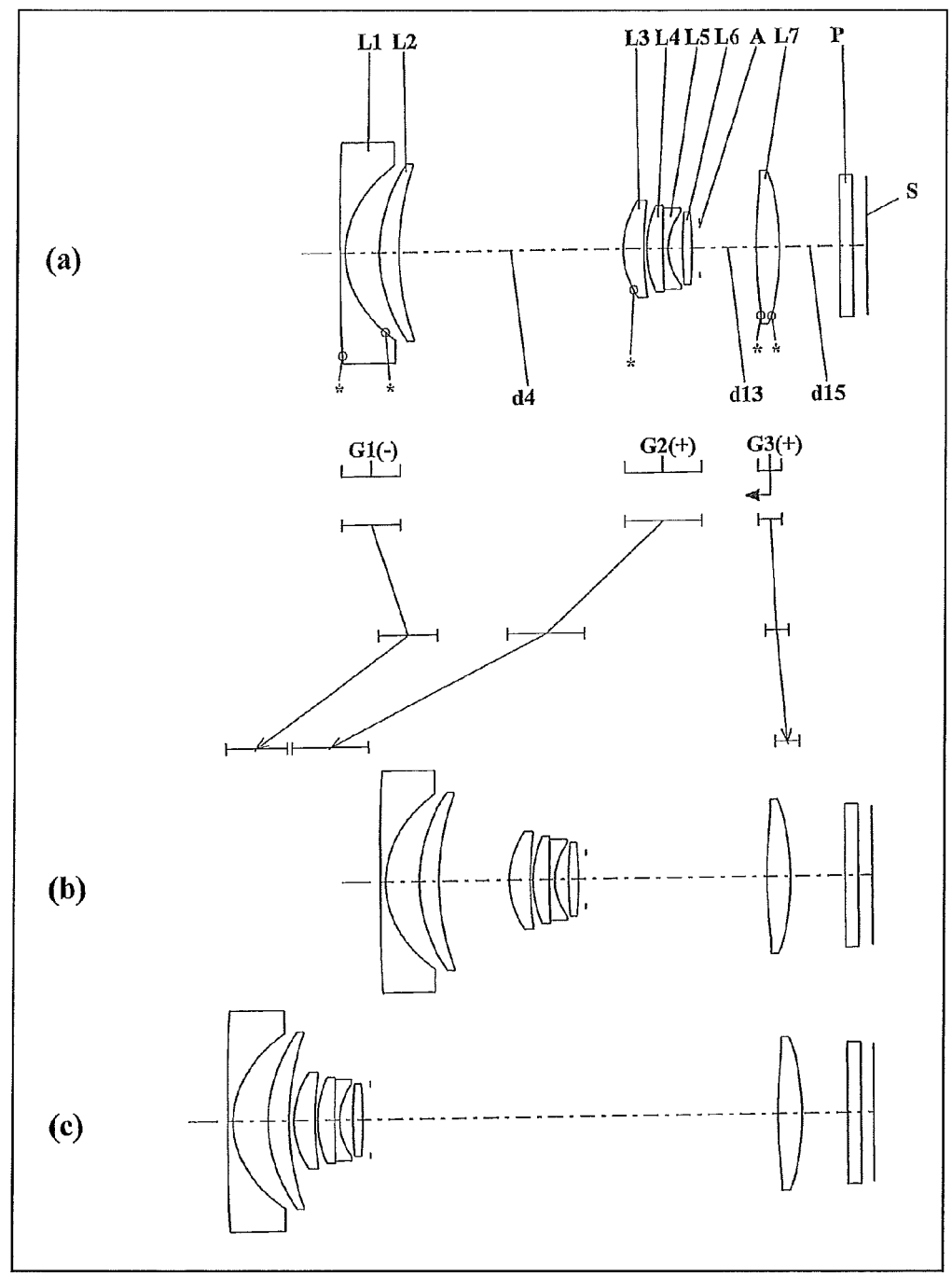
FIG. 16 is a lens arrangement diagram showing an infinity in-focus condition of a zoom lens system according to Embodiment 6 (Example 6).
Figure 17:
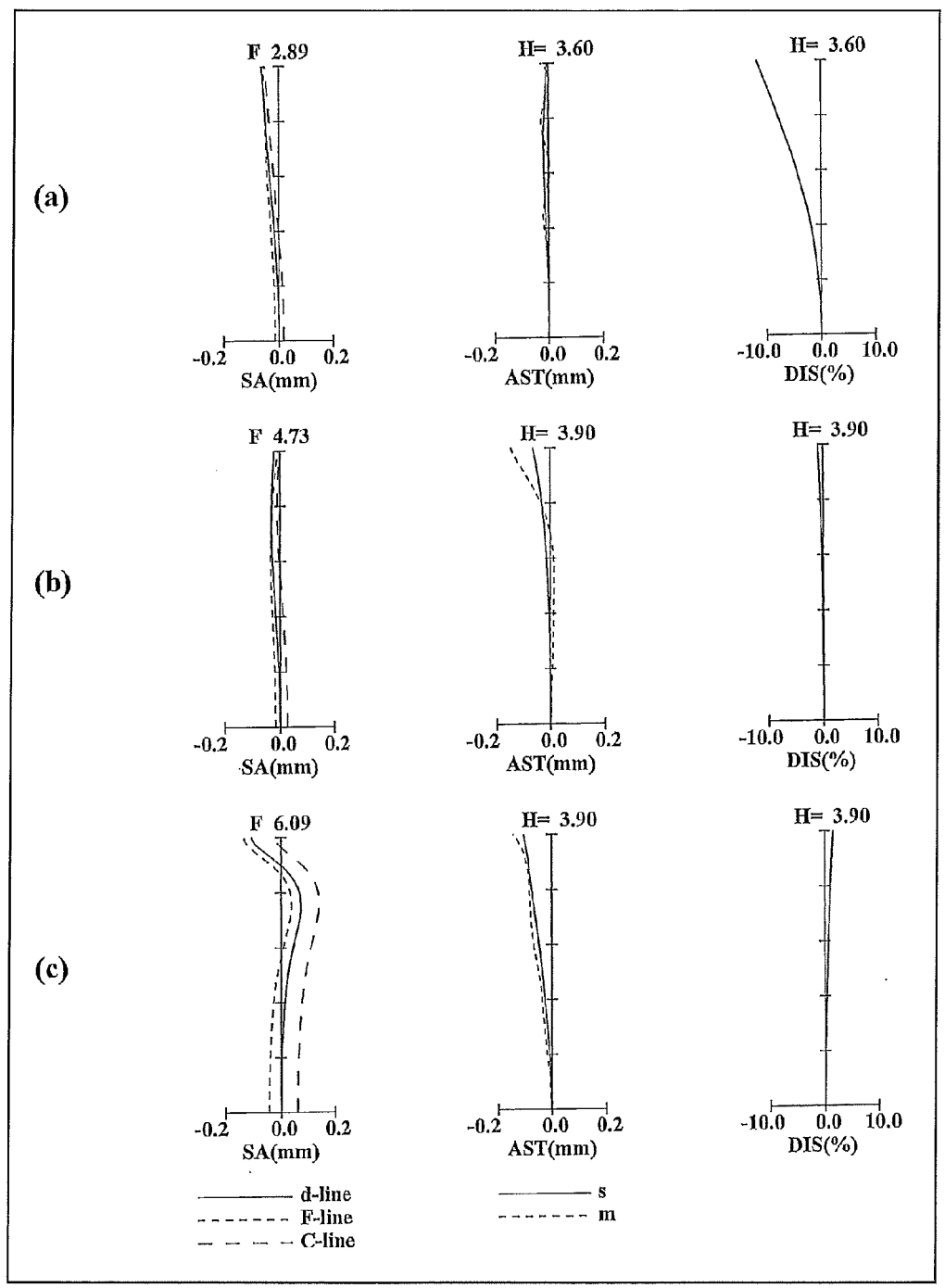
FIG. 17 is a longitudinal aberration diagram of an infinity in-focus condition of a zoom lens system according to Example 6.
Figure 18:
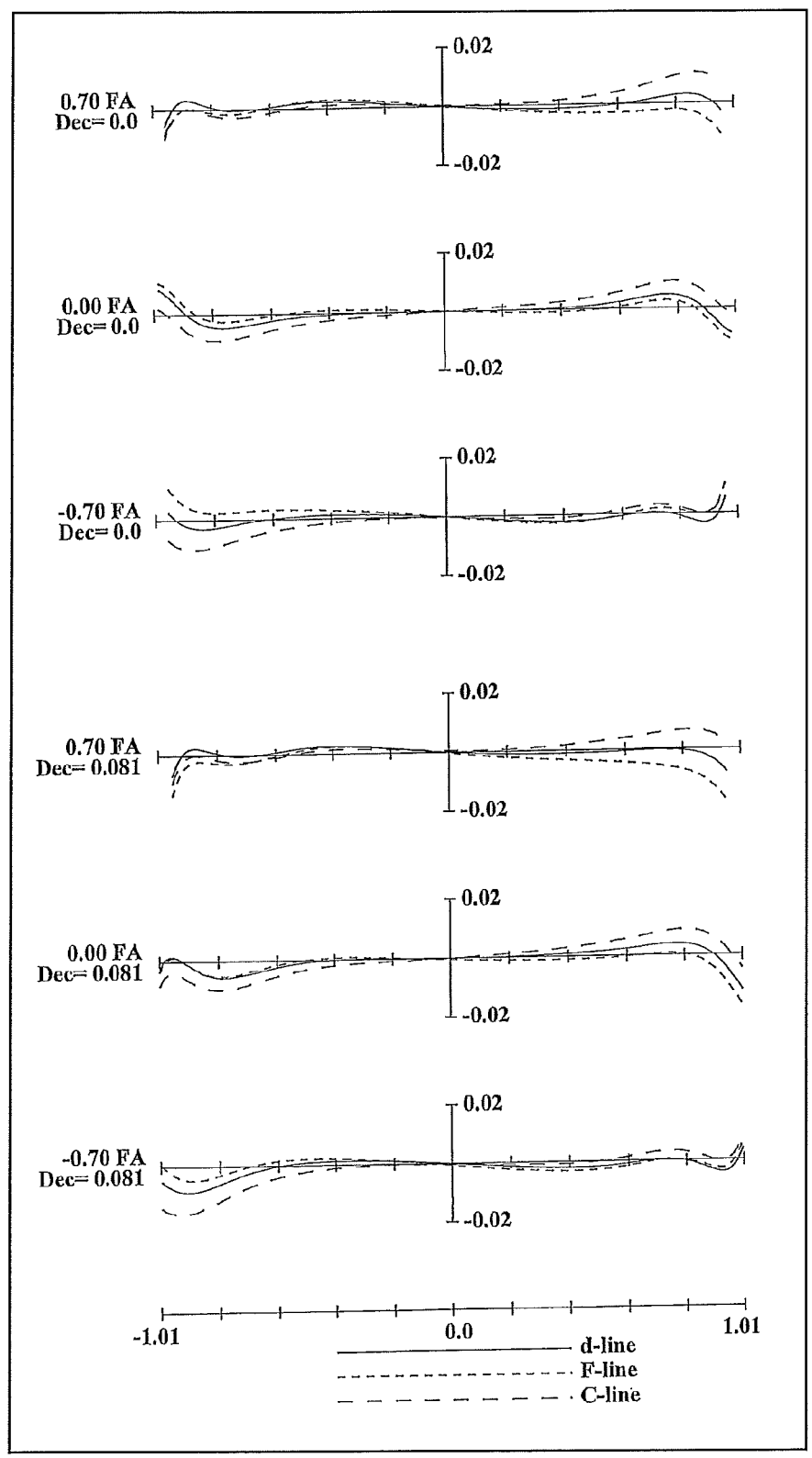
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 6, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 6, the third lens unit G3 comprises solely a bi-convex seventh lens element L7. The seventh lens element L7 has two aspheric surfaces.

In the zoom lens system according to Embodiment 6, a plane parallel plate P is provided on the object side relative to the image surface S (between the image surface S and the seventh lens element L7).

In the zoom lens system according to Embodiment 6, in zooming from a wide-angle limit to a telephoto limit at the time of image taking, the first lens unit G1 moves to the object side with locus of a convex to the image side, the second lens unit G2 monotonically moves to the object side, and the third lens unit G3 monotonically moves to the image side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 19:
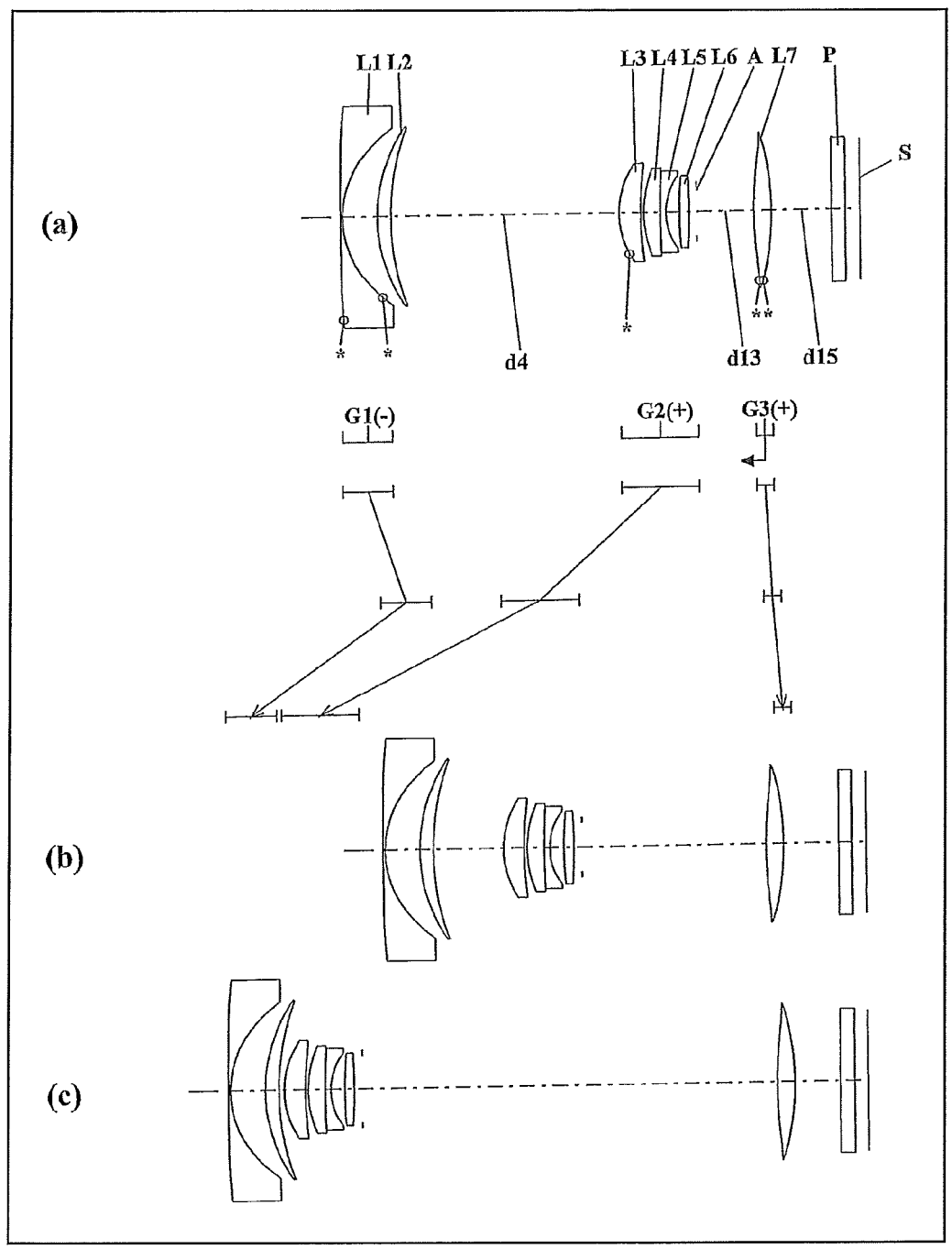
FIG. 19 is a lens arrangement diagram showing an infinity in-focus condition of a zoom lens system according to Embodiment 7 (Example 7).
Figure 20:
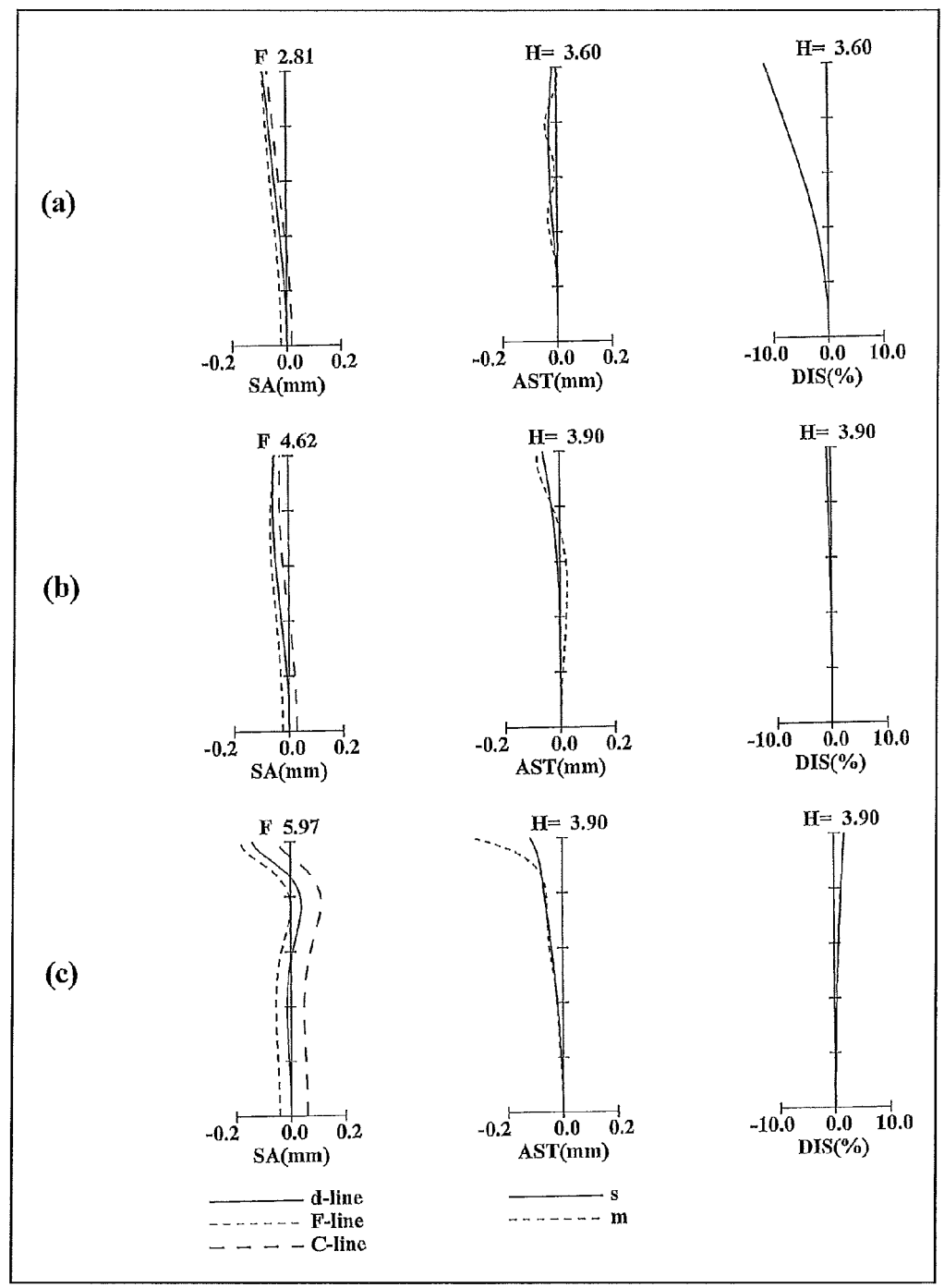
FIG. 20 is a longitudinal aberration diagram of an infinity in-focus condition of a zoom lens system according to Example 7.
Figure 21:
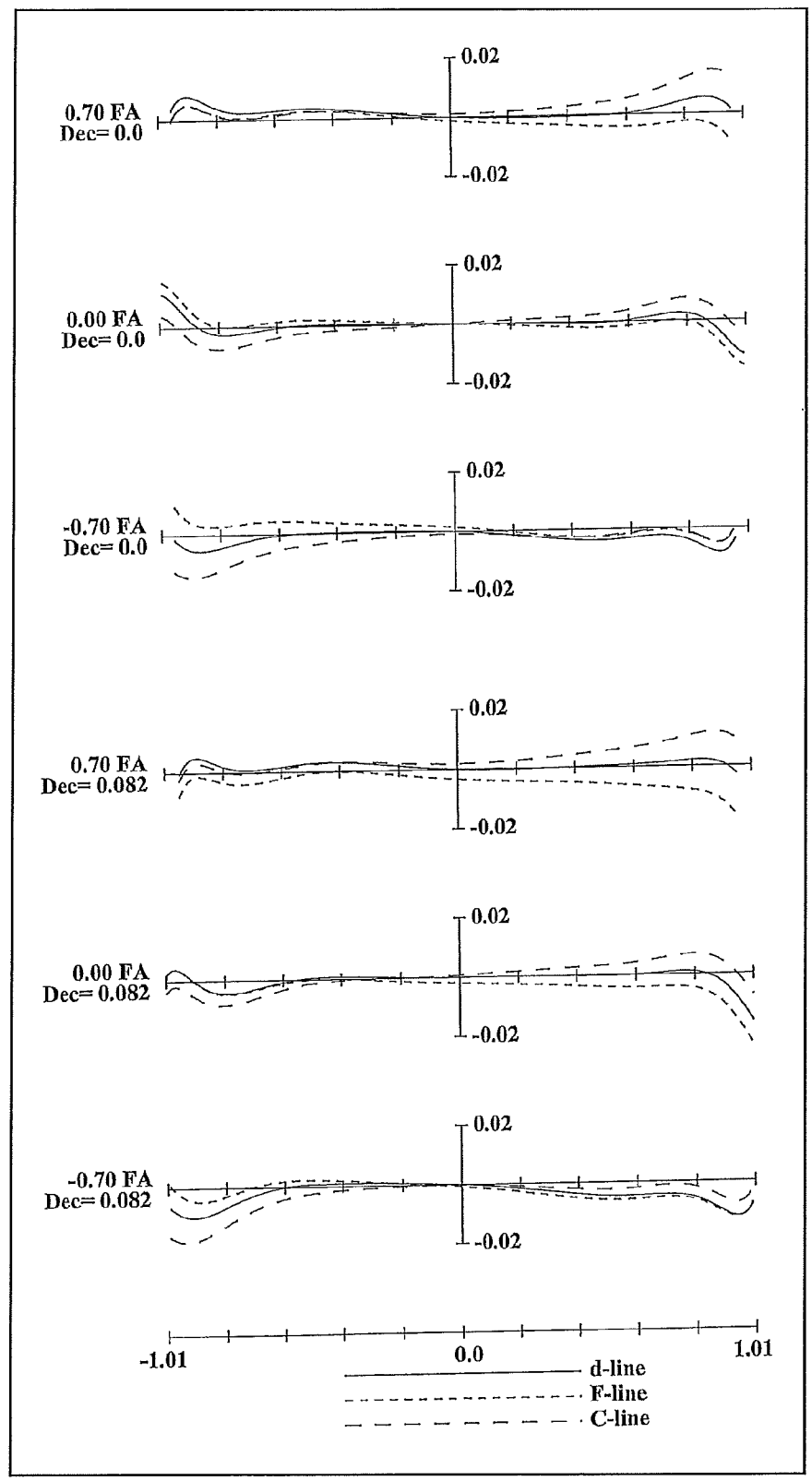
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 7, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 7, the third lens unit G3 comprises solely a bi-convex seventh lens element L7. The seventh lens element L7 has two aspheric surfaces.

In the zoom lens system according to Embodiment 7, a plane parallel plate P is provided on the object side relative to the image surface S (between the image surface S and the seventh lens element L7).

In the zoom lens system according to Embodiment 7, in zooming from a wide-angle limit to a telephoto limit at the time of image taking, the first lens unit G1 moves to the object side with locus of a convex to the image side, the second lens unit G2 monotonically moves to the object side, and the third lens unit G3 monotonically moves to the image side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 22:
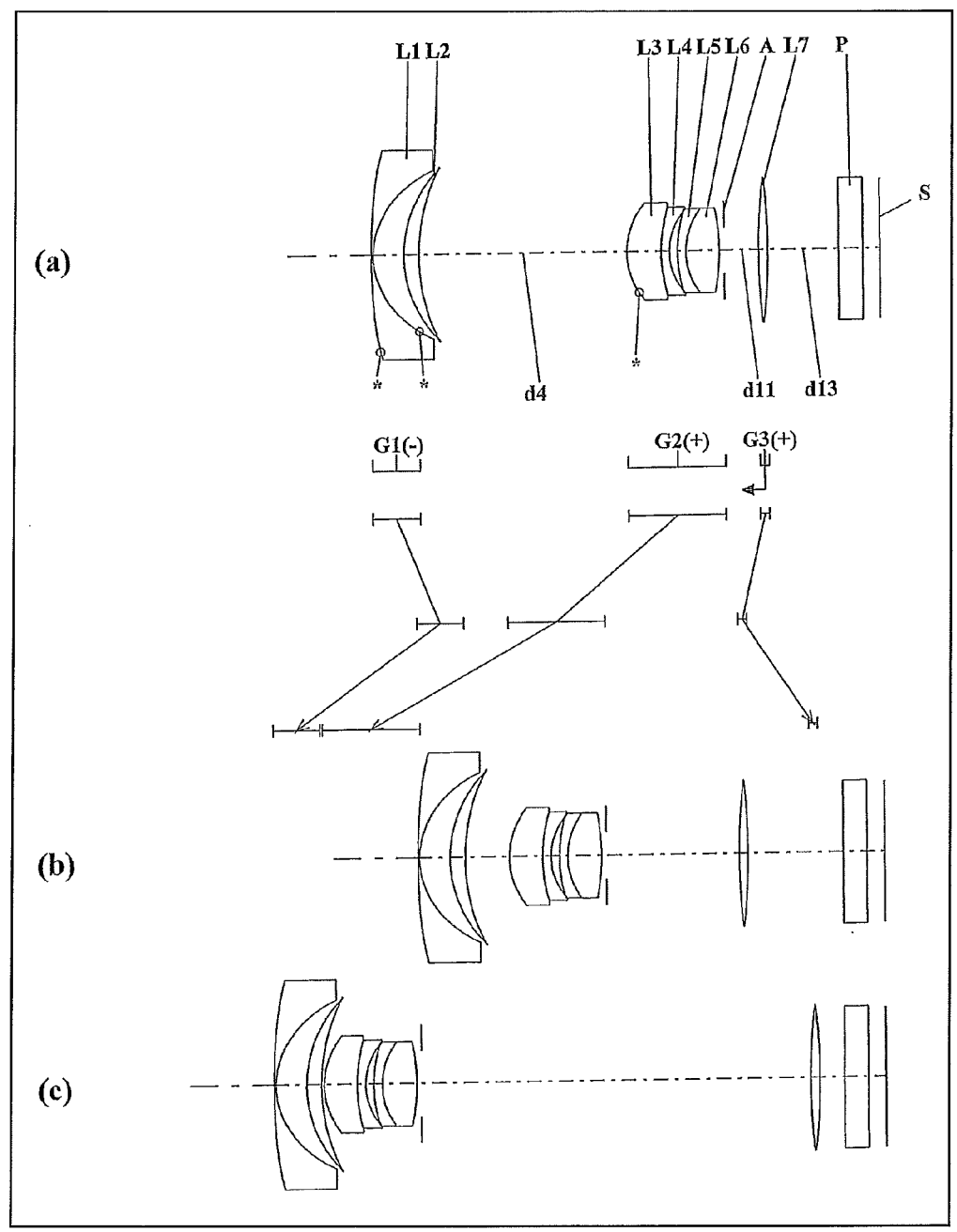
FIG. 22 is a lens arrangement diagram showing an infinity in-focus condition of a zoom lens system according to Embodiment 8 (Example 8).
Figure 23:
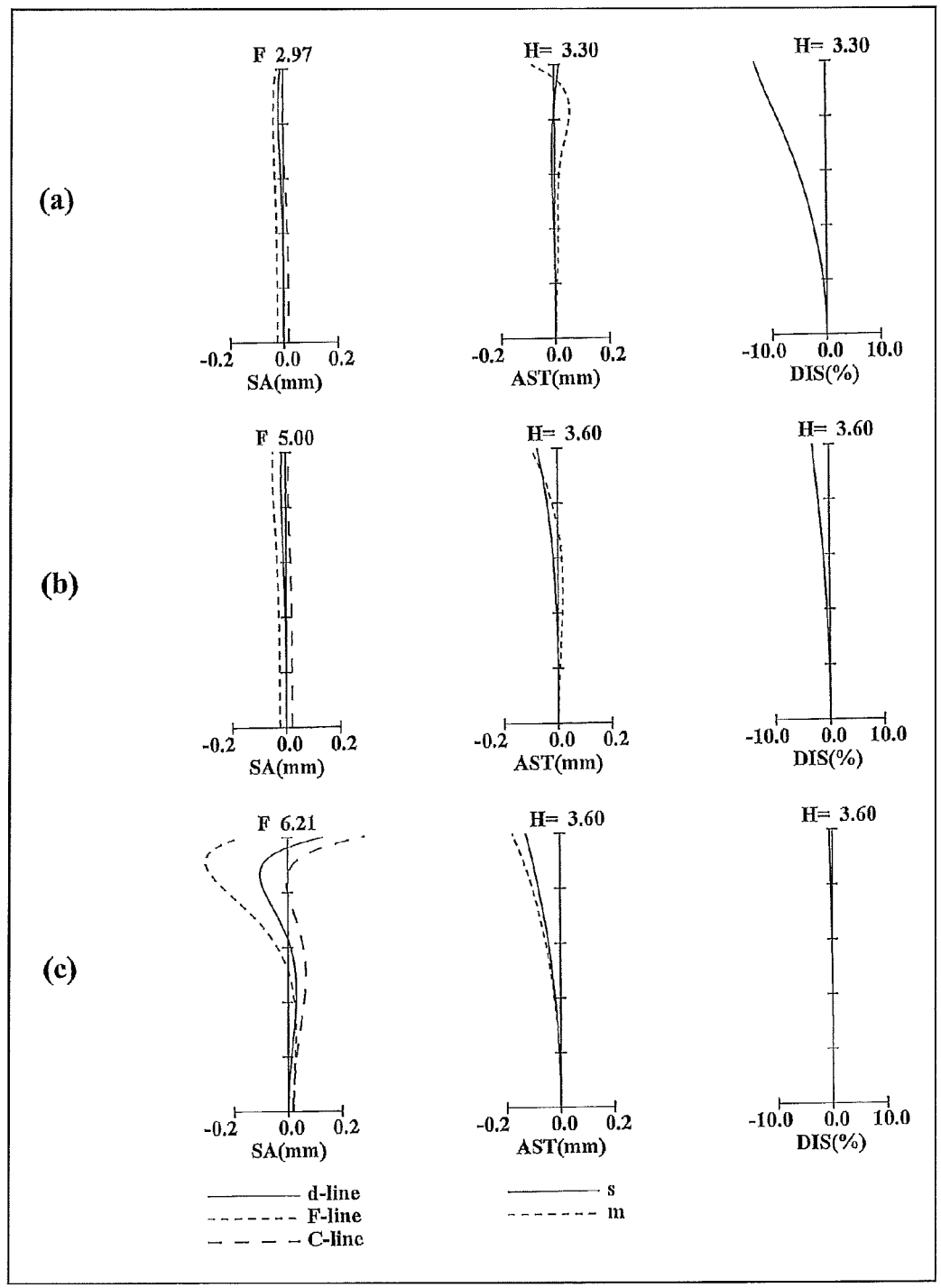
FIG. 23 is a longitudinal aberration diagram of an infinity in-focus condition of a zoom lens system according to Example 8.
Figure 24:
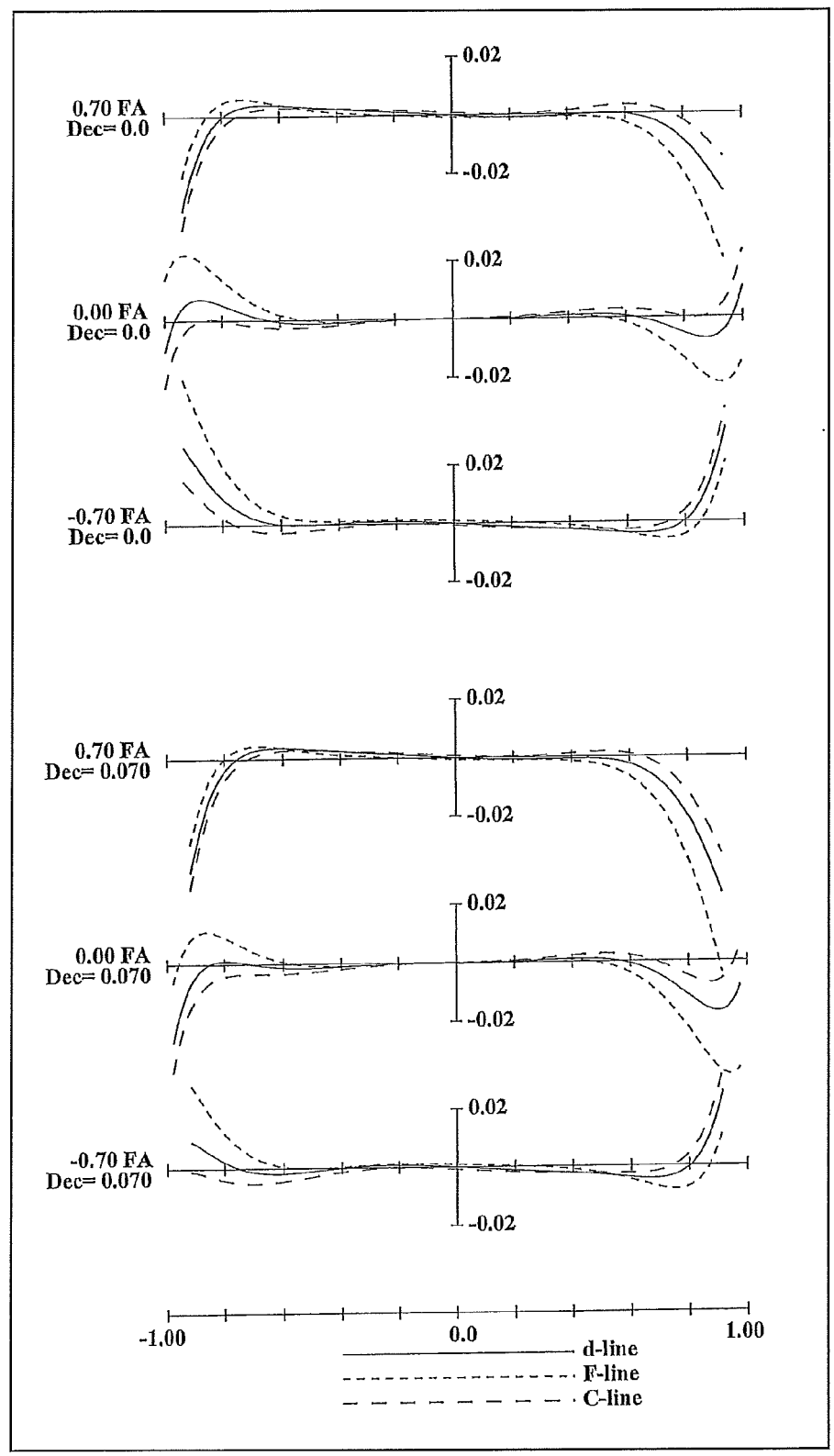
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 8, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

In the zoom lens system according to Embodiment 8, the third lens unit G3 comprises solely a bi-convex seventh lens element L7.

In the zoom lens system according to Embodiment 8, a plane parallel plate P is provided on the object side relative to the image surface S (between the image surface S and the seventh lens element L7).

In the zoom lens system according to Embodiment 8, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 25:
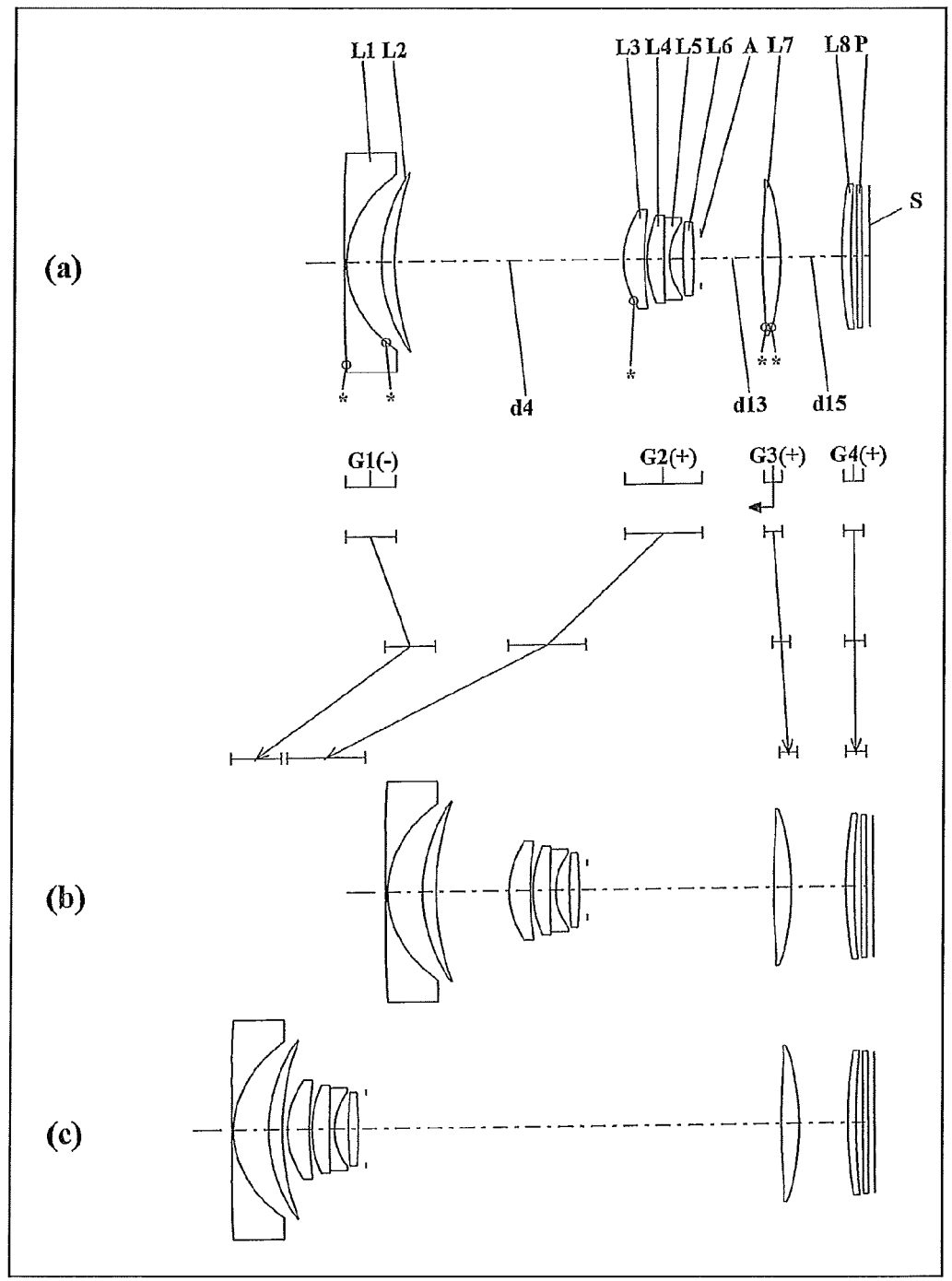
FIG. 25 is a lens arrangement diagram showing an infinity in-focus condition of a zoom lens system according to Embodiment 9 (Example 9).
Figure 26:
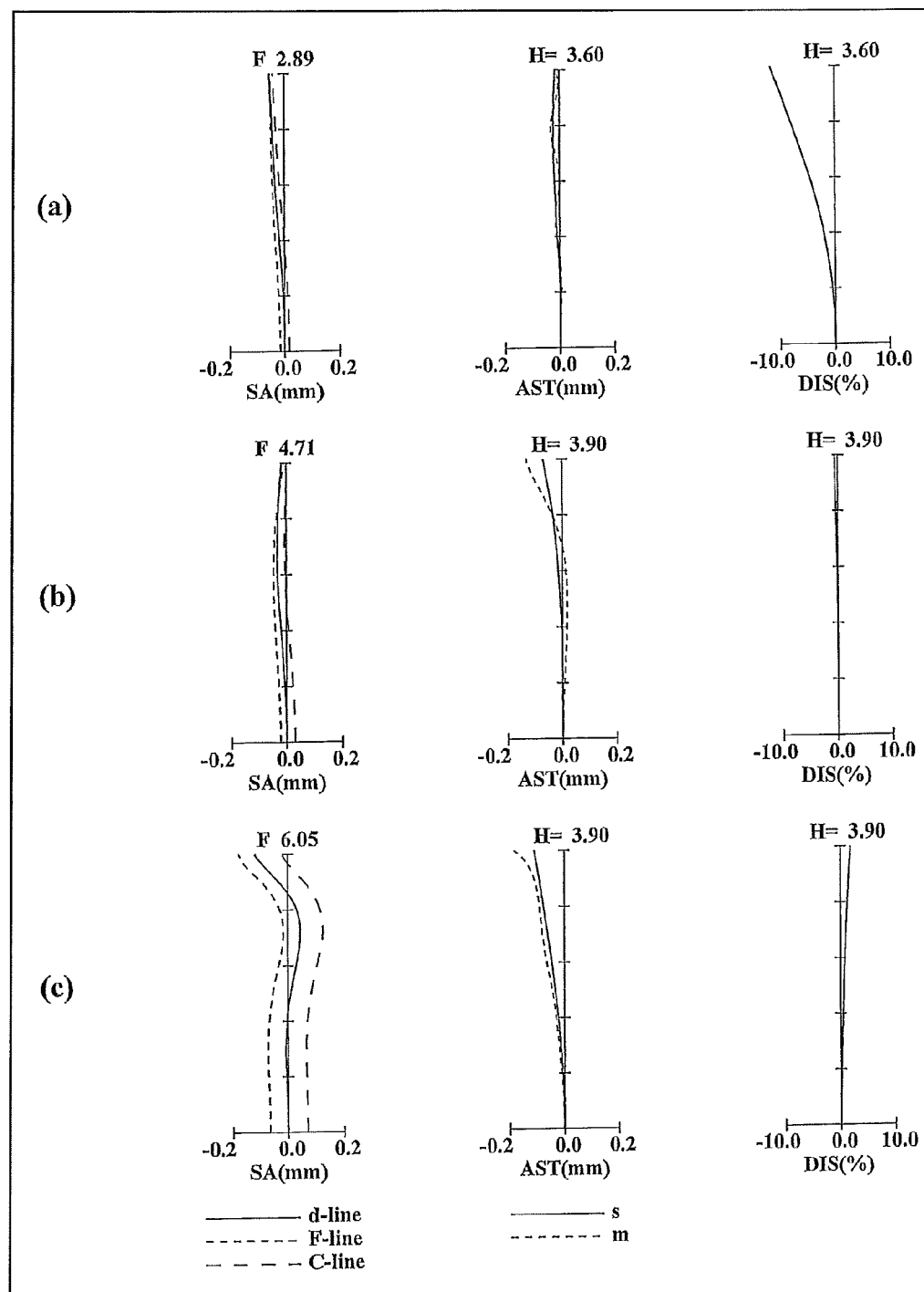
FIG. 26 is a longitudinal aberration diagram of an infinity in-focus condition of a zoom lens system according to Example 9.
Figure 27:
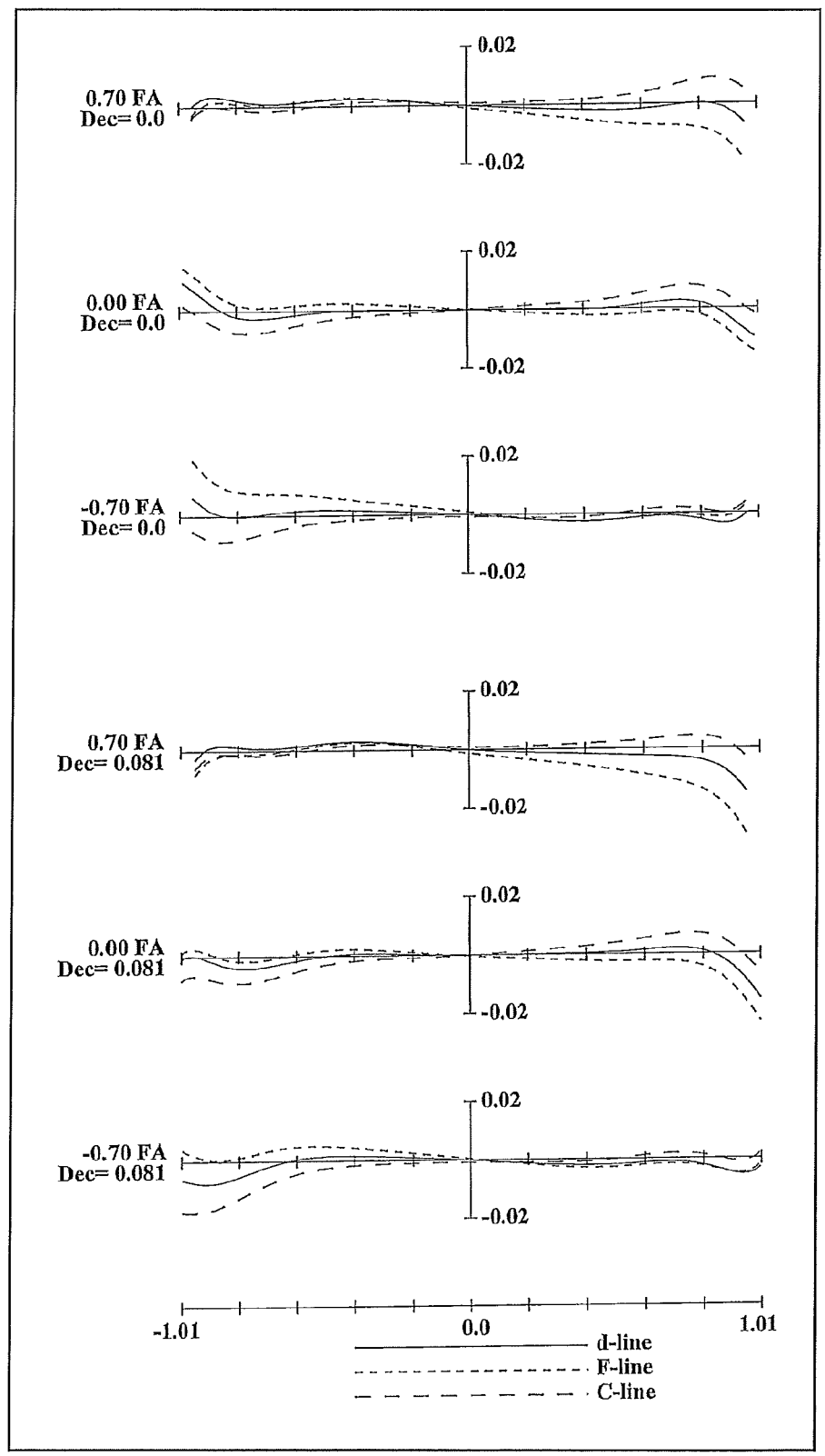
FIG. 27 is a lateral aberration diagram of a zoom lens system according to Example 9 at a telephoto limit in a basic state where image blur compensation is not performed and in a blur compensation state.

As shown in FIG. 25, in the zoom lens system according to Embodiment 9, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 9, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 9, the third lens unit G3 comprises solely a bi-convex seventh lens element L7. The seventh lens element L7 has two aspheric surfaces.

In the zoom lens system according to Embodiment 9, the fourth lens unit G4 comprises solely a positive meniscus eighth lens element L8 with the convex surface facing the object side.

In the zoom lens system according to Embodiment 9, a plane parallel plate P is provided on the object side relative to the image surface S (between the image surface S and the eighth lens element L8).

In the zoom lens system according to Embodiment 9, in zooming from a wide-angle limit to a telephoto limit at the time of image taking, the first lens unit G1 moves to the object side with locus of a convex to the image side, the second lens unit G2 monotonically moves to the object side, the third lens unit G3 monotonically moves to the image side, and the fourth lens unit G4 is fixed relative to the image surface S. That is, in zooming, the first lens unit G1, the second lens unit G2 and the third lens unit G3 are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

Figure 28:
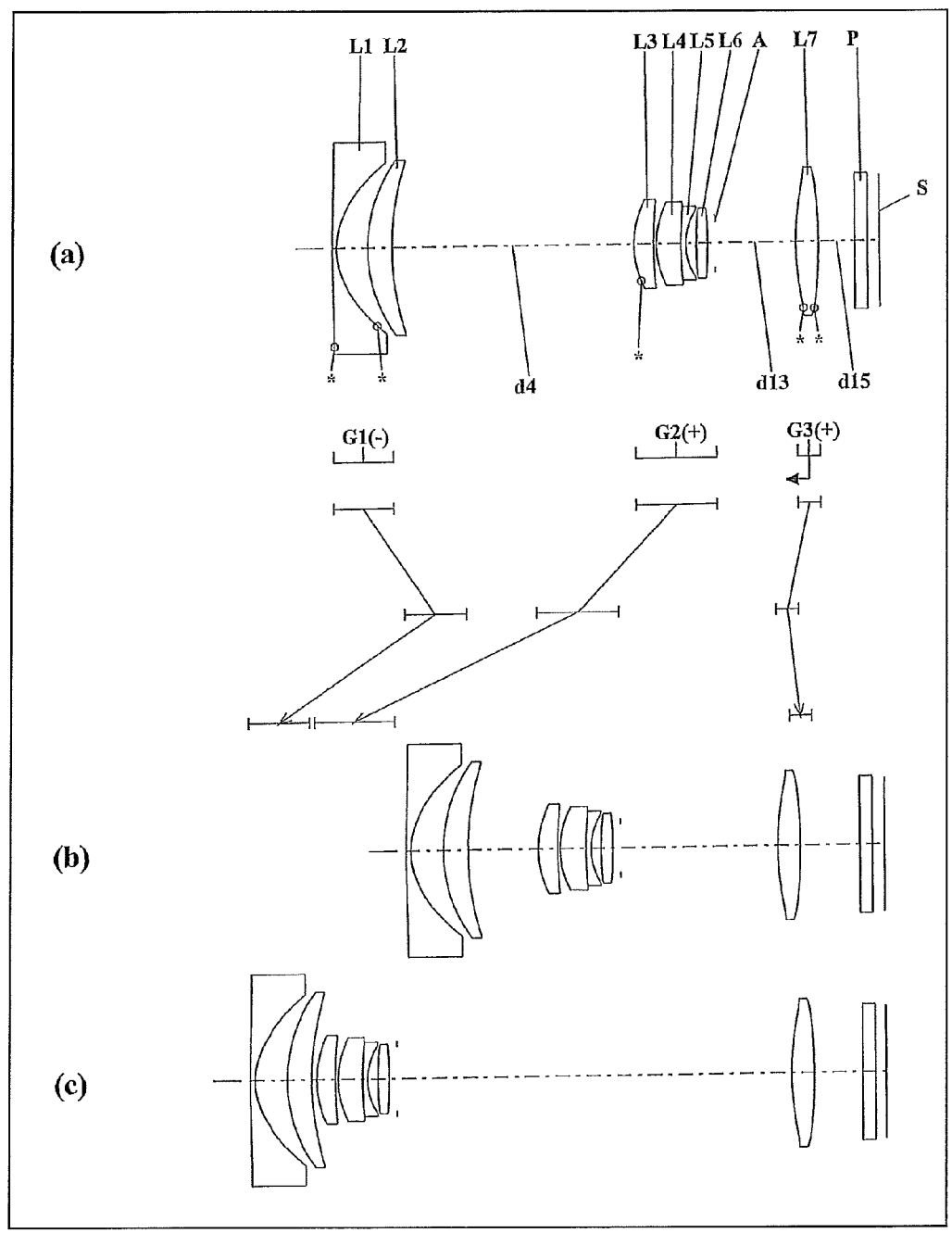
FIG. 28 is a lens arrangement diagram showing an infinity in-focus condition of a zoom lens system according to Embodiment 10 (Example 10).
Figure 29:
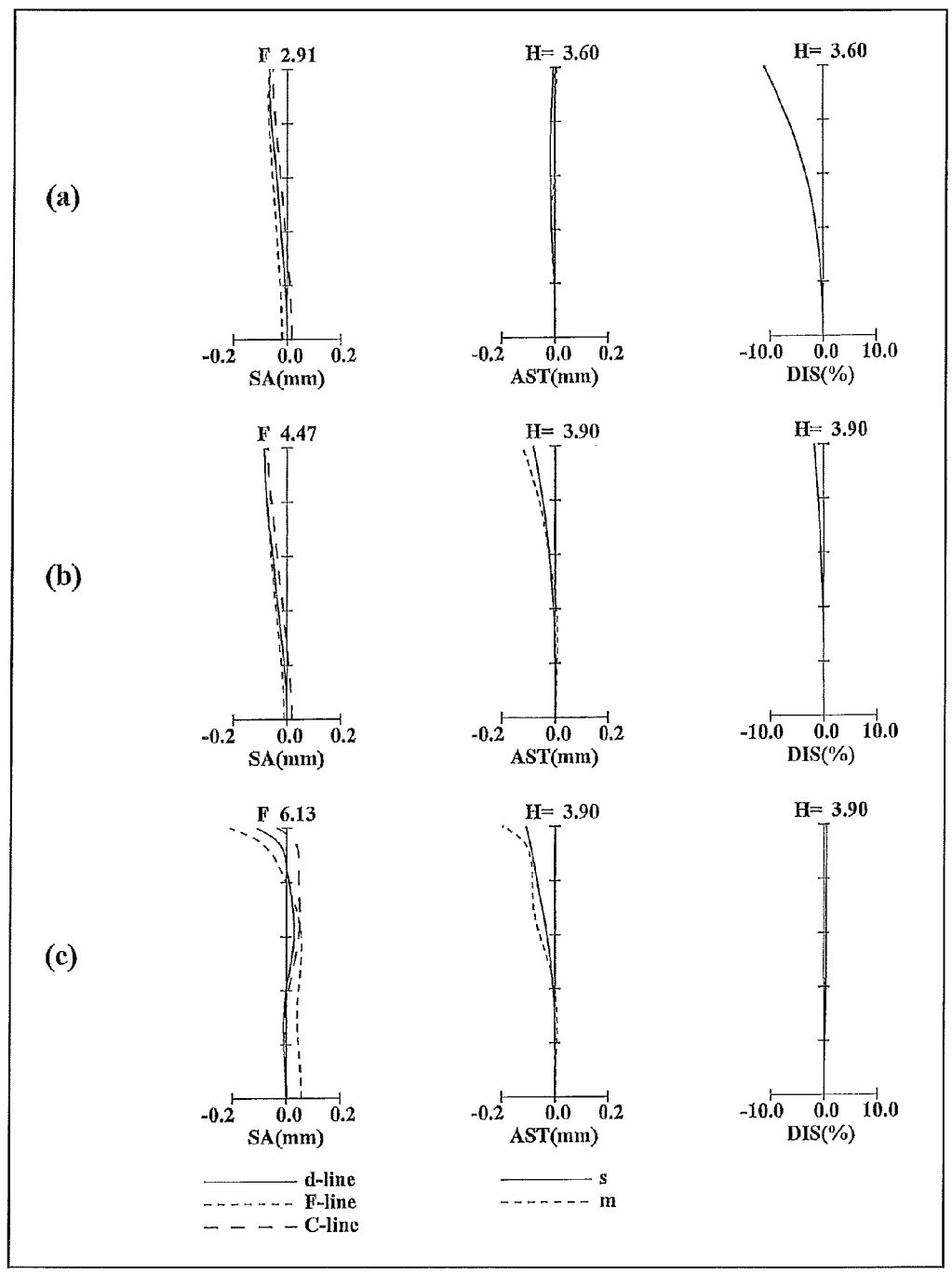
FIG. 29 is a longitudinal aberration diagram of an infinity in-focus condition of a zoom lens system according to Example 10.
Figure 30:
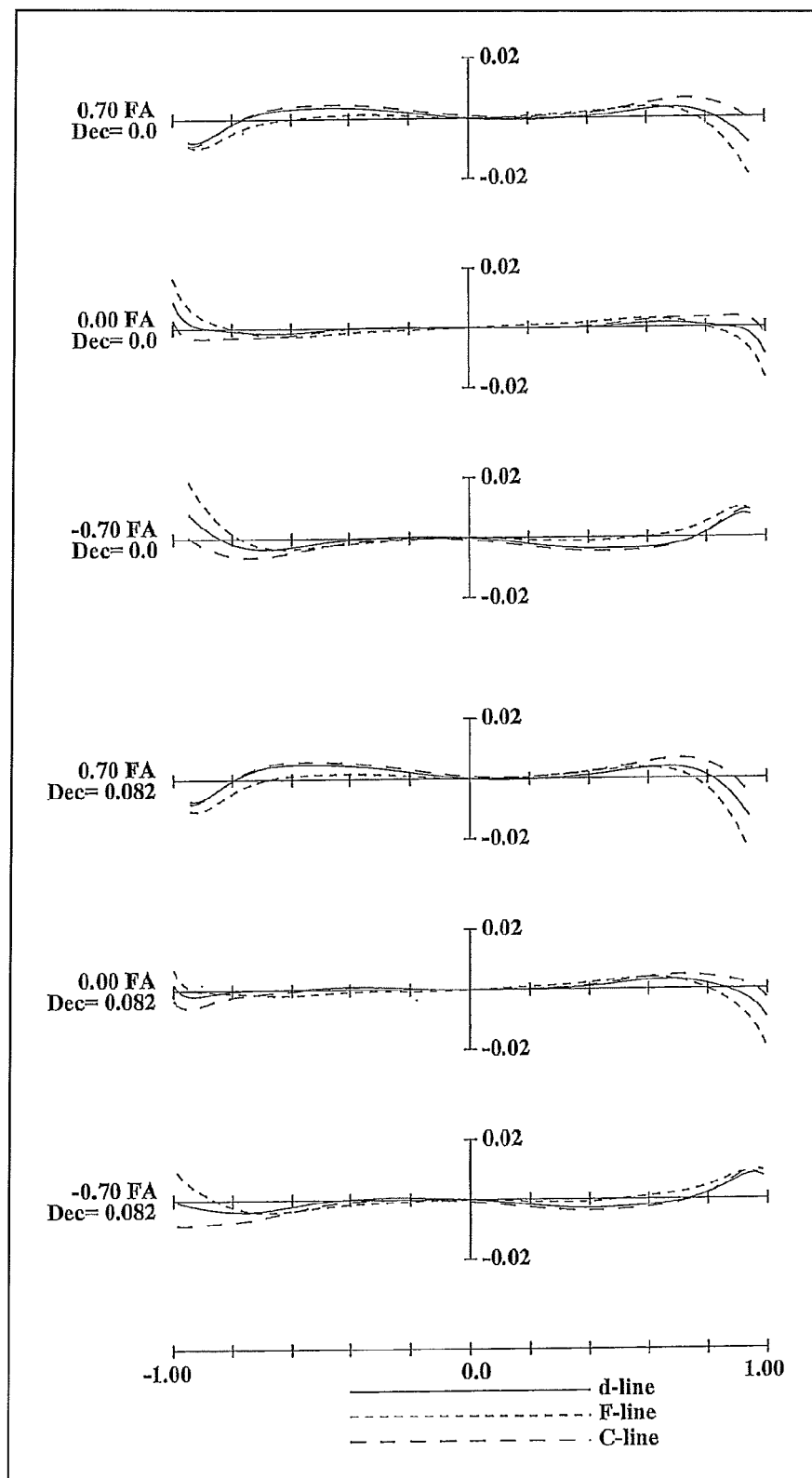
FIG. 30 is a lateral aberration diagram of a zoom lens system according to Example 10 at a telephoto limit in a basic state where image blur compensation is not performed and in a blur compensation state.

As shown in FIG. 28, in the zoom lens system according to Embodiment 10, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 10, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

In the zoom lens system according to Embodiment 10, the third lens unit G3 comprises solely a bi-convex seventh lens element L7.

In the zoom lens system according to Embodiment 10, a plane parallel plate P is provided on the object side relative to the image surface S (between the image surface S and the seventh lens element L7).

In the zoom lens system according to Embodiment 10, in zooming from a wide-angle limit to a telephoto limit at the time of image taking, the first lens unit G1 moves to the object side with locus of a convex to the image side, the second lens unit G2 monotonically moves to the object side, and the third lens unit G3 moves to the image side with locus of a convex to the object side. That is, in zooming, the individual lens units are moved along the optical axis such that the interval between the first lens unit G1 and the second lens unit G2 should decrease, and the interval between the second lens unit G2 and the third lens unit G3 should increase.

Further, in focusing from an infinity in-focus condition to a close-object in-focus condition, the third lens unit G3 moves to the object side along the optical axis.

In the zoom lens systems according to Embodiments 1 to 10, the first lens unit G1, in order from the object side to the image side, comprises a lens element having negative optical power and a meniscus lens element with a convex surface facing the object side, which has positive optical power. Therefore, a short optical overall length of lens system can be achieved with satisfactory compensation of various aberrations, especially distortion at a wide-angle limit.

In the zoom lens systems according to Embodiments 1 to 10, the first lens unit G1 includes at least one lens element having an aspheric surface or includes at least two aspheric surfaces. Therefore, aberrations can be compensated more satisfactory.

In the zoom lens systems according to Embodiments 1 to 10, the third lens unit G3 is composed of one lens element. Therefore, the total number of lens elements is reduced and the optical overall length of lens system becomes short. In an embodiment wherein the lens element constituting the third lens unit G3 includes an aspheric surface, aberrations can be compensated more satisfactory.

In the zoom lens systems according to Embodiments 1 to 10, the second lens unit G2 is composed of four lens elements including one to two cemented lens elements therein. Therefore, the thickness of the second lens unit G2 is reduced and the optical overall length of lens system becomes short.

Further, in the zoom lens systems according to Embodiments 1 to 10, any lens unit among the lens units constituting each zoom lens system, or alternatively a sub lens unit consisting of a part of each lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the second lens unit G2 is moved in a direction perpendicular to the optical axis, so that image blur is compensated in a state that size increase in the entire zoom lens system is suppressed and a compact construction is realized and that excellent imaging characteristics such as small decentering coma aberration and small decentering astigmatism are satisfied.

Here, in a case that a lens unit is composed of a plurality of lens elements, the above-mentioned sub lens unit consisting of a part of each lens unit indicates any one lens element or alternatively a plurality of adjacent lens elements among the plurality of lens elements.

The following description is given for conditions preferred to be satisfied by a zoom lens system like the zoom lens systems according to Embodiments 1 to 10. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

It is preferable that each of the all conditions described later is satisfied with satisfaction of the following condition (a), except as specifically noted.

$$Z=f_T/f_W>4.0 \quad (a)$$

where, $f_T$ is a focal length of the entire system at a telephoto limit, and $f_W$ is a focal length of the entire system at a wide-angle limit.

It is preferable that each of the all conditions described later is satisfied with satisfaction of the following condition (b), except as specifically noted.

$$\omega_W > 37 \quad (b)$$

where, $\omega_W$ is a half value (°) of a maximum view angle at a wide-angle limit.

In a zoom lens system like the zoom lens systems according to Embodiments 1 to 10, it is preferable that the following condition (1) is satisfied.

$$f_W/D_1 > 7.5 \quad (1)$$

where, $f_W$ is a focal length of the entire system at a wide-angle limit, and $D_1$ is a center thickness of a lens element located on the most object side in the first lens unit.

The condition (1) sets forth the thickness in a direction of the optical axis of the lens element located on the most object side in the first lens unit. When the value goes below the lower limit of the condition (1), the thickness in a direction of the optical axis of the lens element located on the most object side in the first lens unit is increased, and the overall length of the zoom lens system is increased. This causes difficulty in providing compact lens barrel, image device and camera.

When the following condition (1)' is satisfied, the above-mentioned effect is achieved more successfully.

$$f_W/D_1 > 14.0 \quad (1)'$$

It is particularly preferable that each of the conditions (1) and (1)' is satisfied with satisfaction of the condition (a).

In a zoom lens system like the zoom lens systems according to Embodiments 1 to 10, it is preferable that the following condition (2) is satisfied.

$$f_T/D_1 > 30.0 \quad (2)$$

where, $f_T$ is a focal length of the entire system at a telephoto limit, and $D_1$ is a center thickness of a lens element located on the most object side in the first lens unit.

The condition (2) sets forth the thickness in a direction of the optical axis of the lens element located on the most object side in the first lens unit. When the value goes below the lower limit of the condition (2), the thickness in a direction of the optical axis of the lens element located on the most object side in the first lens unit is increased, and the overall length of the zoom lens system is increased. This causes difficulty in providing compact lens barrel, image device and camera.

When the following condition (2)' is satisfied, the above-mentioned effect is achieved more successfully.

$$f_T/D_1 > 60.0 \quad (2)'$$

In a zoom lens system like the zoom lens systems according to Embodiments 1 to 10, it is preferable that the following condition (3) is satisfied.

$$0.50 < D_{G1}/Ir < 1.06 \quad (3)$$

where, $D_{G1}$ is a center thickness of the first lens unit,

Ir is a value represented by the following equation:

$$Ir = f_T \times \tan(\omega_T),$$

$f_T$ is a focal length of the entire system at a telephoto limit, and $\omega_T$ is a half value (°) of a maximum view angle at a telephoto limit.

The condition (3) sets forth the thickness in a direction of the optical axis of the first lens unit. When the value exceeds the upper limit of the condition (3), the thickness in a direction of the optical axis of the first lens unit is increased, and the overall length of the zoom lens system is increased. This causes difficulty in providing compact lens barrel, image device and camera. When the value goes below the lower limit of the condition (3), curvature of field becomes large, and this causes difficulty in securing performances of peripheral parts.

When at least one of the following conditions (3)' and (3)" is satisfied, the above-mentioned effect is achieved more successfully.

$$0.65 < D_{G1}/Ir \quad (3)'$$

$$D_{G1}/Ir \leq 1.00 \quad (3)''$$

In a zoom lens system like the zoom lens systems according to Embodiments 1 to 10, in which the third lens unit having positive optical power is located on the image side relative to the second lens unit, and in zooming from a wide-angle limit to a telephoto limit at the time of image taking, the lens units are individually moved along the optical axis to vary magnification such that an interval between the second lens unit and the third lens unit increases, it is preferable that the following condition (4) is satisfied.

$$0.60 < (D_{G1} + D_{G3})/Ir < 1.40 \quad (4)$$

where, $D_{G1}$ is a center thickness of the first lens unit, $D_{G3}$ is a center thickness of the third lens unit, Ir is a value represented by the following equation:

$$Ir = f_T \times \tan(\omega_T),$$

$f_T$ is a focal length of the entire system at a telephoto limit, and $\omega_T$ is a half value (°) of a maximum view angle at a telephoto limit.

The condition (4) sets forth the sum of the thickness in a direction of the optical axis of the first lens unit and the thickness in a direction of the optical axis of the third lens unit. When the value exceeds the upper limit of the condition (4), the sum of the thickness in a direction of the optical axis of the first lens unit and the thickness in a direction of the optical axis of the third lens unit is increased, and the overall length of the zoom lens system is increased. This causes difficulty in providing compact lens barrel, image device and camera. When the value goes below the lower limit of the condition (4), curvature of field becomes large, and this causes difficulty in securing performances of peripheral parts.

When at least one of the following conditions (4)' and (4)" is satisfied, the above-mentioned effect is achieved more successfully.

$$0.75 < (D_{G1} + D_{G3})/Ir \quad (4)'$$

$$(D_{G1} + D_{G3})/Ir < 1.20 \quad (4)''$$

In a zoom lens system like the zoom lens systems according to Embodiments 1 to 10, it is preferable that the following condition (5) is satisfied.

$$0.01 < D_1/D_{12} < 0.40 \quad (5)$$

where, $D_1$ is a center thickness of a lens element located on the most object side in the first lens unit, and $D_{12}$ is an air space between the lens element located on the most object side and a lens element adjacent to the lens element located on the most object side, in the first lens unit.

The condition (5) sets forth the thickness in a direction of the optical axis of the lens element located on the most object side in the first lens unit. When the value exceeds the upper limit of the condition (5), the thickness in a direction of the optical axis of the lens element located on the most object side in the first lens unit is increased, and the overall length of the zoom lens system is increased. This causes difficulty in providing compact lens barrel, image device and camera. When the value goes below the lower limit of the condition (5), in the first lens unit, the air space between the lens element located on the most object side and a lens element adjacent to the lens element located on the most object side is increased, and the overall length of the zoom lens system is increased. This causes difficulty in providing compact lens barrel, image device and camera.

When the following condition (5)' is satisfied, the above-mentioned effect is achieved more successfully.

$$D_1/D_{12}<0.20 \qquad (5)'$$

Even if each of the conditions (5) and (5)' is satisfied without satisfaction of the condition (a) and/or the condition (b), the above-mentioned effect is achieved more successfully.

In a zoom lens system like the zoom lens systems according to Embodiments 1 to 10, it is preferable that the following condition (6) is satisfied.

$$1.2<((2\times D_2\times R_{2F}\times R_{2R})/(R_{2R}-R_{2F}))^{0.5}/Ir<2.0 \qquad (6)$$

where, $D_2$ is a center thickness of a lens element adjacent to the lens element located on the most object side in the first lens unit, $R_{2F}$ is a radius of curvature of an object side surface of the lens element adjacent to the lens element located on the most object side in the first lens unit, $R_{2R}$ is a radius of curvature of an image side surface of the lens element adjacent to the lens element located on the most object side in the first lens unit, Ir is a value represented by the following equation:

$$Ir=f_T\times\tan(\omega_T),$$

$f_T$ is a focal length of the entire system at a telephoto limit, and $\omega_T$ is a half value (°) of a maximum view angle at a telephoto limit.

The condition (6) sets forth the thickness in a direction of the optical axis of the lens element adjacent to the lens element located on the most object side in the first lens unit. When the value exceeds the upper limit of the condition (6), the thickness in a direction of the optical axis of the lens element adjacent to the lens element located on the most object side in the first lens unit is increased, and the overall length of the zoom lens system is increased. This causes difficulty in providing compact lens barrel, image device and camera. When the value goes below the lower limit of the condition (6), the thickness on outer parts in a direction of the optical axis of the lens element adjacent to the lens element located on the most object side in the first lens unit is decreased. This causes difficulty in securing required lens diameter.

When at least one of the following conditions (6)' and (6)" is satisfied, the above-mentioned effect is achieved more successfully.

$$1.4<((2\times D_2\times R_{2F}\times R_{2R})/(R_{2R}-R_{2F}))^{0.5}/Ir \qquad (6)'$$

$$((2\times D_2\times R_{2F}\times R_{2R})/(R_{2R}-R_{2F}))^{0.5}/Ir<1.9 \qquad (6)''$$

It is particularly preferable that each of the conditions (6), (6)' and (6)" is satisfied with satisfaction of the condition (a).

In a zoom lens system like the zoom lens systems according to Embodiments 1 to 10, in which the second lens unit includes at least one cemented lens element, and a cement surface of the cemented lens element is a convex surface facing the object side, it is preferable that the following condition (7) is satisfied.

$$1.03<Nd_2/Nd_1<2.00 \qquad (7)$$

where, $Nd_1$ is a refractive index to the d-line of a lens element located on the most object side in the cemented lens element, and $Nd_2$ is a refractive index to the d-line of a lens element which is cemented with the lens element located on the most object side in the cemented lens element.

The condition (7) sets forth the relationship between the refractive index of the lens element located on the most object side and the refractive index of the lens element which is cemented with the lens element located on the most object side, in the cemented lens element included in the second lens unit. When the value is out of the range of the condition (7), it might be difficult to compensate various aberrations, especially spherical aberration.

When at least one of the following conditions (7)' and (7)" is satisfied, the above-mentioned effect is achieved more successfully.

$$1.15<Nd_2/Nd_1 \qquad (7)'$$

$$Nd_2/Nd_1<1.50 \qquad (7)''$$

It is particularly preferable that each of the conditions (7), (7)' and (7)" is satisfied with satisfaction of the conditions (a) and (b).

In a zoom lens system like the zoom lens systems according to Embodiments 1 to 10, in which the third lens unit is composed of one lens element, it is preferable that the following condition (8) is satisfied.

$$0.5<((2\times D_7\times R_{7F}\times R_{7R})/(R_{7R}-R_{7F}))^{0.5}/Ir<1.5 \qquad (8)$$

where, $D_7$ is a center thickness of the lens element in the third lens unit, $R_{7F}$ is a radius of curvature of an object side surface of the lens element in the third lens unit, $R_{7R}$ is a radius of curvature of an image side surface of the lens element in the third lens unit, Ir is a value represented by the following equation:

$$Ir=f_T\times\tan(\omega_T),$$

$f_T$ is a focal length of the entire system at a telephoto limit, and $\omega_T$ is a half value (°) of a maximum view angle at a telephoto limit.

The condition (8) sets forth the thickness in a direction of the optical axis of the lens element constituting the third lens unit. When the value exceeds the upper limit of the condition (8), the thickness in a direction of the optical axis of the lens element constituting the third lens unit is increased, and the overall length of the zoom lens system is increased. This causes difficulty in providing compact lens barrel, image device and camera. When the value goes below the lower limit of the condition (8), the thickness on outer parts in a direction of the optical axis of the lens element constituting the third lens unit is decreased. This causes difficulty in securing required lens diameter.

It is particularly preferable that the condition (8) is satisfied with satisfaction of the condition (a).

In a zoom lens system like the zoom lens systems according to Embodiments 1 to 10, in which the second lens unit moves in a direction perpendicular to the optical axis, it is preferable that the entire system satisfies the following conditions (9) and (10).

$$Y_T > Y \quad (9)$$

$$1.5 < (Y/Y_T)/(f/f_T) < 3.0 \quad (10)$$

where, f is a focal length of the entire system, $f_T$ is a focal length of the entire system at a telephoto limit, Y is an amount of movement in a direction perpendicular to the optical axis at the time of maximum blur compensation in the second lens unit with a focal length f of the entire system, and $Y_T$ is an amount of movement in a direction perpendicular to the optical axis at the time of maximum blur compensation in the second lens unit with a focal length $f_T$ of the entire system at a telephoto limit.

The conditions (9) and (10) relate to the amount of movement at the time of maximum blur compensation in the second lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (9) is not satisfied, alternatively when the value exceeds the upper limit of the condition (10), blur compensation becomes excessive. This causes a possibility of enhanced degradation in the optical performance. In contrast, when the value goes below the lower limit of the condition (10), a possibility of insufficient blur compensation arises.

When at least one of the following conditions (10)' and (10)″ is satisfied, the above-mentioned effect is achieved more successfully.

$$2.0 < (Y/Y_T)(f/f_T) \quad (10)'$$

$$(Y/Y_T)(f/f_T) < 2.6 \quad (10)''$$

Each lens unit constituting the zoom lens system according to each embodiment is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Moreover, in each embodiment, a configuration has been described that on the object side relative to the image surface S (that is, between the image surface S and the most image side lens surface of the third lens unit G3, or between the image surface S and the most image side lens surface of the fourth lens unit G4), a plane parallel plate such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 11

Figure 31:
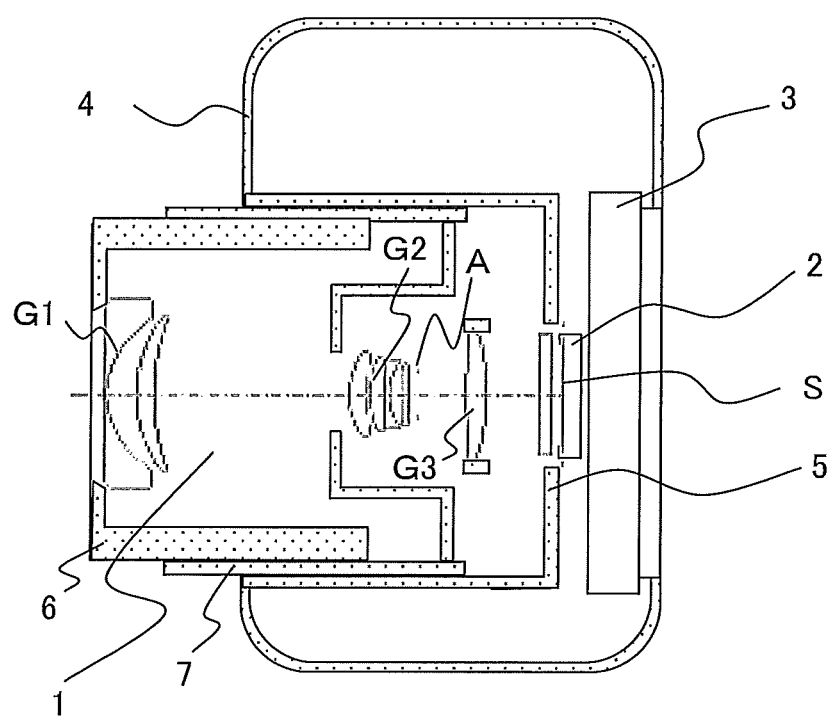
FIG. 31 is a schematic construction diagram of a digital still camera according to Embodiment 11.

FIG. 31 is a schematic construction diagram of a digital still camera according to Embodiment 11. In FIG. 31, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 31, the zoom lens system 1, in order from the object side to the image side, comprises a first lens unit G1, a second lens unit G2, an aperture diaphragm A, and a third lens unit G3. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2 and the aperture diaphragm A, and the third lens unit G3 move to predetermined positions relative to the image sensor 2, so that zooming from a wide-angle limit to a telephoto limit is achieved. The third lens unit G3 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 31, any one of the zoom lens systems according to Embodiments 2 to 10 may be employed in place of the zoom lens system according to Embodiment 1. Further, the optical system of the digital still camera shown in FIG. 31 is applicable also to a digital video camera for moving images. In this case, moving images with high resolution can be acquired in addition to still images.

Here, the digital still camera according to the present Embodiment 11 has been described for a case that the employed zoom lens system 1 is a zoom lens system according to Embodiments 1 to 10. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 10.

Further, Embodiment 11 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 11, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 is caused to escape from the optical axis at the time of barrel retraction.

An imaging device comprising a zoom lens system according to Embodiments 1 to 10 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 10 are implemented respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1-(1+\kappa)(h/r)^2}} + A4h^4 + A6h^6 + A8h^8 + A10h^{10} + A12h^{12} + A14h^{14} + A16h^{16}$$

Here, κ is the conic constant, A4, A6, A8, A10, A12, A14, and A16 are a fourth-order, sixth-order, eighth-order, tenth-order, twelfth-order, fourteenth-order, and sixteenth-order aspherical coefficients, respectively.

FIGS. 2, 5, 8, 11, 14, 17, 20, 23, 26, and 29 are longitudinal aberration diagrams of the zoom lens systems according to Embodiments 1 to 10, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, 21, 24, 27, and 30 are lateral aberration diagrams of the zoom lens systems at a telephoto limit according to Embodiments 1 to 10, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the second lens unit G2 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the second lens unit G2.

Here, in the zoom lens system according to each example, the amount ($Y_T$) of movement of the second lens unit G2 in a direction perpendicular to the optical axis in the image blur compensation state at a telephoto limit is as follows.

| Numerical Example | Amount of movement $Y_T$ (mm) |
| --- | --- |
| 1 | 0.081 |
| 2 | 0.079 |
| 3 | 0.082 |
| 4 | 0.081 |
| 5 | 0.069 |
| 6 | 0.081 |
| 7 | 0.082 |
| 8 | 0.070 |
| 9 | 0.081 |
| 10 | 0.082 |

Here, when the shooting distance is infinity, at a telephoto limit, the amount of image decentering in a case that the zoom lens system inclines by approximately 0.6° is equal to the amount of image decentering in a case that the entirety of the second lens unit G2 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to approximately 0.6° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1* | 376.90300 | 0.10000 | 1.77200 | 50.0 |
| 2* | 5.00600 | 2.02000 | | |
| 3 | 8.81800 | 1.17100 | 1.99537 | 20.7 |
| 4 | 14.80000 | Variable | | |
| 5* | 4.76400 | 1.22300 | 1.80434 | 40.8 |
| 6 | 20.42500 | 0.15000 | | |
| 7 | 6.32100 | 0.97600 | 1.72000 | 50.3 |
| 8 | 83.09200 | 0.01000 | 1.56732 | 42.8 |
| 9 | 83.09200 | 0.30000 | 1.84666 | 23.8 |
| 10 | 3.46000 | 0.79800 | | |
| 11 | 25.79800 | 0.55800 | 1.83400 | 37.3 |
| 12 | −25.42400 | 0.44800 | | |
| 13(Diaphragm) | ∞ | Variable | | |
| 14* | 30.81700 | 1.38300 | 1.51835 | 70.3 |
| 15* | −14.49800 | Variable | | |
| 16 | ∞ | 0.78000 | 1.51680 | 64.2 |
| 17 | ∞ | (BF) | | |
| Image surface | ∞ | | | |

TABLE 2

(Aspherical data)

Surface No. 1

K = 0.00000E+00, A4 = −2.07504E−04, A6 = 1.79274E−05,
A8 = −3.76493E−07 A10 = −1.87220E−09, A12 = 1.70356E−10,
A14 = −1.74409E−12, A16 = 0.00000E+00

Surface No. 2

K = −3.88161E+00, A4 = 3.04951E−03, A6 = −1.57450E−04,
A8 = 1.09635E−05 A10 = −4.51143E−07, A12 = 8.77171E−09,
A14 = −2.02447E−11, A16 = −1.21955E−12

Surface No. 5

K = 0.00000E+00, A4 = −5.29795E−04, A6 = −1.86252E−05,
A8 = −1.72108E−06 A10 = 2.29543E−07, A12 = 4.49667E−10,
A14 = −1.70054E−09, A16 = 0.00000E+00

Surface No. 14

K = 0.00000E+00, A4 = 6.43797E−04, A6 = −1.59684E−04,
A8 = 1.78702E−05 A10 = −1.01388E−06, A12 = 2.02058E−08,
A14 = 0.00000E+00, A16 = 0.00000E+00

Surface No. 15

K = 0.00000E+00, A4 = 1.00911E−03, A6 = −1.81490E−04,
A8 = 1.93687E−05 A10 = −1.05735E−06, A12 = 2.05281E−08,
A14 = 0.00000E+00, A16 = 0.00000E+00

TABLE 3

(Various data)

Zooming ratio 4.74080

| | Wide-angle limit | Middle position | Telephoto limit |
|---|---|---|---|
| Focal length | 4.5524 | 10.2934 | 21.5820 |
| F-number | 2.89303 | 4.73146 | 6.08515 |
| View angle | 41.9012 | 20.9296 | 10.0952 |
| Image height | 3.6000 | 3.9000 | 3.9000 |
| Overall length of lens system | 30.6963 | 28.5343 | 37.4510 |
| BF | 0.81535 | 0.79133 | 0.74456 |
| d4 | 13.1497 | 4.0849 | 0.3000 |
| d13 | 3.3156 | 10.5660 | 23.8497 |
| d15 | 3.4987 | 3.1751 | 2.6397 |
| Entrance pupil position | 6.6848 | 5.3769 | 4.4876 |
| Exit pupil position | −9.2658 | −30.7761 | 86.0868 |
| Front principal points position | 9.1815 | 12.3139 | 31.5273 |
| Back principal points position | 26.1440 | 18.2410 | 15.8690 |

Single lens data

| Lens element | Initial surface number | Focal length |
|---|---|---|
| 1 | 1 | −6.5725 |
| 2 | 3 | 19.9681 |
| 3 | 5 | 7.4647 |
| 4 | 7 | 9.4517 |
| 5 | 9 | −4.2716 |
| 6 | 11 | 15.4299 |
| 7 | 14 | 19.2213 |

Zoom lens unit data

| Lens unit | Initial surface No. | Focal length | Overall length of lens unit | Front principal points position | Back principal points position |
|---|---|---|---|---|---|
| 1 | 1 | −10.78884 | 3.29100 | −0.60798 | −0.05266 |
| 2 | 5 | 9.53628 | 4.46300 | −1.16896 | 0.36648 |
| 3 | 14 | 19.22127 | 1.38300 | 0.62596 | 1.08851 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.57527 | −1.26944 | −2.55852 |
| 3 | 14 | 0.73348 | 0.75157 | 0.78186 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ | | | |
| 1* | 47.67570 | 0.30000 | 1.80470 | 41.0 |
| 2* | 4.40240 | 2.02000 | | |
| 3 | 9.11440 | 1.31380 | 1.99537 | 20.7 |
| 4 | 17.58820 | Variable | | |
| 5* | 5.36520 | 1.10000 | 1.80470 | 41.0 |
| 6 | 16.76820 | 0.15000 | | |
| 7 | 5.53700 | 1.72350 | 1.48749 | 70.4 |
| 8 | 17.48420 | 0.01000 | 1.56732 | 42.8 |
| 9 | 17.48420 | 0.30000 | 1.84666 | 23.8 |
| 10 | 3.69180 | 0.56190 | | |
| 11 | 10.36260 | 0.87940 | 1.71300 | 53.9 |
| 12 | −33.39860 | 0.44800 | | |
| 13(Diaphragm) | ∞ | Variable | | |
| 14* | 12.25540 | 1.38300 | 1.51835 | 70.3 |
| 15* | −100.15000 | Variable | | |
| 16 | ∞ | 0.78000 | 1.51680 | 64.2 |
| 17 | ∞ | (BF) | | |
| Image surface | ∞ | | | |

TABLE 5

(Aspherical data)

Surface No. 1

K = 0.00000E+0.0, A4 = −4.31892E−04, A6 = 1.71184E−05,
A8 = −6.11570E−07 A10 = 1.14513E−08, A12 = −6.58467E−11,
A14 = −3.45648E−13, A16 = 0.00000E+00
Surface No. 2

K = −1.92659E+00, A4 = 1.29147E−03, A6 = −3.49146E−05,
A8 = −2.61576E−06 A10 = −1.55494E−07, A12 = 3.49670E−09,
A14 = 2.18826E−11, A16 = −1.30739E−12
Surface No. 5

K = 0.00000E+00, A4 = −3.40457E−04, A6 = −1.00479E−05,
A8 = −9.67088E−07 A10 = 5.25306E−07, A12 = −9.45088E−08,
A14 = 5.18417E−09, A16 = 0.00000E+00
Surface No. 14

K = 0.00000E+00, A4 = −1.25406E−03, A6 = 1.88903E−04,
A8 = −1.84993E−05 A10 = 9.05200E−07, A12 = −1.95790E−08,
A14 = 0.00000E+00, A16 = 0.00000E+00
Surface No. 15

K = 0.00000E+00, A4 = −1.25200E−03, A6 = 1.91105E−04,
A8 = −1.78367E−05 A10 = 8.17466E−07, A12 = −1.67813E−08,
A14 = 0.00000E+00, A16 = 0.00000E+00

TABLE 6

(Various data)

Zooming ratio 4.67013

| | Wide-angle limit | Middle position | Telephoto limit |
|---|---|---|---|
| Focal length | 4.5699 | 9.8757 | 21.3419 |
| F-number | 2.90114 | 4.54392 | 6.12766 |
| View angle | 41.4426 | 21.8652 | 10.2088 |
| Image height | 3.6000 | 3.9000 | 3.9000 |
| Overall length of lens system | 32.0163 | 28.7643 | 38.1935 |
| BF | 0.50460 | 0.51133 | 0.45327 |
| d4 | 13.5088 | 4.0658 | 0.3000 |
| d13 | 4.2411 | 9.6159 | 23.8116 |
| d15 | 2.7922 | 3.6017 | 2.6590 |
| Entrance pupil position | 6.7067 | 5.5673 | 4.8381 |
| Exit pupil position | −9.5829 | −22.8988 | 179.4711 |
| Front principal points position | 9.2063 | 11.2768 | 28.7243 |
| Back principal points position | 27.4464 | 18.8886 | 16.8515 |

Single lens data

| Lens element | Initial surface number | Focal length |
|---|---|---|
| 1 | 1 | −6.0461 |
| 2 | 3 | 17.6414 |
| 3 | 5 | 9.4000 |
| 4 | 7 | 15.8718 |
| 5 | 9 | −5.5832 |
| 6 | 11 | 11.1858 |
| 7 | 14 | 21.1542 |

TABLE 6-continued (Various data)

Zoom lens unit data

| Lens unit | Initial surface No. | Focal length | Overall length of lens unit | Front principal points position | Back principal points position |
|---|---|---|---|---|---|
| 1 | 1 | −10.40646 | 3.63380 | −0.61009 | 0.04913 |
| 2 | 5 | 9.47561 | 5.17280 | −1.16523 | 0.63304 |
| 3 | 14 | 21.15418 | 1.38300 | 0.09973 | 0.56803 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.56205 | −1.27771 | −2.59585 |
| 3 | 14 | 0.78132 | 0.74273 | 0.79004 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1* | 85.83000 | 0.50000 | 1.80470 | 41.0 |
| 2* | 4.65000 | 1.94300 | | |
| 3 | 8.92900 | 1.50400 | 2.01960 | 21.5 |
| 4 | 16.94100 | Variable | | |
| 5* | 5.70000 | 1.19600 | 1.80359 | 40.8 |
| 6 | 27.40300 | 0.15000 | | |
| 7 | 5.35800 | 1.53300 | 1.49700 | 81.6 |
| 8 | 23.32100 | 0.01000 | 1.56732 | 42.8 |
| 9 | 23.32100 | 0.30000 | 1.84666 | 23.8 |
| 10 | 3.77400 | 0.63500 | | |
| 11 | 23.14600 | 0.70000 | 1.83481 | 42.7 |
| 12 | −23.14600 | 0.44800 | | |
| 13(Diaphragm) | ∞ | Variable | | |
| 14* | 16.73500 | 1.36200 | 1.51845 | 70.0 |
| 15* | −35.04600 | Variable | | |
| 16 | ∞ | 0.78000 | 1.51680 | 64.2 |
| 17 | ∞ | (BF) | | |
| Image surface | ∞ | | | |

TABLE 8

(Aspherical data)

Surface No. 1

K = 0.00000E+00, A4 = 1.67521E−05, A6 = −6.32273E−06,
A8 = 1.49631E−07 A10 = −1.17542E−09, A12 = 0.00000E+00,
A14 = 0.00000E+00, A16 = 0.00000E+00
Surface No. 2

K = −6.56425E−01, A4 = 1.31278E−06, A6 = −1.52009E−05,
A8 = 1.18927E−06 A10 = −1.16818E−07, A12 = 5.23273E−09,
A14 = −1.01819E−10, A16 = 6.36437E−13

TABLE 8-continued (Aspherical data)

Surface No. 5

K = 0.00000E+00, A4 = −2.75821E−04, A6 = −3.29535E−05,
A8 = 8.16234E−06 A10 = −1.41592E−06, A12 = 1.12370E−07,
A14 = −3.21408E−09, A16 = 0.00000E+00

Surface No. 14

K = 0.00000E+00, A4 = −1.38176E−05, A6 = −6.21437E−05,
A8 = 9.32874E−06 A10 = −5.46078E−07, A12 = 9.60122E−09,
A14 = 0.00000E+00, A16 = 0.00000E+00

Surface No. 15

K = 0.00000E+00, A4 = 2.21664E−04, A6 = −1.07372E−04,
A8 = 1.35168E−05 A10 = −7.28810E−07, A12 = 1.26395E−08,
A14 = 0.00000E+00, A16 = 0.00000E+00

TABLE 9

(Various data)

Zooming ratio 4.74713

|  | Wide-angle limit | Middle position | Telephoto limit |
|---|---|---|---|
| Focal length | 4.6614 | 10.1581 | 22.1283 |
| F-number | 2.90559 | 4.46621 | 6.13215 |
| View angle | 41.0122 | 21.3353 | 9.9552 |
| Image height | 3.6000 | 3.9000 | 3.9000 |
| Overall length of lens system | 33.7031 | 29.3487 | 39.0352 |
| BF | 0.72648 | 0.73604 | 0.67837 |
| d4 | 14.7264 | 4.2856 | 0.3000 |
| d13 | 4.9288 | 9.6091 | 24.0017 |
| d15 | 2.2604 | 3.6570 | 2.9941 |
| Entrance pupil position | 7.1024 | 5.7895 | 4.9539 |
| Exit pupil position | −10.2290 | −22.7593 | 233.9598 |
| Front principal points position | 9.7804 | 11.5558 | 29.1812 |
| Back principal points position | 29.0417 | 19.1906 | 16.9069 |

Single lens data

| Lens element | Initial surface number | Focal length |
|---|---|---|
| 1 | 1 | −6.1264 |
| 2 | 3 | 16.9141 |
| 3 | 5 | 8.7415 |
| 4 | 7 | 13.6108 |
| 5 | 9 | −5.3558 |
| 6 | 11 | 13.9591 |
| 7 | 14 | 22.0447 |

Zoom lens unit data

| Lens unit | Initial surface No. | Focal length | Overall length of lens unit | Front principal points position | Back principal points position |
|---|---|---|---|---|---|
| 1 | 1 | −10.77296 | 3.94700 | −0.45083 | 0.45305 |
| 2 | 5 | 9.62416 | 4.97200 | −1.27736 | 0.50691 |
| 3 | 14 | 22.04473 | 1.36200 | 0.29252 | 0.74942 |

TABLE 9-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.53196 | −1.25790 | −2.62569 |
| 3 | 14 | 0.81339 | 0.74961 | 0.78229 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ | | | |
| 1* | 64.98300 | 0.30000 | 1.80470 | 41.0 |
| 2* | 4.86000 | 2.12200 | | |
| 3 | 9.18800 | 1.45400 | 2.00272 | 19.3 |
| 4 | 15.84200 | Variable | | |
| 5* | 5.80600 | 1.19000 | 1.80436 | 40.9 |
| 6 | 28.10800 | 0.15000 | | |
| 7 | 5.41900 | 1.49100 | 1.49700 | 81.6 |
| 8 | 23.25400 | 0.01000 | 1.56732 | 42.8 |
| 9 | 23.25400 | 0.30000 | 1.84666 | 23.8 |
| 10 | 3.87700 | 0.63500 | | |
| 11 | 23.30600 | 0.71000 | 1.83481 | 42.7 |
| 12 | −23.30600 | 0.42300 | | |
| 13(Diaphragm) | ∞ | Variable | | |
| 14* | 20.07100 | 1.44300 | 1.52996 | 55.8 |
| 15* | −38.10900 | Variable | | |
| 16 | ∞ | 0.78000 | 1.51680 | 64.2 |
| 17 | ∞ | (BF) | | |
| Image surface | ∞ | | | |

TABLE 11

(Aspherical data)

Surface No. 1

K = 0.00000E+00, A4 = −9.66470E−05, A6 = −1.47019E−06,
A8 = 1.64608E−07 A10 = −3.66265E−09, A12 = 1.71491E−11,
A14 = 3.69371E−13, A16 = −4.12022E−15

Surface No. 2

K = −7.43416E−01, A4 = 3.61467E−05, A6 = −1.18123E−05,
A8 = 1.59746E−06 A10 = −1.19135E−07, A12 = 5.16044E−09,
A14 = −1.12667E−10, A16 = 9.02143E−13

Surface No. 5

K = 0.00000E+00, A4 = −2.74010E−04, A6 = −3.07773E−05,
A8 = 1.13844E−05 A10 = −2.72034E−06, A12 = 3.09310E−07,
A14 = −1.35981E−08, A16 = 0.00000E+00

Surface No. 14

K = 0.00000E+00, A4 = −3.97245E−04, A6 = −1.62382E−05,
A8 = 6.14516E−06 A10 = −4.16218E−07, A12 = 1.39981E−09,
A14 = 4.13302E−10, A16 = −6.82361E−12

TABLE 11-continued (Aspherical data)

Surface No. 15

K = 0.00000E+00, A4 = −2.29091E−04, A6 = −4.29717E−05,
A8 = 9.36646E−06 A10 = −5.93566E−07, A12 = 5.24991E−09,
A14 = 4.02615E−10, A16 = −7.10074E−12

TABLE 12

(Various data)

Zooming ratio 4.75073

|  | Wide-angle limit | Middle position | Telephoto limit |
|---|---|---|---|
| Focal length | 4.6355 | 10.1748 | 22.0218 |
| F-number | 2.89659 | 4.46169 | 6.12235 |
| View angle | 41.2910 | 21.2335 | 9.9497 |
| Image height | 3.6140 | 3.9020 | 3.9020 |
| Overall length of lens system | 34.0115 | 29.4047 | 38.3928 |
| BF | 0.83152 | 0.83371 | 0.68876 |
| d4 | 15.0540 | 4.4380 | 0.3000 |
| d13 | 4.7360 | 9.5210 | 23.4180 |
| d15 | 2.3820 | 3.6040 | 2.9780 |
| Entrance pupil position | 7.0890 | 5.7474 | 4.8637 |
| Exit pupil position | −9.8686 | −20.9839 | −469.7425 |
| Front principal points position | 9.7163 | 11.1771 | 25.8547 |
| Back principal points position | 29.3761 | 19.2299 | 16.3709 |

Single lens data

| Lens element | Initial surface number | Focal length |
|---|---|---|
| 1 | 1 | −6.5423 |
| 2 | 3 | 19.6643 |
| 3 | 5 | 8.8859 |
| 4 | 7 | 13.8325 |
| 5 | 9 | −5.5346 |
| 6 | 11 | 14.0563 |
| 7 | 14 | 25.0223 |

Zoom lens unit data

| Lens unit | Initial surface No. | Focal length | Overall length of lens unit | Front principal points position | Back principal points position |
|---|---|---|---|---|---|
| 1 | 1 | −10.79533 | 3.87600 | −0.48140 | 0.32976 |
| 2 | 5 | 9.65689 | 4.90900 | −1.15966 | 0.56358 |
| 3 | 14 | 25.02229 | 1.44300 | 0.32819 | 0.81986 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.51977 | −1.21272 | −2.52466 |
| 3 | 14 | 0.82612 | 0.77719 | 0.80801 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ | | | |
| 1* | 43.59900 | 0.30000 | 1.88300 | 40.8 |
| 2* | 4.57200 | 1.87000 | | |
| 3 | 7.15000 | 1.60000 | 1.92287 | 18.9 |
| 4 | 11.32800 | Variable | | |
| 5* | 4.23600 | 2.00000 | 1.77250 | 49.6 |
| 6 | 9.39400 | 0.50000 | 1.64769 | 33.8 |
| 7 | 3.67100 | 0.48000 | | |
| 8 | 8.25100 | 0.50000 | 1.76183 | 26.5 |
| 9 | 4.05300 | 2.00000 | 1.60311 | 60.6 |
| 10 | −11.60700 | 0.30000 | | |
| 11(Diaphragm) | ∞ | Variable | | |
| 12 | 48.09900 | 1.60000 | 1.60311 | 60.6 |
| 13 | −28.05300 | Variable | | |
| 14 | ∞ | 1.40000 | 1.51633 | 64.1 |
| 15 | ∞ | (BF) | | |
| Image surface | ∞ | | | |

TABLE 14

(Aspherical data)

Surface No. 1

K = 0.00000E+00, A4 = 2.17331E−04, A6 = −5.74760E−06,
A8 = 5.32242E−08 A10 = 7.72352E−10, A12 = 2.59391E−11,
A14 = 3.03642E−13, A16 = −1.87017E−14

Surface No. 2

K = −1.47346E+00, A4 = 1.50049E−03, A6 = 1.66066E−06,
A8 = 1.22327E−07 A10 = −1.49908E−09, A12 = −1.13887E−10,
A14 = 6.97810E−12, A16 = 1.72221E−12

Surface No. 5

K = −3.90818E−01, A4 = −1.15574E−04, A6 = −1.47326E−07,
A8 = −5.30480E−07 A10 = 6.29464E−08, A12 = 0.00000E+00,
A14 = 0.00000E+00, A16 = 0.00000E+00

TABLE 15

(Various data)

Zooming ratio 4.79875

|  | Wide-angle limit | Middle position | Telephoto limit |
|---|---|---|---|
| Focal length | 4.2668 | 10.4194 | 20.4753 |
| F-number | 2.99449 | 5.07586 | 6.29349 |
| View angle | 41.0556 | 19.5893 | 10.0393 |
| Image height | 3.3000 | 3.6000 | 3.6000 |
| Overall length of lens system | 31.1062 | 29.2955 | 38.5732 |
| BF | 1.02162 | 1.02626 | 1.01656 |
| d4 | 11.8326 | 2.5052 | 0.1500 |
| d11 | 1.7085 | 7.7422 | 23.0251 |
| d13 | 3.9935 | 5.4718 | 1.8315 |
| Entrance pupil position | 6.3039 | 5.1695 | 4.7118 |
| Exit pupil position | −7.8328 | −18.4483 | −120.8323 |
| Front principal points position | 8.5146 | 10.0142 | 21.7465 |
| Back principal points position | 26.8394 | 18.8761 | 18.0979 |

TABLE 15-continued

(Various data)

Single lens data

| Lens element | Initial surface number | Focal length |
|---|---|---|
| 1 | 1 | −5.8053 |
| 2 | 3 | 17.7449 |
| 3 | 5 | 8.5431 |
| 4 | 6 | −9.6343 |
| 5 | 8 | −11.0242 |
| 6 | 9 | 5.2323 |
| 7 | 12 | 29.6131 |

Zoom lens unit data

| Lens unit | Initial surface No. | Focal length | Overall length of lens unit | Front principal points position | Back principal points position |
|---|---|---|---|---|---|
| 1 | 1 | −9.12343 | 3.77000 | −0.15473 | 0.84525 |
| 2 | 5 | 8.99051 | 5.78000 | 0.23803 | 1.80748 |
| 3 | 12 | 29.61311 | 1.60000 | 0.63542 | 1.22940 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.59428 | −1.54985 | −2.60919 |
| 3 | 12 | 0.78695 | 0.73688 | 0.86013 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows the various data.

TABLE 16

(Surface data)

| Surface number | r | d | nd | vd |
|---|---|---|---|---|
| Object surface | ∞ | | | |
| 1* | 388.35400 | 0.30000 | 1.77200 | 50.0 |
| 2* | 5.00700 | 2.02000 | | |
| 3 | 8.81800 | 1.17100 | 1.99537 | 20.7 |
| 4 | 14.80000 | Variable | | |
| 5* | 4.76400 | 1.22300 | 1.80434 | 40.8 |
| 6 | 20.42500 | 0.15000 | | |
| 7 | 6.32100 | 0.97600 | 1.72000 | 50.3 |
| 8 | 83.09200 | 0.01000 | 1.56732 | 42.8 |
| 9 | 83.09200 | 0.30000 | 1.84666 | 23.8 |
| 10 | 3.46000 | 0.79800 | | |
| 11 | 25.79800 | 0.55800 | 1.83400 | 37.3 |
| 12 | −25.42400 | 0.44800 | | |
| 13(Diaphragm) | ∞ | Variable | | |
| 14* | 30.81700 | 1.38300 | 1.51835 | 70.3 |
| 15* | −14.49800 | Variable | | |
| 16 | ∞ | 0.78000 | 1.51680 | 64.2 |
| 17 | ∞ | (BF) | | |
| Image surface | ∞ | | | |

TABLE 17

(Aspherical data)

Surface No. 1

K = 0.00000E+00, A4 = −1.70236E−04, A6 = 1.57345E−05, A8 = −3.38808E−07 A10 = −1.66954E−09, A12 = 1.55183E−10, A14 = −1.58235E−12, A16 = 0.00000E+00

Surface No. 2

K = −3.90260E+00, A4 = 3.09719E−03, A6 = −1.58540E−04, A8 = 1.10039E−05 A10 = −4.56689E−07, A12 = 8.76183E−09, A14 = −1.02722E−11, A16 = −1.39663E−12

Surface No. 5

K = 0.00000E+00, A4 = −5.29795E−04, A6 = −1.86252E−05, A8 = −1.72108E−06 A10 = 2.29543E−07, A12 = 4.49667E−10, A14 = −1.70054E−09, A16 = 0.00000E+00

Surface No. 14

K = 0.00000E+00, A4 = 6.43797E−04, A6 = −1.59684E−04, A8 = 1.78702E−05 A10 = −1.01388E−06, A12 = 2.02058E−08, A14 = 0.00000E+00, A16 = 0.00000E+00

Surface No. 15

K = 0.00000E+00, A4 = 1.00911E−03, A6 = −1.81490E−04, A8 = 1.93687E−05 A10 = −1.05735E−06, A12 = 2.05281E−08, A14 = 0.00000E+00, A16 = 0.00000E+00

TABLE 18

(Various data)

Zooming ratio 4.74006

| | Wide-angle limit | Middle position | Telephoto limit |
|---|---|---|---|
| Focal length | 4.5528 | 10.2951 | 21.5805 |
| F-number | 2.89308 | 4.73186 | 6.08560 |
| View angle | 41.8796 | 20.9264 | 10.0954 |
| Image height | 3.6000 | 3.9000 | 3.9000 |
| Overall length of lens system | 30.8970 | 28.7374 | 37.6645 |
| BF | 0.81535 | 0.79222 | 0.74193 |
| d4 | 13.1497 | 4.0849 | 0.3000 |
| d13 | 3.3156 | 10.5660 | 23.8497 |
| d15 | 3.4993 | 3.1773 | 2.6559 |
| Entrance pupil position | 6.7994 | 5.4914 | 4.6019 |
| Exit pupil position | −9.2664 | −30.7783 | 86.0706 |
| Front principal points position | 9.2962 | 12.4292 | 31.6403 |
| Back principal points position | 26.3442 | 18.4424 | 16.0840 |

Single lens data

| Lens element | Initial surface number | Focal length |
|---|---|---|
| 1 | 1 | −6.5727 |
| 2 | 3 | 19.9681 |
| 3 | 5 | 7.4647 |
| 4 | 7 | 9.4517 |
| 5 | 9 | −4.2716 |
| 6 | 11 | 15.4299 |
| 7 | 14 | 19.2213 |

TABLE 18-continued (Various data)

Zoom lens unit data

| Lens unit | Initial surface No. | Focal length | Overall length of lens unit | Front principal points position | Back principal points position |
|---|---|---|---|---|---|
| 1 | 1 | −10.78804 | 3.49100 | −0.49277 | 0.14993 |
| 2 | 5 | 9.53628 | 4.46300 | −1.16896 | 0.36648 |
| 3 | 14 | 19.22127 | 1.38300 | 0.62596 | 1.08851 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.57539 | −1.27002 | −2.56085 |
| 3 | 14 | 0.73345 | 0.75141 | 0.78115 |

Numerical Example 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows the various data.

TABLE 19

(Surface data)

| Surface number | r | d | nd | vd |
|---|---|---|---|---|
| Object surface | ∞ | | | |
| 1* | 577.05700 | 0.10000 | 1.77200 | 50.0 |
| 2* | 5.17500 | 2.02000 | | |
| 3 | 8.86400 | 0.78700 | 1.99537 | 20.7 |
| 4 | 14.43100 | Variable | | |
| 5* | 4.71800 | 1.22300 | 1.80434 | 40.8 |
| 6 | 21.37800 | 0.15000 | | |
| 7 | 6.21100 | 0.97600 | 1.72000 | 50.3 |
| 8 | 48.76700 | 0.01000 | 1.56732 | 42.8 |
| 9 | 48.76700 | 0.30000 | 1.84666 | 23.8 |
| 10 | 3.37500 | 0.79800 | | |
| 11 | 24.64300 | 0.55800 | 1.83400 | 37.3 |
| 12 | −29.28600 | 0.44800 | | |
| 13(Diaphragm) | ∞ | Variable | | |
| 14* | 25.29100 | 1.01400 | 1.51835 | 70.3 |
| 15* | −14.93700 | Variable | | |
| 16 | ∞ | 0.78000 | 1.51680 | 64.2 |
| 17 | ∞ | (BF) | | |
| Image surface | ∞ | | | |

TABLE 20

(Aspherical data)

Surface No. 1

K = 0.00000E+00, A4 = −1.41328E−04, A6 = 1.77078E−05,
A8 = −3.80834E−07 A10 = −1.96260E−09, A12 = 1.69558E−10,
A14 = −1.70289E−12, A16 = 0.00000E+00

Surface No. 2

K = −4.07113E+00, A4 = 3.01642E−03, A6 = −1.53223E−04,
A8 = 1.09812E−05 A10 = −4.52714E−07, A12 = 8.75368E−09,
A14 = −1.94024E−11, A16 = −1.24676E−12

TABLE 20-continued (Aspherical data)

Surface No. 5

K = 0.00000E+00, A4 = −5.25358E−04, A6 = −2.41420E−05,
A8 = −1.41858E−06 A10 = 2.33286E−07, A12 = −2.78033E−09,
A14 = −1.46078E−09, A16 = 0.00000E+00

Surface No. 14

K = 0.00000E+00, A4 = 6.43797E−04, A6 = −1.59684E−04,
A8 = 1.78702E−05 A10 = −1.01388E−06, A12 = 2.02058E−08,
A14 = 0.00000E+00, A16 = 0.00000E+00

Surface No. 15

K = 0.00000E+00, A4 = 1.00911E−03, A6 = −1.81490E−04,
A8 = 1.93687E−05 A10 = −1.05735E−06, A12 = 2.05281E−08,
A14 = 0.00000E+00, A16 = 0.00000E+00

TABLE 21

(Various data)

Zooming ratio 4.77449

| | Wide-angle limit | Middle position | Telephoto limit |
|---|---|---|---|
| Focal length | 4.5209 | 10.2608 | 21.5850 |
| F-number | 2.21864 | 3.44045 | 5.85342 |
| View angle | 42.0205 | 20.9626 | 10.0596 |
| Image height | 3.6000 | 3.9000 | 3.9000 |
| Overall length of lens system | 29.9517 | 27.7940 | 36.7648 |
| BF | 0.82306 | 0.80178 | 0.79515 |
| d4 | 13.1497 | 4.0849 | 0.3000 |
| d13 | 3.3156 | 10.5660 | 23.8497 |
| d15 | 3.4993 | 3.1773 | 2.6559 |
| Entrance pupil position | 6.5390 | 5.0830 | 4.0701 |
| Exit pupil position | −9.6953 | −34.5145 | 66.6482 |
| Front principal points position | 9.1168 | 12.3627 | 32.7302 |
| Back principal points position | 25.4307 | 17.5331 | 15.1797 |

Single lens data

| Lens element | Initial surface number | Focal length |
|---|---|---|
| 1 | 1 | −6.7645 |
| 2 | 3 | 21.5638 |
| 3 | 5 | 7.2883 |
| 4 | 7 | 9.7914 |
| 5 | 9 | −4.2956 |
| 6 | 11 | 16.1218 |
| 7 | 14 | 18.2739 |

Zoom lens unit data

| Lens unit | Initial surface No. | Focal length | Overall length of lens unit | Front principal points position | Back principal points position |
|---|---|---|---|---|---|
| 1 | 1 | −10.91313 | 2.90700 | −0.66820 | −0.35967 |
| 2 | 5 | 9.49701 | 4.01500 | −1.28883 | 0.30208 |
| 3 | 14 | 18.27390 | 1.01400 | 0.42350 | 0.76388 |

TABLE 21-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.57406 | −1.26985 | −2.57097 |
| 3 | 14 | 0.72164 | 0.74043 | 0.76932 |

Numerical Example 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows the various data.

TABLE 22

(Surface data)

| Surface number | r | d | nd | vd |
|---|---|---|---|---|
| Object surface | ∞ | | | |
| 1* | 43.35000 | 0.10000 | 1.88300 | 40.8 |
| 2* | 4.63400 | 1.80100 | | |
| 3 | 7.02800 | 0.89200 | 1.92287 | 18.9 |
| 4 | 11.21300 | Variable | | |
| 5* | 4.23300 | 2.00000 | 1.77250 | 49.6 |
| 6 | 9.10100 | 0.50000 | 1.64769 | 33.8 |
| 7 | 3.65000 | 0.48000 | | |
| 8 | 8.19600 | 0.50000 | 1.76183 | 26.5 |
| 9 | 4.03100 | 2.00000 | 1.60311 | 60.6 |
| 10 | −11.56500 | 0.30000 | | |
| 11(Diaphragm) | ∞ | Variable | | |
| 12 | 35.71000 | 0.53500 | 1.60311 | 60.6 |
| 13 | −38.28900 | Variable | | |
| 14 | ∞ | 1.40000 | 1.51633 | 64.1 |
| 15 | ∞ | (BF) | | |
| Image surface | ∞ | | | |

TABLE 23

(Aspherical data)

Surface No. 1

K = 0.00000E+00, A4 = 2.22751E−04, A6 = −5.57619E−06,
A8 = 5.24555E−08 A10 = 7.84525E−10, A12 = 2.86538E−11,
A14 = 3.52576E−13, A16 = −2.47398E−14

Surface No. 2

K = −1.47289E+00, A4 = 1.49495E−03, A6 = 1.63460E−06,
A8 = 2.30658E−07 A10 = 3.22245E−09, A12 = 1.59094E−11,
A14 = 4.57897E−12, A16 = 9.80534E−13

Surface No. 5

K = −3.91335E−01, A4 = −1.31856E−04, A6 = 1.04723E−05,
A8 = −2.19704E−07 A10 = −1.31946E−07, A12 = 0.00000E+00,
A14 = 0.00000E+00, A16 = 0.00000E+00

TABLE 24

(Various data)

Zooming ratio 4.79761

| | Wide-angle limit | Middle position | Telephoto limit |
|---|---|---|---|
| Focal length | 4.2700 | 10.4414 | 20.4858 |
| F-number | 2.44803 | 3.71028 | 6.20650 |
| View angle | 41.6796 | 19.6031 | 10.0133 |
| Image height | 3.3000 | 3.6000 | 3.6000 |
| Overall length of lens system | 30.1328 | 27.6130 | 36.1785 |
| BF | 1.03360 | 1.04041 | 1.02915 |
| d4 | 12.3267 | 2.5746 | 0.1500 |
| d11 | 2.0724 | 7.8501 | 23.0014 |
| d13 | 4.1921 | 5.6399 | 1.4900 |
| Entrance pupil position | 6.0761 | 4.7652 | 4.2292 |
| Exit pupil position | −8.0502 | −18.1308 | −101.9046 |
| Front principal points position | 8.3389 | 9.5198 | 20.6380 |
| Back principal points position | 25.8628 | 17.1716 | 15.6927 |

Single lens data

| Lens element | Initial surface number | Focal length |
|---|---|---|
| 1 | 1 | −5.8833 |
| 2 | 3 | 18.5105 |
| 3 | 5 | 8.6887 |
| 4 | 6 | −9.7608 |
| 5 | 8 | −10.9823 |
| 6 | 9 | 5.2074 |
| 7 | 12 | 30.7202 |

Zoom lens unit data

| Lens unit | Initial surface No. | Focal length | Overall length of lens unit | Front principal points position | Back principal points position |
|---|---|---|---|---|---|
| 1 | 1 | −9.43753 | 2.79300 | −0.49513 | −0.07971 |
| 2 | 5 | 9.02732 | 5.48000 | 0.23639 | 1.80412 |
| 3 | 12 | 30.72022 | 0.53500 | 0.16149 | 0.36185 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.56969 | −1.48137 | −2.46023 |
| 3 | 12 | 0.79420 | 0.74685 | 0.88231 |

Numerical Example 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows the various data.

TABLE 25

(Surface data)

| Surface number | r | d | nd | vd |
|---|---|---|---|---|
| Object surface | ∞ | | | |
| 1* | 1695.36900 | 0.10000 | 1.77200 | 50.0 |
| 2* | 5.00000 | 2.02000 | | |
| 3 | 8.67000 | 0.78700 | 1.99537 | 20.7 |

TABLE 25-continued (Surface data)

| Surface number | r | d | nd | vd |
|---|---|---|---|---|
| 4 | 14.48800 | Variable | | |
| 5* | 4.69200 | 1.22300 | 1.80434 | 40.8 |
| 6 | 19.35900 | 0.15000 | | |
| 7 | 6.13300 | 0.97600 | 1.72000 | 50.3 |
| 8 | 61.32000 | 0.01000 | 1.56732 | 42.8 |
| 9 | 61.32000 | 0.30000 | 1.84666 | 23.8 |
| 10 | 3.36800 | 0.79800 | | |
| 11 | 24.07500 | 0.55800 | 1.83400 | 37.3 |
| 12 | −26.22100 | 0.48800 | | |
| 13(Diaphragm) | ∞ | Variable | | |
| 14* | 42.12100 | 1.01400 | 1.51835 | 70.3 |
| 15* | −14.33000 | Variable | | |
| 16 | 25.04600 | 0.50000 | 1.51680 | 64.2 |
| 17 | 43.18400 | 0.40000 | | |
| 18 | ∞ | 0.28000 | 1.51680 | 64.2 |
| 19 | ∞ | (BF) | | |
| Image surface | ∞ | | | |

TABLE 26

(Aspherical data)

Surface No. 1

K = 0.00000E+00, A4 = −1.78655E−04, A6 = 1.78850E−05,
A8 = −3.97728E−07 A10 = −1.54273E−09, A12 = 1.76094E−10,
A14 = −1.87170E−12, A16 = 0.00000E+00

Surface No. 2

K = −3.79730E+00, A4 = 3.03280E−03, A6 = −1.51755E−04,
A8 = 1.07402E−05 A10 = −4.51070E−07, A12 = 8.93059E−09,
A14 = −1.72068E−11, A16 = −1.39873E−12

Surface No. 5

K = 0.00000E+00, A4 = −5.25998E−04, A6 = −2.96663E−05,
A8 = 4.21460E−07 A10 = 1.28255E−07, A12 = −2.65635E−08,
A14 = 8.48687E−10, A16 = 0.00000E+00

Surface No. 14

K = 0.00000E+00, A4 = 6.43797E−04, A6 = −1.59684E−04,
A8 = 1.78702E−05 A10 = −1.01388E−06, A12 = 2.02058E−08,
A14 = 0.00000E+00, A16 = 0.00000E+00

Surface No. 15

K = 0.00000E+00, A4 = 1.00911E−03, A6 = −1.81490E−04,
A8 = 1.93687E−05 A10 = −1.05735E−06, A12 = 2.05281E−08,
A14 = 0.00000E+00, A16 = 0.00000E+00

TABLE 27

(Various data)

Zooming ratio 4.72709

| | Wide-angle limit | Middle position | Telephoto limit |
|---|---|---|---|
| Focal length | 4.5498 | 10.2364 | 21.5074 |
| F-number | 2.26419 | 3.48945 | 5.90718 |
| View angle | 41.9033 | 20.9704 | 10.0886 |
| Image height | 3.6000 | 3.9000 | 3.9000 |
| Overall length of lens system | 30.1928 | 27.9553 | 36.7971 |
| BF | 0.40673 | 0.38827 | 0.34716 |
| d4 | 13.1360 | 4.1603 | 0.3000 |
| d13 | 3.5311 | 10.6830 | 23.7691 |
| d15 | 3.5550 | 3.1597 | 2.8168 |
| Entrance pupil position | 6.3953 | 4.9993 | 3.9956 |
| Exit pupil position | −11.1178 | −40.8409 | 58.7768 |
| Front principal points position | 9.1489 | 12.6942 | 33.4197 |
| Back principal points position | 25.6430 | 17.7188 | 15.2897 |

Single lens data

| Lens element | Initial surface number | Focal length |
|---|---|---|
| 1 | 1 | −6.4960 |
| 2 | 3 | 20.3194 |
| 3 | 5 | 7.4235 |
| 4 | 7 | 9.3951 |
| 5 | 9 | −4.2192 |
| 6 | 11 | 15.1256 |
| 7 | 14 | 20.7549 |
| 8 | 16 | 114.3117 |

Zoom lens unit data

| Lens unit | Initial surface No. | Focal length | Overall length of lens unit | Front principal points position | Back principal points position |
|---|---|---|---|---|---|
| 1 | 1 | −10.68426 | 2.90700 | −0.71594 | −0.42959 |
| 2 | 5 | 9.44926 | 4.01500 | −1.19933 | 0.34857 |
| 3 | 14 | 20.75494 | 1.01400 | 0.50138 | 0.84343 |
| 4 | 16 | 114.31172 | 1.18000 | −0.45095 | −0.18213 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.57240 | −1.25445 | −2.57314 |
| 3 | 14 | 0.75566 | 0.77562 | 0.79419 |
| 4 | 16 | 0.98453 | 0.98469 | 0.98505 |

Numerical Example 10

The zoom lens system of Numerical Example 10 corresponds to Embodiment 10 shown in FIG. 28. Table 28 shows the surface data of the zoom lens system of Numerical Example 10. Table 29 shows the aspherical data. Table 30 shows various data.

TABLE 28

(Surface data)

| Surface number | r | d | nd | vd |
|---|---|---|---|---|
| Object surface | ∞ | | | |
| 1* | 77.76600 | 0.30000 | 1.80470 | 41.0 |
| 2* | 4.62600 | 1.94300 | | |
| 3 | 8.92900 | 1.50400 | 2.01960 | 21.5 |
| 4 | 16.94100 | Variable | | |
| 5* | 5.70000 | 1.19600 | 1.80359 | 40.8 |
| 6 | 27.40300 | 0.15000 | | |
| 7 | 5.35800 | 1.53300 | 1.49700 | 81.6 |
| 8 | 23.32100 | 0.01000 | 1.56732 | 42.8 |
| 9 | 23.32100 | 0.30000 | 1.84666 | 23.8 |
| 10 | 3.77400 | 0.63500 | | |
| 11 | 23.14600 | 0.70000 | 1.83481 | 42.7 |
| 12 | −23.14600 | 0.44800 | | |
| 13(Diaphragm) | ∞ | Variable | | |
| 14* | 16.73500 | 1.36200 | 1.51845 | 70.0 |
| 15* | −35.04600 | Variable | | |
| 16 | ∞ | 0.78000 | 1.51680 | 64.2 |
| 17 | ∞ | (BF) | | |
| Image surface | ∞ | | | |

TABLE 29

(Aspherical data)

Surface No. 1

K = 0.00000E+00, A4 = −4.96052E−05, A6 = −5.44364E−06,
A8 = 1.84959E−07 A10 = −1.85294E−09, A12 = 0.00000E+00,
A14 = 0.00000E+00, A16 = 0.00000E+00

Surface No. 2

K = −7.01947E−01, A4 = −6.24141E−06, A6 = −1.63099E−05,
A8 = 1.31846E−06 A10 = −1.11371E−07, A12 = 5.01378E−09,
A14 = −9.87969E−11, A16 = 5.64359E−13

Surface No. 5

K = 0.00000E+00, A4 = −2.75821E−04, A6 = −3.29535E−05,
A8 = 8.16234E−06 A10 = −1.41592E−06, A12 = 1.12370E−07,
A14 = −3.21408E−09, A16 = 0.00000E+00

Surface No. 14

K = 0.00000E+00, A4 = −1.38176E−05, A6 = −6.21437E−05,
A8 = 9.32874E−06 A10 = −5.46078E−07, A12 = 9.60122E−09,
A14 = 0.00000E+00, A16 = 0.00000E+00

Surface No. 15

K = 0.00000E+00, A4 = 2.21664E−04, A6 = −1.07372E−04,
A8 = 1.35168E−05 A10 = −7.28810E−07, A12 = 1.26395E−08,
A14 = 0.00000E+00, A16 = 0.00000E+00

TABLE 30

(Various data)

Zooming ratio 4.74774

| | Wide-angle limit | Middle position | Telephoto limit |
|---|---|---|---|
| Focal length | 4.6588 | 10.1500 | 22.1189 |
| F-number | 2.90561 | 4.46552 | 6.13304 |
| View angle | 41.0090 | 21.3536 | 9.9582 |
| Image height | 3.6000 | 3.9000 | 3.9000 |
| Overall length of lens system | 33.5016 | 29.1418 | 38.8021 |
| BF | 0.72591 | 0.73278 | 0.65613 |
| d4 | 14.7264 | 4.2856 | 0.3000 |
| d13 | 4.9288 | 9.6091 | 24.0017 |
| d15 | 2.2595 | 3.6533 | 2.9833 |
| Entrance pupil position | 6.9823 | 5.6706 | 4.8359 |
| Exit pupil position | −10.2281 | −22.7556 | 233.9706 |
| Front principal points position | 9.6597 | 11.4345 | 29.0518 |
| Back principal points position | 28.8428 | 18.9918 | 16.6832 |

Single lens data

| Lens element | Initial surface number | Focal length |
|---|---|---|
| 1 | 1 | −6.1235 |
| 2 | 3 | 16.9141 |
| 3 | 5 | 8.7415 |
| 4 | 7 | 13.6108 |
| 5 | 9 | −5.3558 |
| 6 | 11 | 13.9591 |
| 7 | 14 | 22.0447 |

TABLE 30-continued (Various data)

Zoom lens unit data

| Lens unit | Initial surface No. | Focal length | Overall length of lens unit | Front principal points position | Back principal points position |
|---|---|---|---|---|---|
| 1 | 1 | −10.77079 | 3.74700 | −0.57077 | 0.24304 |
| 2 | 5 | 9.62416 | 4.97200 | −1.27736 | 0.50691 |
| 3 | 14 | 22.04473 | 1.36200 | 0.29252 | 0.74942 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.53173 | −1.25661 | −2.62009 |
| 3 | 14 | 0.81346 | 0.74992 | 0.78379 |

The following Table 31 shows the corresponding values to the individual conditions in the zoom lens systems of each of Numerical Examples 1 to 10. Here, in Table 31, $Y_W$ is an amount of movement in a direction perpendicular to the optical axis at the time of maximum blur compensation in the second lens unit with a focal length $f_W$ of the entire system at a wide-angle limit, and
in a state that the zoom lens system is at a wide-angle limit, a corresponding value $(Y_W/Y_T)/(f_W/f_T)$ at the time of $Y=Y_W$ ($f=f_W$) in the condition formula (10) is obtained.

TABLE 31

(Values corresponding to conditions)

| | | Example | | | | |
|---|---|---|---|---|---|---|
| | Condition | 1 | 2 | 3 | 4 | 5 |
| (1) | $f_W/D_1$ | 45.5 | 15.2 | 9.3 | 15.5 | 14.2 |
| (2) | $f_T/D_1$ | 215.8 | 71.1 | 44.3 | 73.4 | 68.3 |
| (3) | $D_{G1}/Ir$ | 0.84 | 0.93 | 1.01 | 0.99 | 1.05 |
| (4) | $(D_{G1} + D_{G3})/Ir$ | 1.20 | 1.29 | 1.36 | 1.36 | 1.49 |
| (5) | $D_1/D_{12}$ | 0.05 | 0.15 | 0.26 | 0.14 | 0.16 |
| (6) | $((2 \times D_2 \times R_{2F} \times R_{2R})/(R_{2R} - R_{2F}))^{0.5}/Ir$ | 1.86 | 1.83 | 1.94 | 2.06 | 2.17 |
| (7) | $Nd_2/Nd_1$ | 1.07 | 1.24 | 1.23 | 1.23 | 0.93[1] |
| | | | | | | 0.91[2] |
| (8) | $((2 \times D_7 \times R_{7F} \times R_{7R})/(R_{7R} - R_{7F}))^{0.5}/Ir$ | 1.36 | 1.43 | 1.43 | 1.59 | 2.08 |
| (10) | $(Y_W/Y_T)/(f_W/f_T)$ | 2.41 | 2.33 | 2.28 | 2.27 | 2.48 |
| (a) | $f_T/f_W$ | 4.74 | 4.67 | 4.75 | 4.75 | 4.80 |
| (b) | $\omega_W$ | 41.90 | 41.44 | 41.01 | 41.29 | 41.06 |
| | $Ir = f_T \times \tan(\omega_T)$ | 3.84 | 3.84 | 3.88 | 3.86 | 3.62 |
| | $Y_W$ | 0.041 | 0.039 | 0.039 | 0.039 | 0.036 |
| | $Y_T$ | 0.081 | 0.079 | 0.082 | 0.081 | 0.069 |

| | | Example | | | | |
|---|---|---|---|---|---|---|
| | Condition | 6 | 7 | 8 | 9 | 10 |
| (1) | $f_W/D_1$ | 15.2 | 45.2 | 42.7 | 45.5 | 15.5 |
| (2) | $f_T/D_1$ | 71.9 | 215.9 | 204.9 | 215.1 | 73.7 |
| (3) | $D_{G1}/Ir$ | 0.90 | 0.75 | 0.78 | 0.75 | 0.96 |
| (4) | $(D_{G1} + D_{G3})/Ir$ | 1.25 | 1.01 | 0.92 | 1.01 | 1.31 |
| (5) | $D_1/D_{12}$ | 0.15 | 0.05 | 0.06 | 0.05 | 0.15 |
| (6) | $((2 \times D_2 \times R_{2F} \times R_{2R})/(R_{2R} - R_{2F}))^{0.5}/Ir$ | 1.86 | 1.57 | 1.60 | 1.52 | 1.94 |
| (7) | $Nd_2/Nd_1$ | 1.07 | 1.07 | 0.93[3] | 1.07 | 1.23 |
| | | | | 0.91[4] | | |
| (8) | $((2 \times D_7 \times R_{7F} \times R_{7R})/(R_{7R} - R_{7F}))^{0.5}/Ir$ | 1.36 | 1.14 | 1.23 | 1.22 | 1.43 |

TABLE 31-continued (Values corresponding to conditions)

| | | | | | | |
|---|---|---|---|---|---|---|
| (10) | $(Y_W/Y_T)/(f_W/f_T)$ | 2.42 | 2.42 | 2.45 | 2.39 | 2.28 |
| (a) | $f_T/f_W$ | 4.74 | 4.77 | 4.80 | 4.73 | 4.75 |
| (b) | $\omega_W$ | 41.88 | 42.02 | 41.68 | 41.90 | 41.01 |
| | $Ir = f_T \times \tan(\omega_T)$ | 3.84 | 3.83 | 3.62 | 3.83 | 3.88 |
| | $Y_W$ | 0.041 | 0.042 | 0.036 | 0.041 | 0.039 |
| | $Y_T$ | 0.081 | 0.082 | 0.070 | 0.081 | 0.082 |

Note:
(1)Cemented lens element composed of Third lens element L3 and Fourth lens element L4
(2)Cemented lens element composed of Fifth lens element L5 and Sixth lens element L6
(3)Cemented lens element composed of Third lens element L3 and Fourth lens element L4
(4)Cemented lens element composed of Fifth lens element L5 and Sixth lens element L6

INDUSTRIAL APPLICABILITY

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

DESCRIPTION OF THE REFERENCE CHARACTERS

G1 first lens unit
G2 second lens unit
G3 third lens unit
G4 fourth lens unit
L1 first lens element
L2 second lens element
L3 third lens element
L4 fourth lens element
L5 fifth lens element
L6 sixth lens element
L7 seventh lens element
L8 eighth lens element
P plane parallel plate
A aperture diaphragm
S image surface
1 zoom lens system
2 image sensor
3 liquid crystal display monitor
4 body
5 main barrel
6 moving barrel
7 cylindrical cam

The invention claimed is:

1. A zoom lens system having a plurality of lens units defining object and image sides of the lens system, each lens unit being composed of at least one lens element, the zoom lens system, in order from the object side to the image side, comprising:
a first lens unit having negative optical power and consisting of, in order from the object side to the image side, a lens element having negative optical power and a lens element having positive optical power; and
a second lens unit, arranged at an interval from the first lens unit, having positive optical power; wherein
zooming the lens system from its wide-angle limit to its telephoto limit to vary the lens system's magnification moves the lens units individually along the lens system's optical axis such that the interval between the first lens unit and the second lens unit decreases, and
the following conditions (1), (2), and (a) are satisfied:

$$f_W/D_1 > 7.5 \tag{1}$$

$$f_T/D_1 \geq 44.3 \tag{2}$$

$$Z = f_T/f_W > 4.0 \tag{a}$$

where,
$f_W$ is a focal length of the entire system at the wide-angle limit,
$f_T$ is a focal length of the entire system at the telephoto limit, and
$D_1$ is a center thickness of the negative optical power lens element of the first lens unit.

2. The zoom lens system as claimed in claim 1, further comprising:
a third lens unit having positive optical power, arranged on the image side of the second lens unit at an interval therefrom; wherein
zooming the lens system from its wide-angle limit to its telephoto limit to vary the lens system's magnification moves the lens units individually along the optical axis such that the interval between the second lens unit and the third lens unit increases.

3. The zoom lens system as claimed in claim 2, wherein the following condition (4) is satisfied:

$$0.60 < (D_{G1} + D_{G3})/Ir < 1.40 \tag{4}$$

where,
$D_{G1}$ is a center thickness of the first lens unit,
$D_{G3}$ is a center thickness of the third lens unit,
Ir is a value represented by the following equation:

$$Ir = f_T \times \tan(\omega_T),$$

$f_T$ is the focal length of the entire system at the telephoto limit, and
$\omega_T$ is a half value (°) of a maximum view angle at a telephoto limit.

4. The zoom lens system as claimed in claim 2, wherein
in the zoom lens system being zoomed from the system's minimum-focal-length state at its wide-angle limit to the system's maximum-focal-length state at its telephoto limit, the optical-axial position of the third lens unit in an intermediate-focal-length state of the lens system is object-side-ward relative to the optical-axial position of the third lens unit in the minimum-focal-length state, and object-side-ward relative to the optical-axial position of the third lens unit in the maximum-focal-length state.

5. The zoom lens system as claimed in claim 2, wherein the third lens unit is composed of one lens element.

6. The zoom lens system as claimed in claim 5, wherein the following condition (8) is satisfied:

$$0.5 < ((2 \times D_7 \times R_{7F} \times R_{7R})/(R_{7R} - R_{7F}))^{0.5}/Ir < 1.5 \tag{8}$$

where,
$D_7$ is a center thickness of the lens element in the third lens unit,
$R_{7F}$ is a radius of curvature of an object side surface of the lens element in the third lens unit,
$R_{7R}$ is a radius of curvature of an image side surface of the lens element in the third lens unit,
Ir is a value represented by the following equation:

$$Ir = f_T \times \tan(\omega_T),$$

$f_T$ is the focal length of the entire system at the telephoto limit, and $\omega_T$ is a half value (°) of a maximum view angle at a telephoto limit.

7. The zoom lens system as claimed in claim 5, wherein the lens element in the third lens unit includes an aspheric surface.

8. The zoom lens system as claimed in claim 5, wherein the lens element in the third lens unit is made of a resin material.

9. The zoom lens system as claimed in claim 1, wherein the following condition (3) is satisfied:

$$0.50 < D_{G1}/Ir < 1.06 \quad (3)$$

where, $D_{G1}$ is a center thickness of the first lens unit,

Ir is a value represented by the following equation:

$$Ir = f_T \times \tan(\omega_T),$$

$f_T$ is the focal length of the entire system at the telephoto limit, and $\omega_T$ is a half value (°) of a maximum view angle at a telephoto limit.

10. The zoom lens system as claimed in claim 1, wherein the following condition (5) is satisfied:

$$0.01 < D_1/D_{12} < 0.40 \quad (5)$$

where, $D_1$ is the center thickness of the negative optical power lens element of the first lens unit, and $D_{12}$ is an air space between the negative optical power lens element and the positive optical power lens element of the first lens unit.

11. The zoom lens system as claimed in claim 1, wherein the following condition (6) is satisfied:

$$1.2 < ((2 \times D_2 \times R_{2F} \times R_{2R})/(R_{2R} - R_{2F}))^{0.5}/Ir < 2.0 \quad (6)$$

where, $D_2$ is a center thickness of the positive optical power lens element of the first lens unit, $R_{2F}$ is a radius of curvature of an object side surface of the positive optical power lens element of the first lens unit, $R_{2R}$ is a radius of curvature of an image side surface of the positive optical power lens element of the first lens unit, Ir is a value represented by the following equation:

$$Ir = f_T \times \tan(\omega_T),$$

$f_T$ is the focal length of the entire system at the telephoto limit, and $\omega_T$ is a half value (°) of a maximum view angle at a telephoto limit.

12. The zoom lens system as claimed in claim 1, wherein the second lens element is a meniscus lens element with a convex surface facing the object side.

13. The zoom lens system as claimed in claim 1, wherein the first lens unit includes at least one lens element having an aspheric surface.

14. The zoom lens system as claimed in claim 1, wherein the first lens unit includes at least two aspheric surfaces.

15. The zoom lens system as claimed in claim 1, wherein the second lens unit includes at least one cemented lens element, a cement surface of the cemented lens element is a convex surface facing the object side, and the following condition (7) is satisfied:

$$1.03 < Nd_2/Nd_1 < 2.00 \quad (7)$$

where, $Nd_1$ is a refractive index to the d-line of a lens element located on the most object side in the cemented lens element, and $Nd_2$ is a refractive index to the d-line of a lens element which is cemented with the lens element located on the most object side in the cemented lens element.

16. The zoom lens system as claimed in claim 1, wherein the second lens unit moves in a direction perpendicular to the optical axis.

17. The zoom lens system as claimed in claim 16, wherein the entire system satisfies the following conditions (9) and (10):

$$Y_T > Y \quad (9)$$

$$1.5 < (Y/Y_T)/(f/f_T) < 3.0 \quad (10)$$

where, f is a focal length of the entire system, $f_T$ is the focal length of the entire system at the telephoto limit, Y is an amount of movement in the direction perpendicular to the optical axis for maximum blur compensation by the second lens unit, with respect to the focal length f of the entire system, and $Y_T$ is an amount of movement in the direction perpendicular to the optical axis for maximum blur compensation by the second lens unit, with respect to the focal length $f_T$ of the entire system at a telephoto limit.

18. An imaging device capable of outputting an optical image of an object as an electric image signal, comprising:

a zoom lens system that forms an optical image of the object; and an image sensor that converts the optical image formed by the zoom lens system into the electric image signal, wherein the zoom lens system is a zoom lens system as claimed in claim 1.

19. A camera for converting an optical image of an object into an electric image signal and then performing at least one of displaying and storing of the converted image signal, comprising:

an imaging device including a zoom lens system that forms an optical image of the object, and an image sensor that converts the optical image formed by the zoom lens system into the electric image signal, wherein the zoom lens system is a zoom lens system as claimed in claim 1.

* * * * *